US011062106B2

(12) United States Patent
Ebrahimi et al.

(10) Patent No.: US 11,062,106 B2
(45) Date of Patent: Jul. 13, 2021

(54) LARGE DATA TRANSFER USING VISUAL CODES WITH FEEDBACK CONFIRMATION

(71) Applicant: Ping Identity Corporation, Denver, CO (US)

(72) Inventors: Armin Ebrahimi, Palo Alto, CA (US); Gaurav Khot, Cupertino, CA (US); Bhavya Chauhan, Cupertino, CA (US)

(73) Assignee: Ping Identity Corporation, Denver, CO (US)

( * ) Notice: Subject to any disclaimer, the term of this patent is extended or adjusted under 35 U.S.C. 154(b) by 0 days.

(21) Appl. No.: 16/697,110

(22) Filed: Nov. 26, 2019

(65) Prior Publication Data

US 2020/0265202 A1  Aug. 20, 2020

Related U.S. Application Data

(63) Continuation of application No. 15/784,093, filed on Oct. 14, 2017, now Pat. No. 10,509,932, which is a
(Continued)

(51) Int. Cl.
*G06K 7/10* (2006.01)
*G06K 19/06* (2006.01)
(Continued)

(52) U.S. Cl.
CPC ............ *G06K 7/1417* (2013.01); *G09C 5/00* (2013.01); *H04L 9/0618* (2013.01);
(Continued)

(58) Field of Classification Search
USPC ........................................ 235/462.01, 494
See application file for complete search history.

(56) References Cited

U.S. PATENT DOCUMENTS

| 5,005,200 A | 4/1991 | Fisher |
| 5,901,229 A | 5/1999 | Fujisaki et al. |

(Continued)

FOREIGN PATENT DOCUMENTS

| JP | 2005-260490 A | 9/2005 |
| JP | 2006-179016 A | 7/2006 |

(Continued)

OTHER PUBLICATIONS

Extended European Search Report for European Application No. 16790050.5, dated Apr. 26, 2018, 10 pages.
(Continued)

*Primary Examiner* — Tuyen K Vo

(57) ABSTRACT

A method of confirming receipt, including iteratively capturing by a receiving device visual codes in a series of visual codes displayed on a sending device. A corresponding captured visual code being from a display block that resulted from a partition of an original data file into display blocks, and wherein each display block is converted to a corresponding string and header including an ordered identifying display block number and a total count of the display blocks. Each corresponding string is converted to a corresponding visual code. Each of the captured visual codes is converted into a corresponding string and a header is read for the corresponding string. Captured display blocks are determined. A confirmation message is generated including information indicating which display blocks have been received. The confirmation message is sent over a wireless communication link to the sending device to reduce the number of visual codes being displayed.

20 Claims, 26 Drawing Sheets

Related U.S. Application Data continuation-in-part of application No. 15/208,580, filed on Jul. 12, 2016, now Pat. No. 10,007,826.

(60) Provisional application No. 62/408,699, filed on Oct. 14, 2016, provisional application No. 62/304,934, filed on Mar. 7, 2016.

(51) Int. Cl.
    G06K 7/14      (2006.01)
    H04L 9/06      (2006.01)
    H04L 9/32      (2006.01)
    G09C 5/00      (2006.01)

(52) U.S. Cl.
    CPC .......... H04L 9/3236 (2013.01); H04L 9/3247 (2013.01); H04L 9/3263 (2013.01); H04L 2209/38 (2013.01); H04L 2209/80 (2013.01)

(56) References Cited

U.S. PATENT DOCUMENTS

| | | | |
|---|---|---|---|
| 5,923,763 A | 7/1999 | Walker | |
| 5,996,076 A | 11/1999 | Rowney | |
| 6,088,717 A | 7/2000 | Reed et al. | |
| 6,310,966 B1 | 10/2001 | Dulude et al. | |
| 6,785,815 B1 | 8/2004 | Serret-Avila | |
| 6,792,536 B1 | 9/2004 | Teppler | |
| 7,043,635 B1 | 5/2006 | Keech | |
| 7,225,161 B2 | 5/2007 | Lam et al. | |
| 7,451,116 B2 | 11/2008 | Parmelee et al. | |
| 7,502,467 B2 | 3/2009 | Brainard et al. | |
| 7,873,573 B2 | 1/2011 | Realini | |
| 8,056,822 B2 | 11/2011 | Bourrieres | |
| 8,078,880 B2 | 12/2011 | Nanda et al. | |
| 8,249,965 B2 | 8/2012 | Tumminaro | |
| 8,502,060 B2 | 8/2013 | Ribner | |
| 8,607,358 B1 | 12/2013 | Shankar et al. | |
| 8,744,076 B2 | 6/2014 | Youn | |
| 8,832,807 B1 | 9/2014 | Kuo et al. | |
| 8,966,276 B2 | 2/2015 | Nanopoulos et al. | |
| 9,059,858 B1 | 6/2015 | Giardina et al. | |
| 9,135,787 B1 | 9/2015 | Russell et al. | |
| 9,172,699 B1 | 10/2015 | Vazquez et al. | |
| 9,189,788 B1 | 11/2015 | Robinson et al. | |
| 9,240,058 B1 | 1/2016 | Amacker | |
| 9,288,047 B2 | 3/2016 | Brouwer et al. | |
| 9,331,856 B1 | 5/2016 | Song | |
| 9,397,985 B1 | 7/2016 | Seger et al. | |
| 9,608,822 B2 | 3/2017 | Lochmatter et al. | |
| 9,646,150 B2 | 5/2017 | Toth | |
| 9,679,276 B1 | 6/2017 | Cuende | |
| 9,722,790 B2 | 8/2017 | Ebrahimi | |
| 9,876,646 B2 | 1/2018 | Ebrahimi et al. | |
| 9,887,975 B1 | 2/2018 | Gifford et al. | |
| 9,948,467 B2 | 4/2018 | King | |
| 10,007,826 B2 | 6/2018 | Ebrahimi et al. | |
| 10,007,913 B2 | 6/2018 | Ebrahimi | |
| 10,163,105 B1 | 12/2018 | Ziraknejad et al. | |
| 10,255,419 B1 | 4/2019 | Kragh | |
| 10,257,179 B1 | 4/2019 | Saylor et al. | |
| 10,341,091 B2 | 7/2019 | Keranen et al. | |
| 10,341,123 B2 | 7/2019 | Ebrahimi et al. | |
| 10,417,219 B1 | 9/2019 | Yang et al. | |
| 10,498,541 B2 | 12/2019 | Ebrahimi et al. | |
| 10,498,542 B2 | 12/2019 | Ebrahimi et al. | |
| 10,509,932 B2 | 12/2019 | Ebrahimi et al. | |
| 10,587,609 B2 | 3/2020 | Ebrahimi et al. | |
| 10,657,532 B2 | 5/2020 | Ebrahimi | |
| 10,740,583 B2 | 8/2020 | Ebrahimi et al. | |
| 10,805,085 B1 | 10/2020 | Liang | |
| 2001/0011350 A1 | 8/2001 | Zabetian | |
| 2002/0016913 A1 | 2/2002 | Wheeler et al. | |
| 2002/0071565 A1 | 6/2002 | Kurn et al. | |
| 2002/0138735 A1 | 9/2002 | Felt et al. | |
| 2002/0141593 A1 | 10/2002 | Kurn et al. | |
| 2002/0170966 A1 | 11/2002 | Hannigan | |
| 2003/0014372 A1 | 1/2003 | Wheeler et al. | |
| 2003/0046159 A1 | 3/2003 | Ebrahimi | |
| 2003/0070075 A1 | 4/2003 | Deguillaume et al. | |
| 2003/0172273 A1 | 9/2003 | Hans | |
| 2004/0064693 A1 | 4/2004 | Pabla et al. | |
| 2005/0039040 A1 | 2/2005 | Ransom et al. | |
| 2005/0091495 A1 | 4/2005 | Cameron et al. | |
| 2005/0114447 A1 | 5/2005 | Cameron et al. | |
| 2006/0041756 A1 | 2/2006 | Ashok et al. | |
| 2006/0071077 A1 | 4/2006 | Suomela | |
| 2006/0075255 A1 | 4/2006 | Duffy et al. | |
| 2006/0256961 A1 | 11/2006 | Brainard et al. | |
| 2007/0016785 A1 | 1/2007 | Guay et al. | |
| 2007/0017996 A1 | 1/2007 | Xia et al. | |
| 2007/0033150 A1 | 2/2007 | Nwosu | |
| 2007/0118479 A1 | 5/2007 | Halsema et al. | |
| 2007/0277013 A1 | 11/2007 | Rexha et al. | |
| 2007/0294538 A1 | 12/2007 | Lim et al. | |
| 2008/0076836 A1 | 4/2008 | Tomita | |
| 2008/0116277 A1 | 5/2008 | Tomita | |
| 2008/0155253 A1 | 6/2008 | Liu | |
| 2008/0178008 A1 | 7/2008 | Takahashi et al. | |
| 2008/0235772 A1 | 9/2008 | Janzen | |
| 2008/0267511 A1 | 10/2008 | Bourrieres | |
| 2009/0066478 A1 | 3/2009 | Colella | |
| 2009/0232346 A1 | 9/2009 | Zilch | |
| 2009/0266882 A1 | 10/2009 | Sajkowsky | |
| 2010/0020970 A1 | 1/2010 | Liu | |
| 2010/0023758 A1 | 1/2010 | Han | |
| 2010/0052852 A1 | 3/2010 | Mohanty | |
| 2010/0070759 A1 | 3/2010 | Cobos et al. | |
| 2010/0088517 A1 | 4/2010 | Piersol | |
| 2010/0191972 A1 | 7/2010 | Kiliccote | |
| 2010/0228674 A1 | 9/2010 | Ogg et al. | |
| 2010/0250939 A1 | 9/2010 | Adams et al. | |
| 2010/0272193 A1 | 10/2010 | Khan et al. | |
| 2011/0093249 A1 | 4/2011 | Holmes et al. | |
| 2011/0121066 A1 | 5/2011 | Tian | |
| 2011/0231913 A1 | 9/2011 | Feng et al. | |
| 2011/0307703 A1 | 12/2011 | Ogg et al. | |
| 2012/0061461 A1 | 3/2012 | Bourrieres | |
| 2012/0067943 A1 | 3/2012 | Saunders | |
| 2012/0086971 A1 | 4/2012 | Bisbee | |
| 2012/0125997 A1 | 5/2012 | Burra et al. | |
| 2012/0211567 A1 | 8/2012 | Herzig | |
| 2012/0297190 A1 | 11/2012 | Shen et al. | |
| 2012/0297464 A1 | 11/2012 | Busch et al. | |
| 2012/0308003 A1 | 12/2012 | Mukherjee | |
| 2013/0010958 A1 | 1/2013 | Yao | |
| 2013/0014152 A1 | 1/2013 | Maino et al. | |
| 2013/0037607 A1 | 2/2013 | Bullwinkel | |
| 2013/0065564 A1 | 3/2013 | Conner | |
| 2013/0111208 A1 | 5/2013 | Sabin et al. | |
| 2013/0145152 A1 | 6/2013 | Maino | |
| 2013/0153666 A1* | 6/2013 | Edwards | G06K 7/1095 235/462.25 |
| 2013/0159021 A1 | 6/2013 | Felsher | |
| 2013/0173915 A1 | 7/2013 | Haulund et al. | |
| 2013/0198822 A1 | 8/2013 | Hitchcock et al. | |
| 2013/0228624 A1 | 9/2013 | Byrd et al. | |
| 2013/0246261 A1 | 9/2013 | Purves et al. | |
| 2013/0262309 A1 | 10/2013 | Gadotti | |
| 2013/0262857 A1 | 10/2013 | Neuman et al. | |
| 2013/0290733 A1 | 10/2013 | Branton et al. | |
| 2013/0305059 A1 | 11/2013 | Gormley et al. | |
| 2013/0311768 A1 | 11/2013 | Fosmark et al. | |
| 2013/0333009 A1 | 12/2013 | Mackler | |
| 2014/0001253 A1 | 1/2014 | Smith | |
| 2014/0006247 A1 | 1/2014 | Chai et al. | |
| 2014/0006806 A1 | 1/2014 | Corella et al. | |
| 2014/0032913 A1 | 1/2014 | Tenenboym | |
| 2014/0084067 A1* | 3/2014 | Vanderhulst | H04B 10/116 235/462.01 |
| 2014/0093144 A1 | 4/2014 | Feekes | |
| 2014/0208403 A1 | 7/2014 | Lu et al. | |
| 2014/0223175 A1 | 8/2014 | Bhatnagar | |
| 2014/0237565 A1 | 8/2014 | Fleysher | |

(56) References Cited

U.S. PATENT DOCUMENTS

| | | |
|---|---|---|
| 2014/0254796 A1 | 9/2014 | Li et al. |
| 2014/0256423 A1 | 9/2014 | Williams |
| 2014/0282961 A1 | 9/2014 | Dorfman et al. |
| 2014/0289842 A1 | 9/2014 | Cornick et al. |
| 2014/0304517 A1 | 10/2014 | Chidambaram et al. |
| 2014/0344015 A1 | 11/2014 | Puertolas-Montanes et al. |
| 2015/0047000 A1 | 2/2015 | Spencer, III et al. |
| 2015/0081567 A1 | 3/2015 | Boyle et al. |
| 2015/0095352 A1 | 4/2015 | Lacey |
| 2015/0095999 A1 | 4/2015 | Toth |
| 2015/0106626 A1 | 4/2015 | Kremp et al. |
| 2015/0178515 A1 | 6/2015 | Cooley et al. |
| 2015/0244690 A1 | 8/2015 | Mossbarger |
| 2015/0262138 A1 | 9/2015 | Hudson |
| 2015/0269614 A1 | 9/2015 | Kramer |
| 2015/0278805 A1 | 10/2015 | Spencer, III et al. |
| 2015/0278820 A1 | 10/2015 | Meadows |
| 2015/0302401 A1 | 10/2015 | Metral |
| 2015/0332283 A1 | 11/2015 | Witchey |
| 2015/0356523 A1 | 12/2015 | Madden |
| 2015/0356555 A1 | 12/2015 | Pennanen |
| 2015/0365436 A1 | 12/2015 | Shenefiel et al. |
| 2016/0005032 A1 | 1/2016 | Yau et al. |
| 2016/0012465 A1 | 1/2016 | Sharp |
| 2016/0028452 A1 | 1/2016 | Chu et al. |
| 2016/0028552 A1 | 1/2016 | Spanos et al. |
| 2016/0072800 A1 | 3/2016 | Soon-Shiong et al. |
| 2016/0094346 A1 | 3/2016 | Takahashi |
| 2016/0098723 A1 | 4/2016 | Feeney |
| 2016/0098730 A1 | 4/2016 | Feeney |
| 2016/0125416 A1 | 5/2016 | Spencer et al. |
| 2016/0134593 A1 | 5/2016 | Gvili |
| 2016/0162897 A1 | 6/2016 | Feeney |
| 2016/0180338 A1 | 6/2016 | Androulaki et al. |
| 2016/0203572 A1 | 7/2016 | McConaghy |
| 2016/0212146 A1 | 7/2016 | Wilson |
| 2016/0217356 A1 | 7/2016 | Wesby |
| 2016/0217436 A1 | 7/2016 | Brama |
| 2016/0261411 A1 | 9/2016 | Yau et al. |
| 2016/0269403 A1 | 9/2016 | Koutenaei et al. |
| 2016/0283920 A1 | 9/2016 | Fisher et al. |
| 2016/0283939 A1 | 9/2016 | Finlow-Bates |
| 2016/0283941 A1 | 9/2016 | Andrade |
| 2016/0300234 A1 | 10/2016 | Moss-Pultz et al. |
| 2016/0314462 A1 | 10/2016 | Hong et al. |
| 2016/0328713 A1 | 11/2016 | Ebrahimi |
| 2016/0330027 A1 | 11/2016 | Ebrahirni |
| 2016/0330035 A1 | 11/2016 | Ebrahimi et al. |
| 2016/0337351 A1 | 11/2016 | Spencer et al. |
| 2016/0351080 A1 | 12/2016 | Bhatnagar et al. |
| 2016/0373440 A1 | 12/2016 | Mather et al. |
| 2017/0041296 A1 | 2/2017 | Ford |
| 2017/0048252 A1 | 2/2017 | Straub et al. |
| 2017/0103389 A1 | 4/2017 | Sorensen et al. |
| 2017/0109735 A1 | 4/2017 | Sheng et al. |
| 2017/0180128 A1 | 6/2017 | Lu |
| 2017/0200160 A1 | 7/2017 | Kumar |
| 2017/0228731 A1 | 8/2017 | Sheng et al. |
| 2017/0236121 A1 | 8/2017 | Lyons et al. |
| 2017/0255805 A1 | 9/2017 | Ebrahimi et al. |
| 2017/0257358 A1 | 9/2017 | Ebrahimi et al. |
| 2017/0279788 A1 | 9/2017 | Rosenblum et al. |
| 2017/0324711 A1 | 11/2017 | Feeney |
| 2017/0344987 A1 | 11/2017 | Davis |
| 2017/0344988 A1 | 11/2017 | Cusden et al. |
| 2017/0346851 A1 | 11/2017 | Drake |
| 2017/0357826 A1 | 12/2017 | Gouget et al. |
| 2017/0359723 A1 | 12/2017 | Pal et al. |
| 2017/0372300 A1 | 12/2017 | Dunlevy et al. |
| 2018/0068103 A1 | 3/2018 | Pitkanen et al. |
| 2018/0077144 A1 | 3/2018 | Gangawane et al. |
| 2018/0082050 A1 | 3/2018 | Flink et al. |
| 2018/0082256 A1 | 3/2018 | Tummuru et al. |
| 2018/0144153 A1 | 5/2018 | Pead |
| 2018/0173906 A1 | 6/2018 | Rodriguez et al. |
| 2018/0176017 A1 | 6/2018 | Rodriguez et al. |
| 2018/0205556 A1* | 7/2018 | Rieul ................. H04L 9/30 |
| 2018/0240107 A1 | 8/2018 | Andrade |
| 2018/0308098 A1 | 10/2018 | Ebrahimi |
| 2019/0005470 A1 | 1/2019 | Uhr et al. |
| 2019/0149537 A1 | 5/2019 | Ebrahimi et al. |
| 2019/0163896 A1 | 5/2019 | Balaraman et al. |
| 2019/0182042 A1 | 6/2019 | Ebrahimi et al. |
| 2019/0228178 A1 | 7/2019 | Sharma et al. |
| 2019/0342096 A1 | 11/2019 | Starosielsky et al. |
| 2020/0127826 A1 | 4/2020 | Ebrahimi et al. |
| 2020/0127832 A1 | 4/2020 | Ebrahimi |
| 2020/0145219 A1 | 5/2020 | Sebastian et al. |
| 2020/0267003 A1 | 8/2020 | Ebrahimi et al. |

FOREIGN PATENT DOCUMENTS

| | | |
|---|---|---|
| KR | 10-2013-0055794 | 5/2013 |
| WO | WO 2016/179334 | 11/2016 |
| WO | WO 2017/152150 | 9/2017 |
| WO | WO 2018/145127 | 8/2018 |
| WO | WO 2019/113552 | 6/2019 |

OTHER PUBLICATIONS

Office Action for European Application No. 16790050.5, dated Nov. 21, 2019, 7 pages.

Notice of Reasons for Refusal for Japanese Application No. 2018-510317, dated Sep. 1, 2020, 6 pages.

Office Action for U.S. Appl. No. 15/146,872, dated Sep. 27, 2016, 8 pages.

Office Action for U.S. Appl. No. 15/146,872, dated Jun. 15, 2017, 12 pages.

International Search Report and Written Opinion for International Application No. PCT/US2016/030863, dated Sep. 14, 2016, 9 pages.

Office Action for U.S. Appl. No. 16/018,773, dated Jul. 28, 2020, 34 pages.

Office Action for U.S. Appl. No. 15/146,881, dated Oct. 13, 2016, 8 pages.

Office Action for U.S. Appl. No. 15/640,795, dated May 24, 2019, 8 pages.

Office Action for U.S. Appl. No. 15/878,353, dated Aug. 8, 2018, 14 pages.

Office Action for U.S. Appl. No. 15/208,580, dated Oct. 25, 2017, 9 pages.

Office Action for U.S. Appl. No. 15/208,580, dated Mar. 21, 2017, 8 pages.

Office Action for U.S. Appl. No. 15/208,580, dated Jul. 7, 2017, 9 pages.

Office Action for U.S. Appl. No. 15/784,093, dated Nov. 29, 2018, 9 pages.

Office Action for U.S. Appl. No. 15/784,093, dated Apr. 15, 2019, 11 pages.

Office Action for U.S. Appl. No. 16/019,411, dated Apr. 12, 2019, 12 pages.

Office Action for U.S. Appl. No. 16/019,411, dated Sep. 16, 2019, 9 pages.

Extended European Search Report for European Application No. 17760964.1, dated Oct. 24, 2019, 11 pages.

Office Action for European Application No. 17760964.1, dated Oct. 20, 2020, 3 pages.

Office Action for U.S. Appl. No. 15/449,902, dated Jun. 19, 2019, 10 pages.

International Search Report and Written Opinion for International Application No. PCT/US2017/020829, dated Jul. 17, 2017, 12 pages.

Office Action for U.S. Appl. No. 16/227,632, dated Oct. 27, 2020, 9 pages.

International Search Report and Written Opinion for International Application No. PCT/US2018/017136, dated Apr. 26, 2018, 12 pages.

Office Action for U.S. Appl. No. 16/697,131, dated Oct. 16, 2020, 12 pages.

(56) References Cited

OTHER PUBLICATIONS

Office Action for U.S. Appl. No. 16/214,029, dated Oct. 22, 2020, 24 pages.
International Search Report and Written Opinion for International Application No. PCT/US2018/064623, dated May 14, 2019, 7 pages.
Office Action for U.S. Appl. No. 16/656,459, dated Sep. 24, 2020, 8 pages.
Ellis, C., "Create Your Own Blockchain ID", Bitnation, Oct. 24, 2014, 14 pages.
Drew-Cordell, "Developer Creates Blockchain Passport Technology Based on Bitcoin", Oct. 31, 2014, 16 pages.
Kirk, J., "Could the Bitcoin network be used as an ultrasecure notary service?", IDG News Service, Computerworld, Inc., May 23, 2013, 3 pages.
Biggs, J., "Your Next Passport Could Be on the Blockchain", Oct. 31, 2014, 6 pages.
Dillet, R., "Stampery Now Lets You Certify Documents Using the Blockchain and Your Real Identity," Nov. 20, 2015, 6 pages.
Gupta, V., "State in a Box—Identity Services Architecture," CheapID, 2006-2009, 42 pages.
Menezes, A. J. et al., Chapter 9: Handbook of Applied Cryptography, CRC Press, Boca Raton, FL, pp. 321-383 (Oct. 1996).
Nakamoto, S., "Bitcoin: A peer-to-peer electronic cash system," Retrieved from the Internet: <URL:http://www.bitcoin.org>, Jan. 2009, 9 pages.
GitHub, Inc., "World Citizenship, Creating Affordable Decentralised Passport Services Using Available Cryptographic Tools," (Oct. 2014), Retrieved from the Internet on Nov. 17, 2017, <URL: https://github.com/MrChrisJ/World-Citizenship>, 12 pages.
Office Action for U.S. Appl. No. 16/697,131, dated Apr. 26, 2021, 6 pages.

\* cited by examiner

8501
HEADER:
(0, 10)
(1, 10)
(2, 10)
(3, 10)
(4, 10)
(5, 10)
(6, 10)
(7, 10)
(8, 10)
(9, 10)
Figure 8A
I. 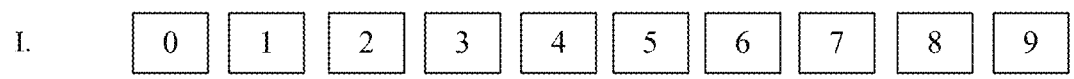
II. 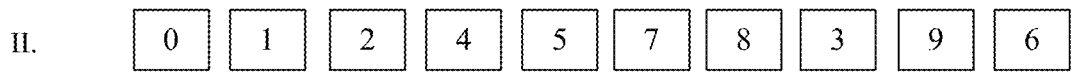
TIME
III. 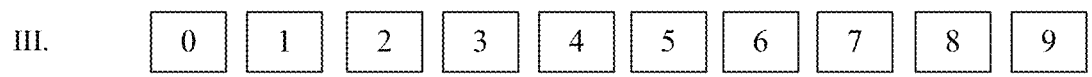
Figure 8B

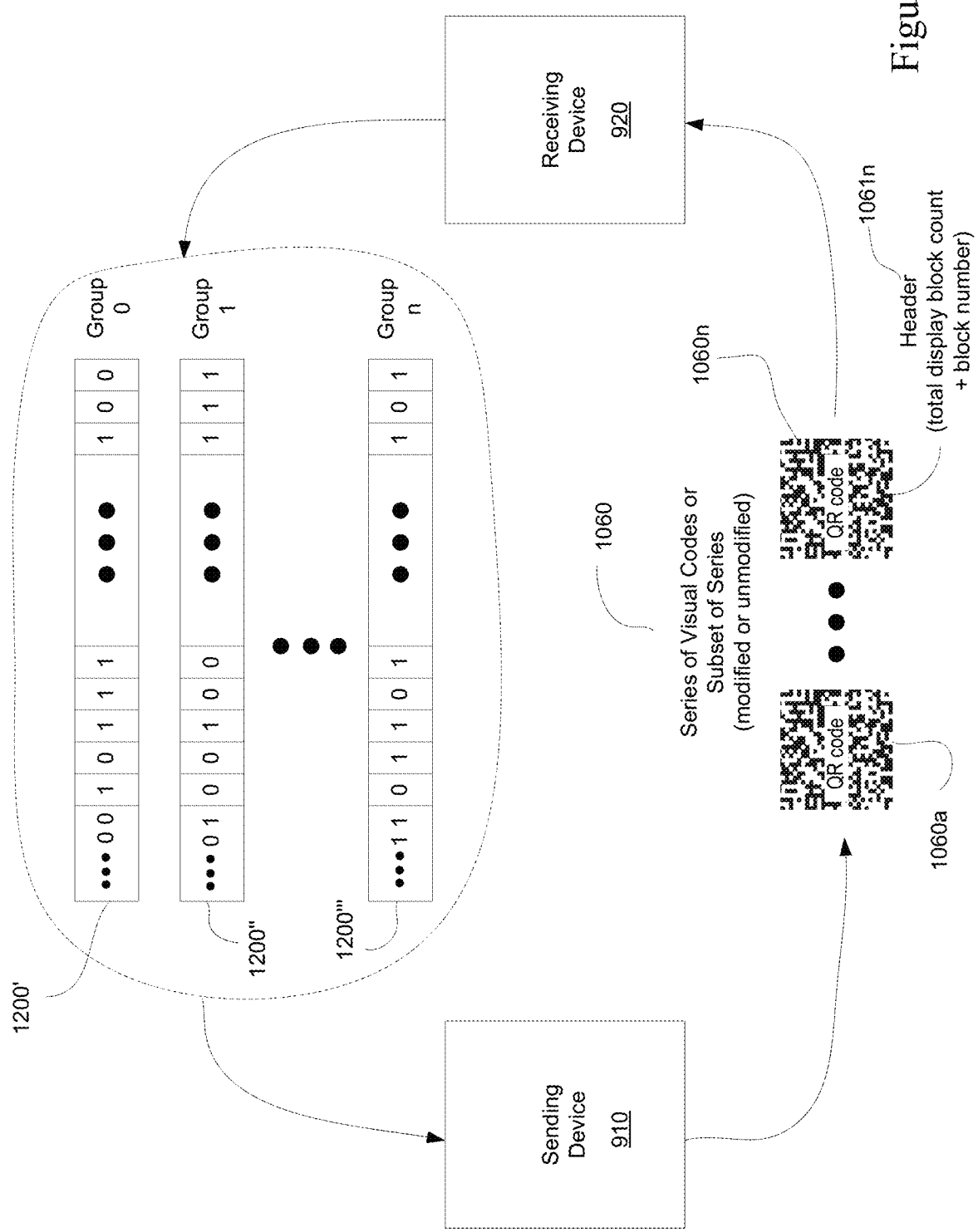

PERFORMED IN REAL TIME

- PARTITION AN ORIGINAL DATA FILE INTO A SERIES OF DISPLAY BLOCKS OF AT LEAST A SPECIFIED SIZE AS DETERMINED BY A STANDARD FOR A VISUAL CODE, WHERE THE ORIGINAL DATA FILE HAS BEEN ENCRYPTED WITH A PUBLIC KEY — 1321
- ADD THE TOTAL NUMBER OF DISPLAY BLOCKS AND A BLOCK NUMBER AS A HEADER TO EACH DISPLAY BLOCK — 1322
- CONVERT EACH DISPLAY BLOCK TO A STRING AND GENERATE A SINGLE VISUAL CODE FOR THE STRING — 1323
- FOR EACH DISPLAY BLOCK IN THE SERIES, PRESENT ITS VISUAL CODE IN A REPEATING PROGRESSION THROUGH THE SERIES DISPLAYED ON THE A MOBILE DEVICE — 1324

PERFORMED IN REAL TIME

- ITERATIVELY CAPTURE A VISUAL CODE FROM THE MOBILE DEVICE USING AN IMAGE-CAPTURING DEVICE — 1331
- CONVERT THE VISUAL CODE BACK INTO A STRING AND DISCARD THE STRING IF IT IS A DUPLICATE; OTHERWISE REMOVE THE HEADER, RECORD THE BLOCK NUMBER, AND CONVERT THE STRING BACK INTO TO A DISPLAY BLOCK — 1332
- STOP CAPTURING WHEN THE TOTAL NUMBER OF DISPLAY BLOCKS EQUALS THE NUMBER OF BLOCK NUMBERS — 1333
- COALESCE THE DISPLAY BLOCKS INTO AN ENCRYPTED ORIGINAL DATA FILE USING THE ORDER DETERMINED BY THE BLOCK NUMBERS — 1334
- DECRYPT THE ENCRYPTED ORIGINAL DATA FILE USING A MATCHING PRIVATE KEY AND COMPARE THE ORIGINAL DATA FILE TO ANOTHER COPY OF THE ORIGINAL DATA FILE OBTAINED FROM ANOTHER SOURCE — 1335

Figure 13A

PERFORMED IN REAL TIME

PARTITION AN ORIGINAL DATA FILE INTO A SERIES OF DISPLAY BLOCKS OF AT LEAST A SPECIFIED SIZE AS DETERMINED BY A STANDARD FOR A VISUAL CODE, WHERE THE ORIGINAL DATA FILE HAS BEEN SIGNED DIGITALLY SIGNED WITH A PRIVATE KEY — 1341

↓

ADD THE TOTAL NUMBER OF DISPLAY BLOCKS AND A BLOCK NUMBER AS A HEADER TO EACH DISPLAY BLOCK — 1342

↓

CONVERT EACH DISPLAY BLOCK TO A STRING AND GENERATE A SINGLE VISUAL CODE FOR THE STRING — 1343

↓

FOR EACH DISPLAY BLOCK IN THE SERIES, PRESENT ITS VISUAL CODE IN A REPEATING PROGRESSION THROUGH THE SERIES DISPLAYED ON A MOBILE DEVICE — 1344

- - - - - - - - - - - - - - - - - - - - - - - - - - - - - - - -

PERFORMED IN REAL TIME

ITERATIVELY CAPTURE A VISUAL CODE FROM THE MOBILE DEVICE USING AN IMAGE-CAPTURING DEVICE — 1351

↓

CONVERT THE VISUAL CODE BACK INTO A STRING AND DISCARD THE STRING IF IT IS A DUPLICATE; OTHERWISE REMOVE THE HEADER, RECORD THE BLOCK NUMBER, AND CONVERT THE STRING BACK INTO TO A DISPLAY BLOCK — 1352

↓

STOP CAPTURING WHEN THE TOTAL NUMBER OF DISPLAY BLOCKS EQUALS THE NUMBER OF BLOCK NUMBERS — 1353

↓

COALESCE THE BLOCKS INTO AN ORIGINAL DATA FILE USING THE ORDER DETERMINED BY THE BLOCK NUMBERS — 1354

↓

HASH ANOTHER COPY OF THE ORIGINAL DATA FILE AND USE IT AND THE MATCHING PUBLIC KEY TO VERIFY (1) THE SIGNED ORIGINAL DATA FILE AND (3) THE DIGITAL SIGNATURE, USING A VERIFICATION ALGORITHM — 1355

Figure 13B

PERFORMED IN REAL TIME

PERFORMED IN REAL TIME

PERFORMED IN REAL TIME

- PARTITION AN ORIGINAL DATA FILE AND A CERTIFICATE INTO A SERIES OF DISPLAY BLOCKS OF AT LEAST A SPECIFIED SIZE AS DETERMINED BY A STANDARD FOR A VISUAL CODE, WHERE THE ORIGINAL DATA FILE AND THE CERTIFICATE HAVE BEEN ENCRYPTED WITH A PUBLIC KEY — 13001
- ADD THE TOTAL NUMBER OF DISPLAY BLOCKS AND A DISPLAY BLOCK NUMBER AS A HEADER TO EACH DISPLAY BLOCK — 13002
- CONVERT EACH DISPLAY BLOCK TO A STRING AND GENERATE A SINGLE VISUAL CODE FOR THE STRING — 13003
- FOR EACH DISPLAY BLOCK IN THE SERIES, PRESENT ITS VISUAL CODE IN A REPEATING PROGRESSION THROUGH THE SERIES DISPLAYED ON A MOBILE DEVICE — 13004

PERFORMED IN REAL TIME

- ITERATIVELY CAPTURE A VISUAL CODE FROM THE MOBILE DEVICE USING AN IMAGE CAPTURING DEVICE — 13011
- CONVERT THE VISUAL CODE BACK INTO A STRING AND DISCARD THE STRING IF IT IS A DUPLICATE; OTHERWISE REMOVE THE HEADER, RECORD THE BLOCK NUMBER, AND CONVERT THE STRING BACK INTO TO A DISPLAY BLOCK — 13012
- STOP CAPTURING WHEN THE TOTAL NUMBER OF DISPLAY BLOCKS EQUALS THE NUMBER OF BLOCK NUMBERS — 13013
- COALESCE THE DISPLAY BLOCKS INTO AN ORIGINAL DATA FILE USING THE ORDER DETERMINED BY THE BLOCK NUMBERS — 13014
- DECRYPT THE ENCRYPTED ORIGINAL DATA FILE AND CERTIFICATE USING A MATCHING PRIVATE KEY AND COMPARE THE ORIGINAL DATA FILE TO ANOTHER COPY OF THE ORIGINAL DATA FILE OBTAINED FROM ANOTHER SOURCE — 13015

Figure 13E

PERFORMED IN REAL TIME

- 13021: PARTITION AN ORIGINAL DATA FILE AND A CERTIFICATE INTO A SERIES OF DISPLAY BLOCKS OF AT LEAST A SPECIFIED SIZE AS DETERMINED BY A STANDARD FOR A VISUAL CODE, WHERE THE ORIGINAL DATA FILE AND THE CERTIFICATE HAVE BEEN DIGITALLY SIGNED WITH A PRIVATE KEY
- 13022: ADD THE TOTAL NUMBER OF DISPLAY BLOCKS AND A BLOCK NUMBER AS A HEADER TO EACH DISPLAY BLOCK
- 13023: CONVERT EACH DISPLAY BLOCK TO A STRING AND GENERATE A SINGLE VISUAL CODE FOR THE STRING
- 13024: FOR EACH DISPLAY BLOCK IN THE SERIES, PRESENT ITS VISUAL CODE IN A REPEATING PROGRESSION THROUGH THE SERIES DISPLAYED ON A MOBILE DEVICE

PERFORMED IN REAL TIME

- 13031: ITERATIVELY CAPTURE A VISUAL CODE FROM THE MOBILE DEVICE USING AN IMAGE-CAPTURING DEVICE
- 13032: CONVERT THE VISUAL CODE BACK INTO A STRING AND DISCARD THE STRING IF IT IS A DUPLICATE; OTHERWISE REMOVE THE HEADER, RECORD THE BLOCK NUMBER, AND CONVERT THE STRING BACK INTO TO A DISPLAY BLOCK
- 13033: STOP CAPTURING WHEN THE TOTAL NUMBER OF DISPLAY BLOCKS EQUALS THE NUMBER OF BLOCK NUMBERS
- 13034: COALESCE THE DISPLAY BLOCKS INTO AN ORIGINAL DATA FILE USING THE ORDER DETERMINED BY THE BLOCK NUMBERS
- 13035: HASH ANOTHER COPY OF THE ORIGINAL DATA FILE AND ANOTHER COPY OF THE CERTIFICATE AND USE THEM AND THE MATCHING PUBLIC KEY TO VERIFY (1) THE SIGNED ORIGINAL DATA FILE AND CERTIFICATE AND (2) THE DIGITAL SIGNATURE, USING A VERIFICATION ALGORITHM

Figure 13F

PERFORMED IN REAL TIME

- PARTITION AN ORIGINAL DATA FILE AND A CERTIFICATE INTO A SERIES OF DISPLAY BLOCKS OF AT LEAST A SPECIFIED SIZE AS DETERMINED BY A STANDARD FOR A VISUAL CODE, WHERE THE ORIGINAL DATA FILE AND THE CERTIFICATE HAVE BEEN DIGITALLY SIGNED WITH A PRIVATE KEY AND ENCRYPTED WITH A PUBLIC KEY — 13051

- ADD THE TOTAL NUMBER OF DISPLAY BLOCKS AND A BLOCK NUMBER AS A HEADER TO EACH DISPLAY BLOCK — 13052

- CONVERT EACH DISPLAY BLOCK TO A STRING AND GENERATE A SINGLE VISUAL CODE FOR THE STRING — 13053

- FOR EACH DISPLAY BLOCK IN THE SERIES, PRESENT ITS VISUAL CODE IN A REPEATING PROGRESSION THROUGH THE SERIES DISPLAYED ON A MOBILE DEVICE — 13054

PERFORMED IN REAL TIME

- ITERATIVELY CAPTURE A VISUAL CODE FROM THE MOBILE DEVICE USING AN IMAGE CAPTURING DEVICE — 13061

- CONVERT THE VISUAL CODE BACK INTO A STRING AND DISCARD THE STRING IF IT IS A DUPLICATE; OTHERWISE REMOVE THE HEADER, RECORD THE BLOCK NUMBER, AND CONVERT THE STRING BACK INTO TO A DISPLAY BLOCK — 13062

- STOP CAPTURING WHEN THE TOTAL NUMBER OF DISPLAY BLOCKS EQUALS THE NUMBER OF BLOCK NUMBERS — 13063

- COALESCE THE DISPLAY BLOCKS INTO AN ENCRYPTED SIGNED ORIGINAL DATA FILE AND CERTIFICATE, USING THE ORDER DETERMINED BY THE BLOCK NUMBERS, AND DECRYPT THE ENCRYPTED SIGNED ORIGINAL DATA FILE AND CERTIFICATE USING A MATCHING PRIVATE KEY — 13064

- HASH ANOTHER COPY OF THE ORIGINAL DATA FILE AND ANOTHER COPY OF THE CERTIFICATE AND USE THEM AND THE MATCHING PUBLIC KEY TO VERIFY (1) THE SIGNED ORIGINAL DATA FILE AND CERTIFICATE AND (2) THE DIGITAL SIGNATURE, USING A VERIFICATION ALGORITHM — 13065

Figure 13G

LARGE DATA TRANSFER USING VISUAL CODES WITH FEEDBACK CONFIRMATION

CLAIM OF PRIORITY

This application is a continuation of and claims priority to and the benefit of U.S. patent application Ser. No. 15/784,093, now U.S. Pat. No. 10,509,932, filed on Oct. 14, 2017, entitled "Large Data Transfer Using Visual Codes with Feedback Confirmation"; which claims priority to and the benefit of U.S. Provisional Patent Application No. 62/408,699, filed on Oct. 14, 2016, entitled "Large Data Transfer Using Visual Codes and Feedback," all of which are herein incorporated by reference in their entireties. This application is a continuation of and claims priority to and the benefit of U.S. patent application Ser. No. 15/784,093, now U.S. Pat. No. 10,509,932, filed on Oct. 14, 2017, entitled "Large Data Transfer Using Visual Codes with Feedback Confirmation"; which is a continuation-in-part of and claims priority to and the benefit of U.S. patent application Ser. No. 15/208,580, now U.S. Pat. No. 10,007,826, filed on Jul. 12, 2016, entitled "Transferring Data Files Using a Series of Visual Codes;" which claims priority to and the benefit of U.S. Provisional Patent Application No. 62/304,934, filed on Mar. 7, 2016, entitled "An Identity Management Service Using a Block Chain," all of which are herein incorporated by reference in their entireties.

CROSS REFERENCE TO RELATED APPLICATIONS

This application is related to U.S. patent application Ser. No. 15/146,872, entitled "Identity Management Service Using a Block Chain Providing Identity Transactions Between Devices", filed on May 4, 2016; U.S. patent application Ser. No. 15/146,872, entitled "Identity Management Service Using a Block Chain Providing Identity Transactions Between Devices", filed on May 4, 2016; U.S. patent application Ser. No. 15/146,881, entitled "Identity Management Service Using a Block Chain Providing Identity Certification Transactions Between Devices", filed on May 4, 2016; PCT Application No. PCT/US16/30863, entitled "Identity Management Service Using a Block Chain Providing Interaction Transactions Between Devices", filed on May 4, 2016; and U.S. patent application Ser. No. 15/147,838, entitled "User Identification Management System and Method", filed on May 5, 2016. The disclosure of each of the applications identified above is incorporated herein by reference for all purposes.

BACKGROUND

When two devices are incompatible or lack access to a connecting network, data transfer between them might still be possible using displayed and captured visual codes such as a QR code, a PDF417 code, etc.

However, the standards for visual codes employ maximum data limits which are smaller than the size of many image files or files containing non-image biometric data, which are often used to prove identity, e.g., to law enforcement officials or airlines.

SUMMARY

In an example embodiment, a method is described. According to the method, software on an image-capturing device iteratively captures a visual code in a series of visual codes displayed in a repeating progression on a screen of a mobile device. The visual code was generated from a display block that resulted from a partition of an original data file into a series of display blocks of at least a specified size. Each display block has a header that includes an ordered identifying block number and a count of the display blocks in the series. The software converts the visual code back into a display block and reads a header for the display block, discarding the display block if it has already been captured, as determined by the ordered identifying block number in the header. The software removes the header of the display block and records the ordered identifying block number, if the display block has not been discarded. The software stops the iterative capturing when all of the display blocks in the series have been captured, as determined by the count in the header and coalesces the captured display blocks into the original data file, using an order determined by the ordered identifying block numbers. Then the software compares the original data file with a copy of the original data file obtained from another source, in an example embodiment.

In another example embodiment, another method is described. According to the method, software on a mobile device partitions an original data file into a series of display blocks of at least a specified size. Then the software adds a header to each display block. The header includes an ordered identifying block number and a count of the display blocks in the series. The software generates a visual code for each display block. And the software iteratively presents each of the visual codes in the series in a repeating progression displayed on a screen of a mobile device for capture by an image-capturing device which converts each visual code back into a display block and coalesces the captured display blocks into the original data file, using an order determined by the ordered identifying block numbers.

In another example embodiment, another method is described. According to the method, software on an image-capturing device iteratively captures a QR code in a series of QR codes displayed in a repeating progression on a screen of a mobile device. The QR code was generated from a display block that resulted from a partition of an original data file which had been digitally signed with a private key into a series of display blocks of at least a specified size. Each display block has a header that includes an ordered identifying block number and a count of the display blocks in the series. The software converts the QR code back into a display block and reads a header for the display block, discarding the display block if it has already been captured, as determined by the ordered identifying block number in the header. The software removes the header of the display block and records the ordered identifying block number, if the display block has not been discarded. The software stops the iterative capturing when all of the display blocks in the series have been captured, as determined by the count in the header and coalesces the captured display blocks into the original data file, using an order determined by the ordered identifying block numbers. Then the software hashes a copy of the original data file and uses the hashed copy and a public key matching the private key to verify the original data file that had been digitally signed and the digital signing.

In another embodiment, a method of confirming receipt is described. The method includes iteratively capturing by a receiving device visual codes in a series of visual codes displayed in a repeating progression on a screen of a sending device, wherein a corresponding captured visual code was generated from a display block that resulted from a partition of an original data file into a series of display blocks of at least a specified size and wherein each display block is converted to a corresponding string and corresponding header that includes an ordered identifying display block number and a total count of the display blocks in the series, wherein each corresponding string is converted to a corresponding visual code. The method includes converting each of the captured visual codes into a corresponding string and reading a header for the corresponding string. The method includes determining which display blocks have been captured in the series of display blocks. The method includes generating a confirmation message including information indicating which display blocks have been received. The method includes sending the confirmation message over a wireless communication link to the sending device in order to reduce the number of visual codes being displayed by the sending device.

In still another embodiment, a non-transitory computer-readable medium storing a computer program for confirming receipt is described. The computer-readable medium includes program instructions for iteratively capturing by a receiving device visual codes in a series of visual codes displayed in a repeating progression on a screen of a sending device, wherein a corresponding captured visual code was generated from a display block that resulted from a partition of an original data file into a series of display blocks of at least a specified size and wherein each display block is converted to a corresponding string and corresponding header that includes an ordered identifying display block number and a total count of the display blocks in the series, wherein each corresponding string is converted to a corresponding visual code. The computer-readable medium includes program instructions for converting each of the captured visual codes into a corresponding string and reading a header for the corresponding string. The computer-readable medium includes program instructions for determining which display blocks have been captured in the series of display blocks. The computer-readable medium includes program instructions for generating a confirmation message including information indicating which display blocks have been received. The computer-readable medium includes program instructions for sending the confirmation message over a wireless communication link to the sending device in order to reduce the number of visual codes being displayed by the sending device.

In another embodiment, a computer system is described and includes a processor and memory coupled to the processor and having stored therein instructions that, if executed by the computer system, cause the computer system to execute a method for confirming receipt. The method includes iteratively capturing by a receiving device visual codes in a series of visual codes displayed in a repeating progression on a screen of a sending device, wherein a corresponding captured visual code was generated from a display block that resulted from a partition of an original data file into a series of display blocks of at least a specified size and wherein each display block is converted to a corresponding string and corresponding header that includes an ordered identifying display block number and a total count of the display blocks in the series, wherein each corresponding string is converted to a corresponding visual code. The method includes converting each of the captured visual codes into a corresponding string and reading a header for the corresponding string. The method includes determining which display blocks have been captured in the series of display blocks. The method includes generating a confirmation message including information indicating which display blocks have been received. The method includes sending the confirmation message over a wireless communication link to the sending device in order to reduce the number of visual codes being displayed by the sending device.

In still another embodiment, a method for confirming receipt is described. The method includes iteratively capturing by a receiving device visual codes in a series of visual codes displayed in a repeating progression on a screen of a sending device, wherein a corresponding captured visual code was generated from a display block that resulted from a partition of an original data file into a series of display blocks of at least a specified size and wherein each display block is converted to a corresponding string and corresponding header that includes an ordered identifying display block number and a total count of the display blocks in the series, wherein each corresponding string is converted to a corresponding visual code. The method includes converting each of the captured visual codes into a corresponding string and reading a header for the corresponding string. The method includes determining which display blocks have been captured in the series of display blocks. The method includes generating a confirmation message including information indicating which display blocks have been received. The method includes displaying the confirmation message for capture by the sending device in order to reduce the number of visual codes being displayed by the sending device.

Other aspects and advantages of the inventions will become apparent from the following detailed description, taken in conjunction with the accompanying drawings, which illustrate by way of example the principles of the inventions.

BRIEF DESCRIPTION OF THE DRAWINGS

FIG. 8A illustrates a series of headers that might be used when partitioning an original data file (e.g., an image file), in accordance with an example embodiment.

FIG. 8B illustrates a process for capturing a series of blocks, in accordance with an example embodiment.

FIG. 10C illustrates the transferring of data files by groups, and the generating and delivery of confirmation messages associated with each group as feedback, in accordance with one embodiment of the present disclosure.

FIG. 13A is a flowchart of a process for transferring an encrypted original data file (e.g., an image file) from a mobile device to an image-capturing device, in accordance with an example embodiment.

FIG. 13B is a flowchart of a process for transferring a digitally-signed original data file (e.g., an image file) from a mobile device to an image-capturing device, in accordance with an example embodiment.

FIG. 13E is a flowchart of a process for transferring an encrypted original data file (e.g., an image file) and certificate from a mobile device to an image-capturing device, in accordance with an example embodiment.

FIG. 13F is a flowchart of a process for transferring a digitally-signed original data file (e.g., an image file) and certificate from a mobile device to an image-capturing device, in accordance with an example embodiment.

FIG. 13G is a flowchart of a process for transferring a digitally-signed and encrypted original data file (e.g., an image file) and certificate from a mobile device to an image-capturing device, in accordance with an example embodiment.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Verification and Certification Using a Block Chain

In one embodiment, a ShoCard Identity Platform is a technology layer that interacts with a blockchain. The blockchain can then securely hold data used for certifying identity transactions. For example, a blockchain technology forms the heart of the cryptocurrency, Bitcoin. In addition, the blockchain technology is used by several integrated systems provided by ShoCard, e.g., for systems other than currency transactions, in embodiments of the present invention.

In one use example, to register with ShoCard, a certification process is processed. In one embodiment, a user can scan using a mobile device a driver's license or passport, and a software application or device grabs the individual field within that, such as name, license number, passport number, date of birth (or other data). The data may also be gathered individually or manually. The data is then processed to produce a hash of the data. In this example, the private key that is on the mobile device can be used to create a digital signature of that hash, and that's the piece of data that is stored to the blockchain. In one configuration, the various fields are put together in one record to create an ID for that user.

If the user then provides the raw data with a public key and a pointer to that record on the blockchain, the data can be verified. This provides a correlation between the data that the user has on the mobile device and what's on the blockchain.

In still other embodiments, following the registration process, users can be certified by some other trusted party such as a bank or KYC checking company, which then issues a certification for the user. By way of example, these certifiers can use their private key to write the records on the blockchain, pointing to that user's record entry that's also on the blockchain. This may be referred to as a ShoCard ID, or generally, the User ID. In this example, there are two steps: one is the registration where hash signatures of the individual fields are placed on the blockchain; and the second one is a certification.

Figure 1:
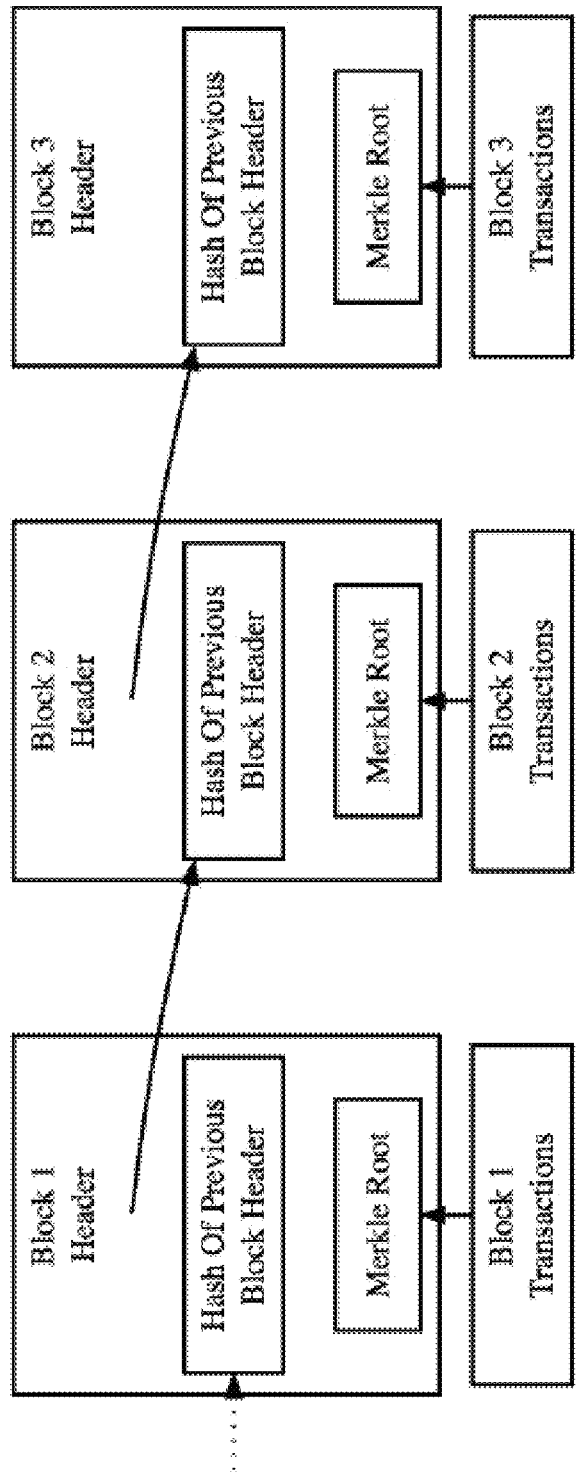
FIG. 1 illustrates the implementation of a blockchain to ensure the integrity of the data embedded within, in accordance with one embodiment of the present disclosure.

FIG. 1 shows a simplified version of a block chain. A block of one or more new transactions is collected into the transaction data part of a block. Copies of each transaction are hashed, and the hashes are then paired, hashed, paired again, and hashed again until a single hash remains, the merkle root of a merkle tree. The merkle root is stored in the block header. Each block also stores the hash of the previous block's header, chaining the blocks together. This ensures a transaction cannot be modified without modifying the block that records it and all following blocks.

Understanding the basics discussed above, the system and methods process operations referred to as "sealing" and "certifying." Sealing is the process of hashing and encrypting the user's ShoCard data and storing it in the blockchain. Once it is sealed in the blockchain, the data becomes a permanent record. The user may change his or her ShoCard ID, but the user will have to re-Seal it, and create a new blockchain record. No readable information is stored in the blockchain, only an indecipherable hash that can only be unlocked by a corresponding private key, which is always controlled by the user.

"Certifying" the ShoCard ID is the process of another party acknowledging the accuracy of your ShoCard ID and marking it so they will recognize it as accurate again in the future without having to see any other evidence of identity beyond your ShoCard ID. To certify a ShoCard ID, you send your encrypted ShoCard ID to the certifier. The certifier will decrypt it and match the hash the user sent them to the hash stored in the blockchain. This proves that the user has the private keys that created both records. If the certifier is satisfied that the user is as identified, the certifier can create a new record with their own private keys that references the user's ShoCard ID. In the future, when the user presents his or her ShoCard ID, they will check their certification to make sure the user is presenting the same ShoCard ID, previously certified.

Figure 2:
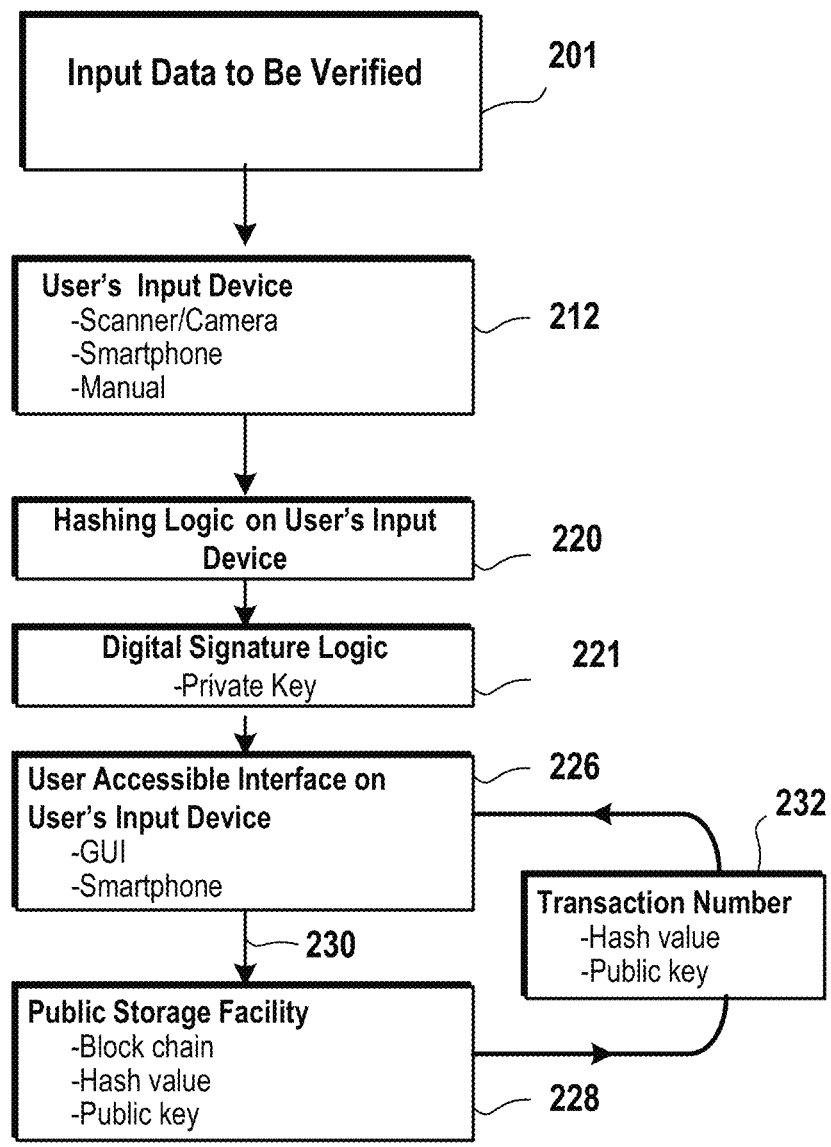
FIG. 2 shows a simplified block diagram of a system and method for sealing any input data in a public storage facility, in accordance with one embodiment of the present disclosure.

FIG. 2 shows a simplified block diagram of a system and method for sealing any input data in a public storage facility. As noted above, the operations to be performed by the hashing logic 220 can proceed directly after receiving the user information from the input device 212. In this embodiment, the hashing logic 220 is used for hashing the input data (e.g., personal information collected) to provide or generate a hash value. The hash value is sometimes referred to as "hash data," that is generated by an algorithm. In an example embodiment, hashing logic 220 might be software, firmware, hardware, or any combination thereof, and consist of one or more hashing algorithms, e.g., a Secure Hash Algorithm (SHA) algorithm. Hashing logic 220 passes the hash value to digital-signature logic 221, which performs a digital signature on the hash value, using the private key on the input device 212. In an example embodiment, digital-signature logic 221 might be a component (or module) of encryption logic. In other embodiments, the digital-signature logic 221 may be defined by separate code, firmware, and/or hardware.

In one embodiment, the digital-signature logic 221 then passes the signed hash value and the public key to a user accessible interface 226 (e.g., a graphical user interface or GUI), which might be other software running on the input device 212. In an example embodiment, the user accessible interface 226 might be part of an application or app that includes encryption logic, hashing logic 220, and digital-signature logic 221, and/or other modules or code. The user accessible interface 226 might be used by the user to transmit the digitally signed hash value and the public key to a public storage facility 228 via a line 230, and receives back from the public storage facility 228 a transaction number 232 corresponding to the transmitted hash value and public key. In an alternative example embodiment, only the signed hash value might be transmitted to public storage facility 228 by the user and persons retrieving the signed hash value might obtain the public key from elsewhere (e.g., the user, a public database, an Internet repository, a website, etc.). As is well known, there is no need to keep public keys secure, and in fact, the algorithms using public/private key pairs are design to enable full sharing of public keys. The private key, on the other hand, must be kept secure, as noted above.

In one embodiment, the public storage facility 228 can take the form of a block chain (e.g., in a bitcoin online payment system) or any other public or private distributed database. The public storage facility 228 is connected to a communication link via a line and can be adapted to communicate over a public computer network, the internet, an intranet, an extranet, or any private communication network. Broadly speaking, the public storage facility 228 is accessible by any device that has an Internet connection over a network.

As indicated above, in an example embodiment, the input data might be hashed and the resulting hash value might be signed with a digital signature, created using a private key paired with a public key, before transmission, optionally along with the public key, from the input device (e.g., a user's smartphone) 212 to the public storage facility 228 for storage. The user accessible interface 226 is thus adapted to "seal" the signed hash value and the public key in the public storage facility 228. In one embodiment, once the hash value, and, optionally, the public key of the user is written to the block chain in a transaction, a later verification may be made if another party is able to hash the same input data.

Figure 3:
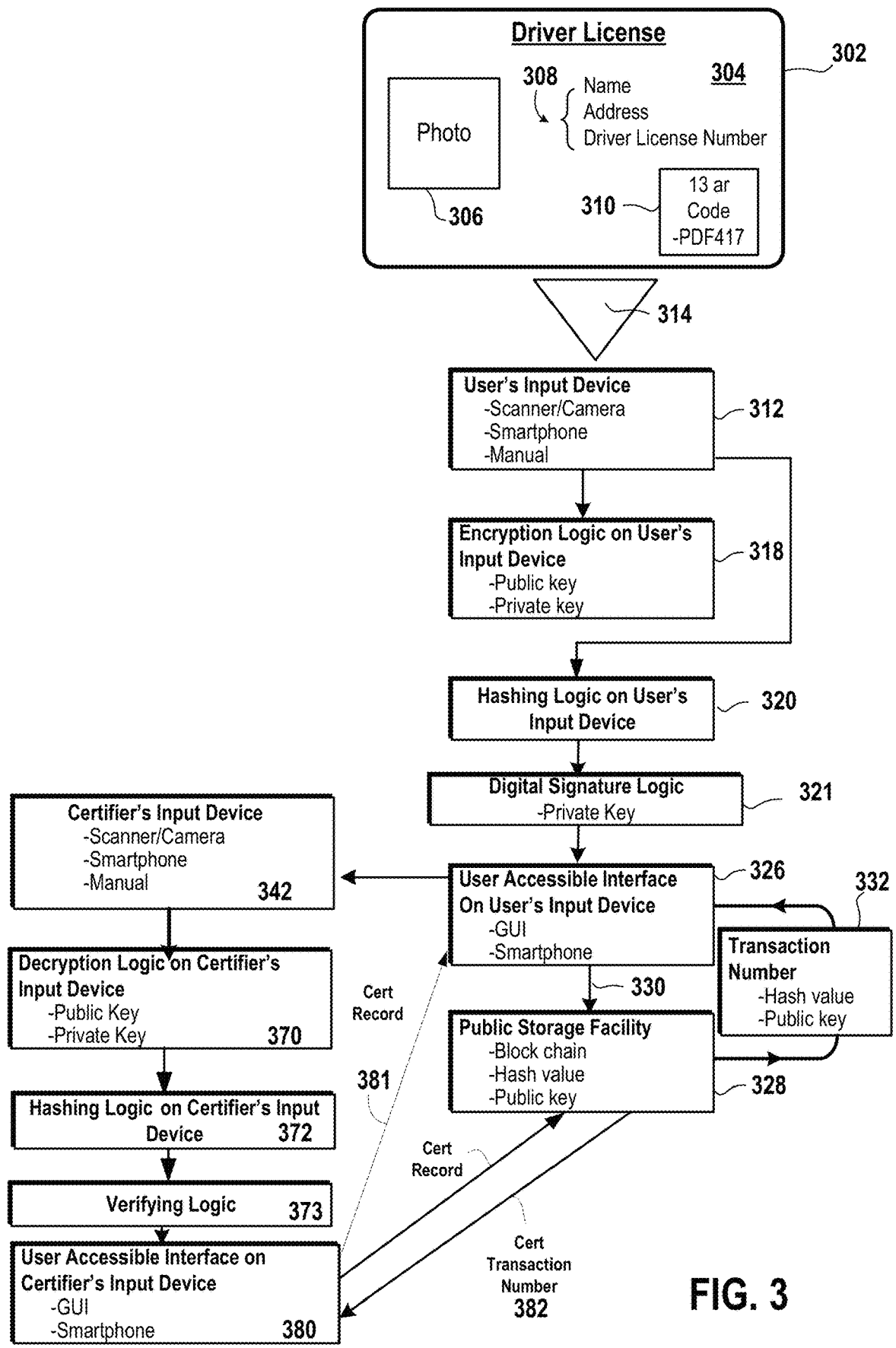
FIG. 3 shows a simplified block diagram of a system and method for certifying an identity of a person, in accordance with one embodiment of the disclosure.

FIG. 3 shows a simplified block diagram for a certification method for managing the identity of a user in a public storage facility 328. By way of example, an identification card 302 may be used. In other embodiments, other forms of identification, which may be digital or non-digital may be used. In the example of the identification card 302, personal data 304 is contained thereon, which identifies the user. The input data can include a photo 306 of the user; the user's name, address and driver license number 308, and/or a bar code 310 or similar computer code for storing, scanning and/or retrieving additional data. Such coding can include PDF417 codes, QR codes, and other such codes. However, it is not necessary to have such code and the identification card may only have human-readable text strings. As noted above, the identification card 302 may also take a physical or a digital form and the information can be retrieved either through scanning a code as described, performing Optical Character Recognition (OCR) on text strings, digitally transferring a digital identification card from one system to another, manually inputting the information using a keyboard, manually inputting the information using voice recognition, etc., in example embodiments.

The identification card 302 can be a government issued form of identification such as a driver license, passport, employee badge, military identification, political documentation, or the like. The identification card 302 can also be a privately issued form of identification such as a student ID, library card, social club car, or any other form of identification issued by a third party.

In one embodiment, as indicated by triangle 314, an input device 312 may be used to input such personal data from the identification card 302 to provide input data. Input device 312 can take many forms. For example, input device 312 can be a digital scanner, digital camera, or smartphone (e.g., with the camera commonly found in smartphones) for reading data from the identification card 302, including any codes appearing on the card 302. The input device 312 can also be a device for manually inputting personal data such as a keyboard, touchscreen, voice recognition device, handwriting recognition device, or other manual input device.

As shown in FIG. 3, the input data can be optionally encrypted by encryption logic 318 and securely stored. In one implementation, the input data is transferred directly to hashing logic 320, without passing through encryption logic 318. For ease of understanding, the operations of the optional encryption logic 318 will be discussed first, and then the operations processed by the hashing logic 320. As such, the process may proceed directly from receiving the user information via 312 to the hashing logic 320.

The input data collected from the input device 312 (e.g., a user's smartphone) is passed to encryption logic 318 on input device 312. In an example embodiment, encryption logic 318 might include software, firmware, hardware, or any combination thereof, and consist of one or more encryption algorithms, e.g., an RSA encryption algorithm. Encryption logic 318 encrypts the input data with a public key to provide encrypted data. The public key is paired with an associated private key as is conventional when generating such keys using an RSA encryption algorithm, an Elliptic Curve Digital Signature Algorithm (ECDSA), or other encryption algorithm known to those skilled in the art. This encrypted data can then be stored locally on the input device 312 for added security. It can then only be accessed with the private key of the user on the input device 312, which might be stored in a more secure part of input device 212, e.g., "the Keychain", if input device 312 is an iOS (e.g., operating system used by devices made by Apple, Inc.) smartphone. If the device is of a different type, e.g., one using an Android OS (e.g., operating system by Google, Inc.), similar secure device storage methods may be used. In this manner, for added security, the private key is not compromised and is kept safely on the input device 312. It should be understood that the private key may be stored on another device, but similar or additional security should be processed to ensure that the private key is not compromised.

As noted above, the operations to be performed by the hashing logic 320 can proceed directly after receiving the input data from the input device 312. In this embodiment, the hashing logic 320 is used for hashing the input data (or selected fields of the input data or personal data) to provide or generate a hash value. The hash value is sometimes referred to as "hash data," that is generated by an algorithm. In an example embodiment, hashing logic 320 might be software, firmware, hardware, or any combination thereof, and consist of one or more hashing algorithms, e.g., a Secure Hash Algorithm (SHA) algorithm. Hashing logic 320 passes the hash value to digital-signature logic 321, which performs a digital signature on the hash value, using the private key on the input device 312. In an example embodiment, digital-signature logic 321 might be a component (or module) of encryption logic 318. In other embodiments, the digital-signature logic 321 may be defined by separate code, firmware, and/or hardware.

In one embodiment, the digital-signature logic 321 then passes the signed hash value and the public key to a user accessible interface 326 (e.g., a graphical user interface or GUI), which might be other software running on the input device 312. In an example embodiment, the user accessible interface 326 might be part of an application or app that includes encryption logic 318, hashing logic 320, and digital-signature logic 321, and/or other modules or code. The user accessible interface 326 might be used by the user to transmit the digitally signed hash value and, optionally, the public key to a public storage facility 328 via a line 330, and receive back from the public storage facility 328 a transaction number 332 corresponding to the transmitted hash value and public key.

In one embodiment, the public storage facility 328 can take the form of a block chain (e.g., in a bitcoin online payment system) or any other public or private distributed database. The public storage facility 328 is connected to a communication link via a line and can be adapted to communicate over a public computer network, the internet, an intranet, an extranet, or any private communication network. Broadly speaking, the public storage facility 328 is accessible by any device that has an Internet connection over a network.

As indicated above, in an example embodiment, the input data (or selected fields of the input data) might be hashed and the resulting hash value might be signed with a digital signature, created using a private key paired with a public key, before transmission, along with, optionally, the public key, from the input device (e.g., a user's smartphone) 312 to the public storage facility 328 for storage. The user accessible interface 326 is thus adapted to "seal" the signed hash value and the public key in the public storage facility 328. In one embodiment, once the hash value, and, optionally, the public key of the user is written to the block chain in a transaction, a later verification may be made if another party is able to hash the same input data.

The user accessible interface 326 (e.g., a GUI) can be controllable by the user of the input device 312 to encrypt and provide the transaction number 332, the input data (or selected fields of the input data), and, optionally, the public key to an input device 342 (e.g., a smartphone) of a certifier. In an example embodiment, the encryption might be performed by the encryption logic 318 using a public key of a certifier paired with a private key of the certifier. Then, coding logic on the input device 312 might code the encrypted transaction number 332, the input data (or selected fields of the input data), and, optionally, the public key into a barcode or QR code and the certifier might use input device 342 to scan the barcode or QR code and decode it to gain access to the encrypted items. Thereafter, the certifier might decrypt the encrypted items using the private key of the certifier and verify them, e.g., using a "verify" function call to an RSA algorithm as explained in further detail below.

Once the certifier's input device 342 receives the barcode or QR code, decoding logic on the certifier's input device 312 might decode the barcode or QR code and decryption logic 370 on the certifier's input device 342 might use the certifier's private key to decrypt the encrypted items. In an example embodiment, decryption logic 370 might be a component (or module) of more general encryption logic. In one embodiment, the decrypted input data (or selected fields of the input data) might be hashed into a hash value by hashing logic 372 on the certifier's input device 342, using the same hashing algorithm that was used to create the hash value that was digitally signed by the user. And the decrypted transaction number 332 might be used by a user accessible interface 380 (e.g., a GUI) to access the public storage facility 328 (e.g., the block chain) and retrieve the signed hash value and public key of the user. The retrieved signed hash value, the generated hash value, and the retrieved or obtained public key might then be input to verifying logic 373 for verification (e.g., through a "verify" function call to an RSA algorithm), which outputs a "true" value if the two hash values are the same and the public key is associated with the signature or a "false" value if the two hash values are not the same or the public key is not associated with the signature. In an example embodiment, verifying logic 373 might be a component (or module) of decryption logic 370. In another embodiment, the verifying logic 373 may be a separate module, software, firmware and/or hardware. As indicated above, in an example embodiment, the public key of the user might be obtained from some other source than the public storage facility 328 (e.g., from the user), in an example embodiment.

Transferring Large Data Sets Using Visual Codes

It is desirable for two devices to communicate with one another even if there is no connectivity between the devices. The assumption is that the devices have no internet connectivity, Wi-Fi connectivity, compatible Bluetooth, NFC, or other communication capability. This might be the case if the devices are from different manufacturers (e.g., Apple and Samsung running iOS and Android, respectively) or if they are in a location where there is no connectivity option available. For example, one user may be met with a police officer who wishes to share the individuals' data, but they are in a faraway mountainous area without connectivity. Another example is when an individual travels to another country and doesn't have connectivity. This is also common when a passenger wants to share a digital identity when traveling to another country where he/she does not have internet coverage.

Small sets of data can be passed by creating a QR code (or equivalent) on one device and having a second device scan that QR code (or equivalent). However, such codes are typically limited in size and usually carry up to a maximum of 2 k or 4 k bytes of data. If a user wishes to share larger sets of data, such as images of a drivers' license, image of a passport, meta-data about the user, a selfie image of the user or other such data that usually requires larger sets of data, using a QR Code or equivalent typically cannot accommodate the need.

To accommodate this need, the user intending to send data might use software (e.g., a mobile-device app) to break up the large data set into smaller chunks that can each fit into a smaller QR Code (or equivalent). Each block needs to be appended with sufficient control information so that it is uniquely identified as the given block in the sequence of blocks. For example, a 20 k block of data can be broken up into 10 2 k blocks and each block can have a reference number of the block number it belongs to and a count of the total blocks. Some of the information might be maintained in the first block or repeated in each block. Hence, a block of data in its simplest form might have the form:

<block-number>,<total-blocks>.<data>

Any form of syntax might be used to separate out the fields. In this example, commas and periods are used, but any equivalent format can be utilized. The sender might use a mobile-device app to rotate between each QR code and display each one briefly. When the last QR code is displayed, the mobile-device app might rotate again and begin from the first QR code and continuously loop so long as the data is being shared and until the user closes the code-display screen. The mobile-device app swapping through the QR codes might determine how quickly the QR codes rotate. A number of variables can influence the speed that the mobile-device app might rotate the QR codes. For example, if the quality of scanner is good in terms of accuracy, then the speed of rotation might be greater and/or the block sizes might be denser (which results in fewer blocks being needed to pass the entire data).

On the receiving side, software on the second device must then scan the screen of the first device with the QR codes until all blocks are read. It is most likely that the blocks will not be scanned in sequence as the scanner may skip some blocks and will need to pick them up on a subsequent rotation. The software on the second device must keep track of the total blocks and account for each unique block that has been read. Once all blocks are accounted for, it can assemble the data of the blocks together according to their sequence numbers and form one single data block that represents the original data set that the sender had sent over.

The assumption in a secure-envelope exchange is that the two users already know one another and are aware of each other's SealId, e.g., an identifier that identifies a user for purposes of identification software, e.g., which might be distributed as a mobile-device app. Additionally, each of the two users will have access to the public key associated with the private key which the other user used to seal his/her identification. User A intends to send a block of data to User B. User A places that data in a data block and may add additional identification fields to that block of data such as timestamp, the User A's own SealId, User B's SealId, User A's public key and, if there is a session between the two, a sessionId. The value of the timestamp and the sessionId is to ensure vitality of the data block versus one that may have been created and somehow reused again. This data block will be referred to as <dataBlock>. Next, User A uses his/her own private key to digitally sign the <dataBlock> that was created. The result is <envelopeSignature>. Next, an <envelopeContent> is created by putting together the <dataBlock> and the <envelopeSignature>. Then, a <secureEnvelope> is created by encrypting the <envelopeContent> with User B's public key. This secure envelope can now be transmitted to user B directly. User B can view the <envelopeContent> by decrypting the <secureEnvelope> using his/her private key that no one else has access to. User B might then verify the <dataBlock> in the envelope content by verifying the <dataBlock> and the <envelopeSignature> with the User A's public key that was passed. User B might also verify that this is the same public key that was used in User A's SealId. There is no restriction as to how User A passes the secure envelope to User B. It can be done via email, a text message, NFC, or any other form of digital communication where the data can be passed, including through the visual codes described in the present application. Because it is encrypted using User B's public key, only User B can view the message and no other user can modify it either. In fact, after the secure envelope is created, even User A can no longer view its content.

Figure 4A:
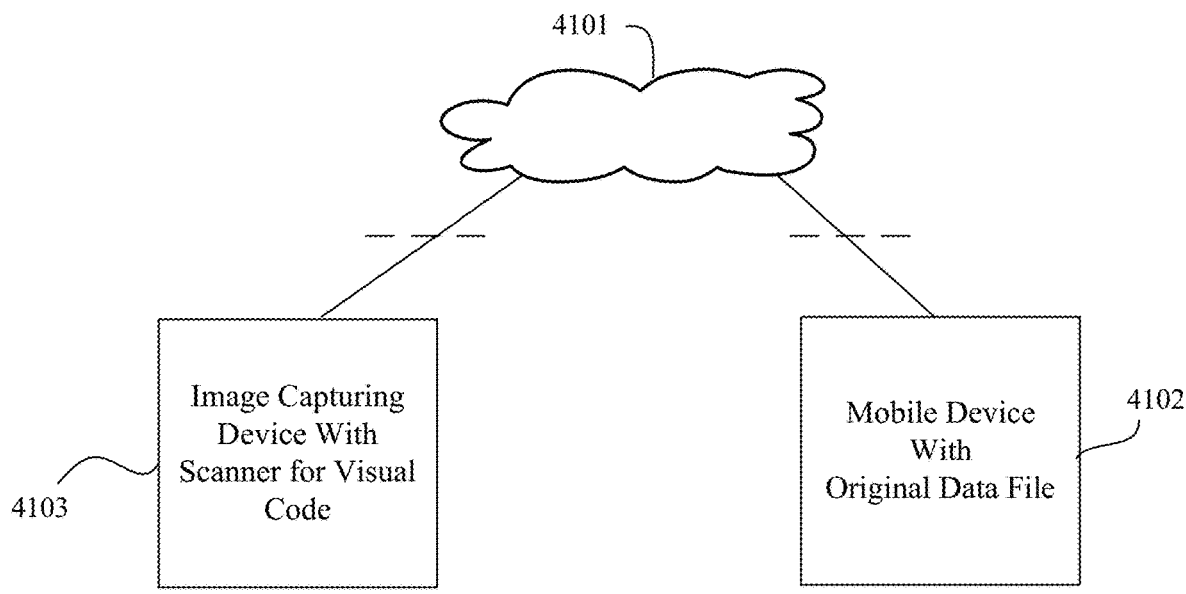
FIG. 4A is a use-case diagram, in accordance with an example embodiment.

FIG. 4A shows a use-case diagram, in accordance with an example embodiment. As depicted in the figure, two devices, 4102 and 4103, are proximate to each other but have no network connection between them, due to device incompatibility, lack of network support, suppression of network support, etc.; this is indicated by the dashed lines crossing the lines connecting the devices to the network 4101.

In an example embodiment, device 4102 is a mobile device such as a smartphone on which an original data file (e.g., an image file) is stored, e.g., in volatile memory or persistent storage, and device 4103 is an image-scanning device such as a smartphone, a kiosk, a handheld scanner, etc. Also, in an example embodiment, device 4102 includes functionality (e.g., hardware, firmware, and/or software) for converting a data file into a QR code such as a 1-D barcode, a 2-D (or matrix) barcode, a 3-D barcode, etc. And device 4103 includes functionality (e.g., hardware, firmware, and/or software) for capturing (or scanning) a visual code such as a 1-D barcode, a 2-D (or matrix) barcode, a 3-D barcode, etc. Examples of 2-D (or matrix) barcodes which might be used with the example embodiments described herein include: Aztec Code, Code 1, ColorCode, Color Construct Code, CrontoSign, CyberCode, d-touch, DataGlyphs, Data Matrix, Dastastrip Code, digital paper, EZcode, High Capacity Color Barcode, Han Xin Barcode, HueCode, InterCode, MaxiCode, MMCC, NexCode, Nintendo e-Reader Dot code, PDF417, Qode, QR code, ShotCode, SPARQCode, and VOICEYE.

More generally, devices 4102 and 4103 might include (1) hardware consisting of one or more microprocessors and/or microcontrollers (e.g., from the ARM family or the x86 family), volatile storage (e.g., RAM), and persistent storage (e.g., flash memory such as microSD) and (2) an operating system (e.g., Android, iOS, Chrome OS, Windows Phone, Linux, Firefox OS, etc.) that runs on the hardware. Additionally, devices 4102 and 4103 might include a screen capable of displaying a visual code (e.g., a 2D or matrix barcode) and a camera or barcode scanner capable of capturing a visual code (e.g., a 2D or matrix barcode).

In an example use case, a law enforcement officer in a patrol car might pull over a driver in a remote location. The driver might be the user of device 4102, a smartphone, and the original data file might be an image file depicting the driver which was taken by a DMV (Department of Motor Vehicle) official, e.g., for a driver license. The law enforcement officer might be the user of device 4103, which is also a smartphone, which might have network connectivity to physical storage in the patrol car storing a database of DMV images for drivers licensed in a jurisdiction. Or the patrol car might have network connectivity to a public or private block-chain database storing DMV images for drivers licensed in a jurisdiction. The law enforcement officer may not have any connectivity to his patrol vehicle or an internet, but may still wish to extract the driver license information from the driver via device 4102 for partial validation.

In another example use case, the user of device 4102, a smartphone, might be a traveler and the original data file might be an image file depicting the traveler which was taken for a state department, e.g., for a passport. Device 4103 might be an airline kiosk, which might have network connectivity to physical storage at the airline or at the state department storing a database of passport images for a jurisdiction. In an example embodiment, the database might be a public or private block-chain database storing passport images for a jurisdiction.

Figure 4B:
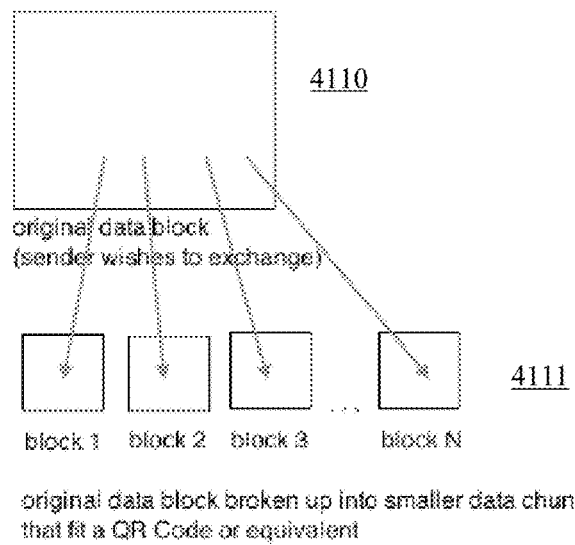
FIG. 4B illustrates a partitioning of a data block into an ordered series of smaller data blocks, in accordance with an example embodiment.

FIG. 4B shows a partitioning of an original data file (or data block) into an ordered series of smaller data blocks, in accordance with an example embodiment. As depicted in the figure, the original data file 4110 is partitioned into N display blocks 4111, each of which can be converted into a visual code such as a QR code. In this regard, it will be appreciated that a 101×101 QR code, with high level error correction, can hold 3248 bits, or 406 bytes. And a 177×177 QR code, depending on desired level of error correction, can store between 1273 and 2953 bytes.

Figure 5A:
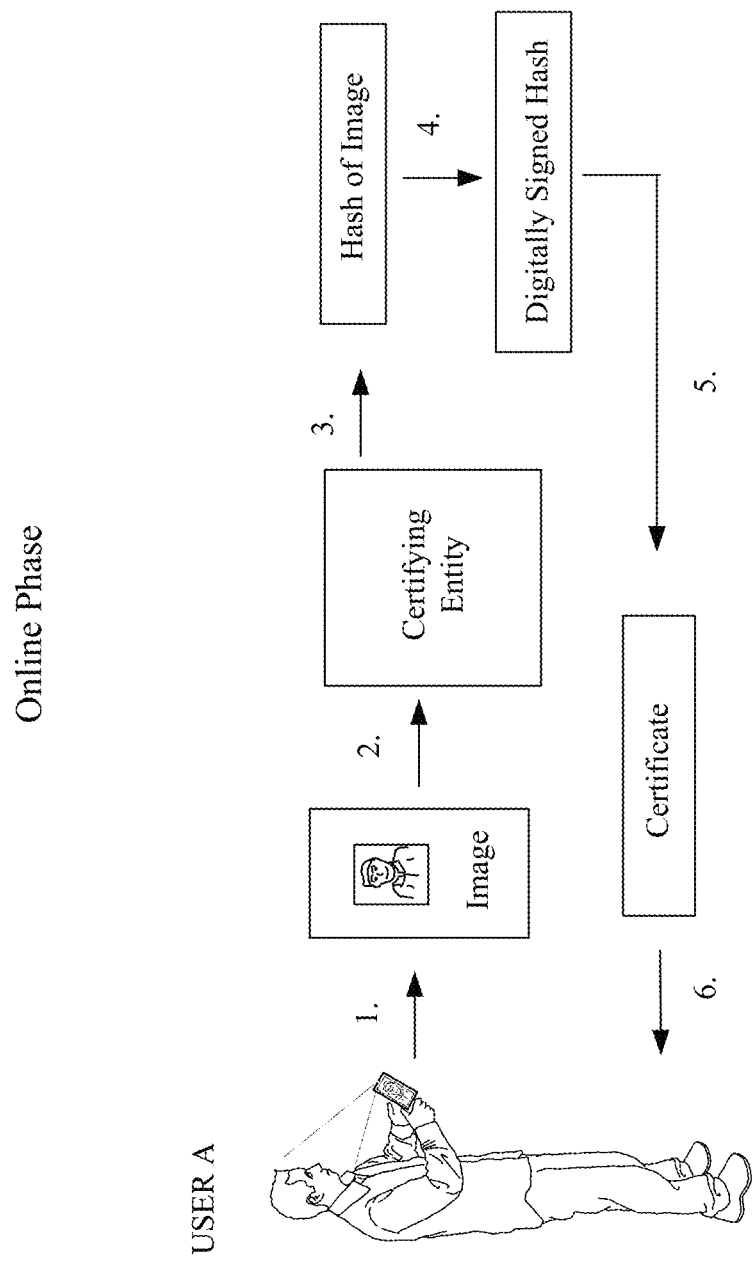
FIG. 5A is a diagram showing an online phase for a use case, in accordance with an example embodiment.

FIG. 5A is a diagram showing an online phase for a use case, in accordance with an example embodiment. In this use case, USER A is the user of a mobile device and takes an image of himself/herself (e.g., a selfie), in operation 1. In operation 2, USER A sends the image to a certifying entity, e.g., an airline, a department of motor vehicles, a state department, etc. In an example embodiment, USER A might use the secure envelopes procedure described earlier when sending the image to the certifying entity. In operation 3, the certifying entity hashes the image and digitally signs the hash, e.g., using the certifying entity's private key, in operation 4. Then in operation 5, the certifying entity adds certifying data (e.g., a timestamp, a block-chain identifier, etc.) to the signed hash to create a certificate and sends the certificate to USER A (e.g., using a secure envelope), in operation 6. In an example embodiment, the certifying entity might also send USER A a public key associated with the private key that was used to digitally sign the hash. As indicated in the figure, all of the operations shown in the figure might be handled online and facilitated by networks.

Figure 5B:
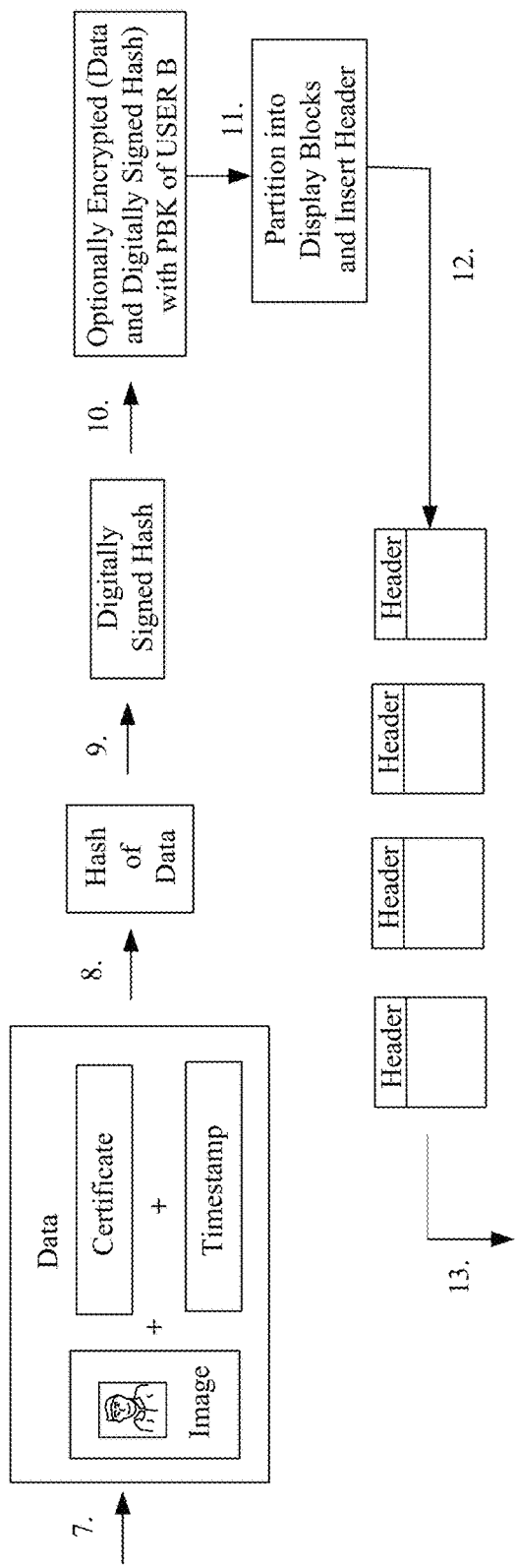
FIG. 5B is a diagram showing an offline phase for a use case, in accordance with an example embodiment.
Figure 5B:
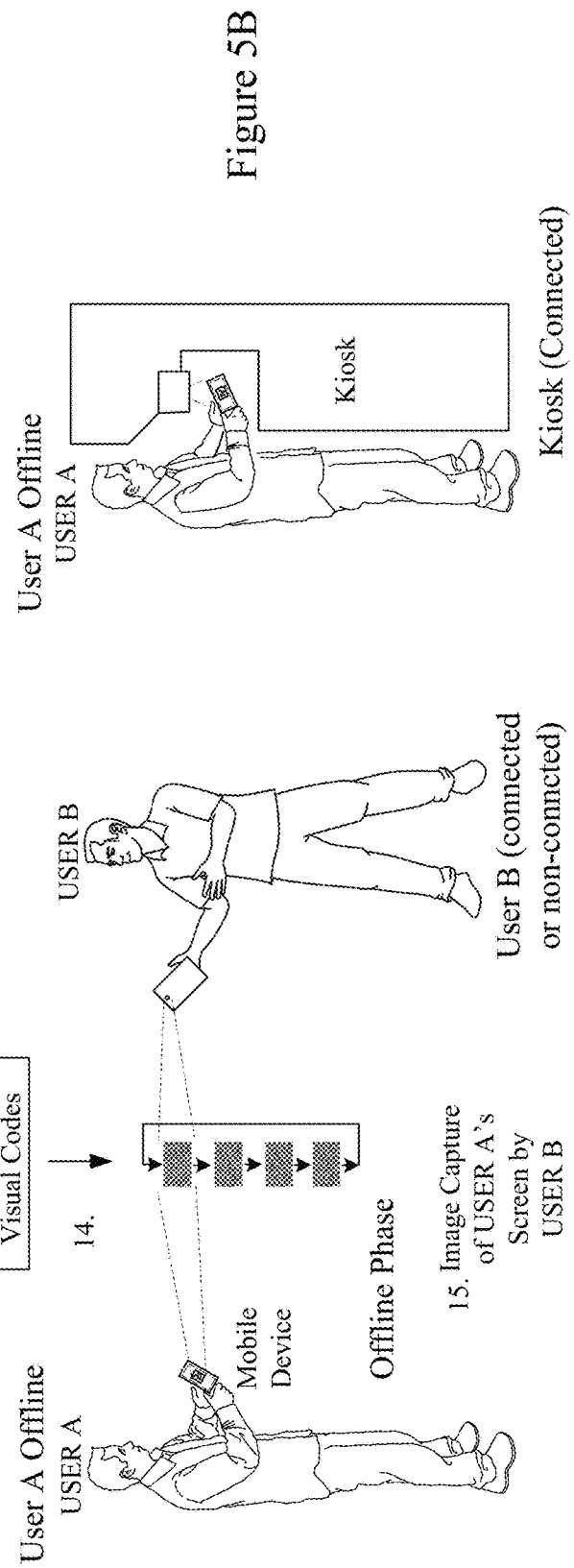

FIG. 5B is a diagram showing an offline phase for the use case, in accordance with an example embodiment. This figure depicts a continuation of the use case in FIG. 5A. As indicated in the figure, USER A receives the certificate from the certifying entity, in operation 7, during the last operation in the online phase, and combines the certificate with the image and optionally, a timestamp in a data file (or other data block). In operation 8, USER A hashes the data file and then digitally signs the hash in operation 9, using USER A's private key. In operation 10, USER A optionally encrypts the data file and the signed hash, using USER B's public key. Then in operation 11, software on USER A's mobile device partitions the encrypted or non-encrypted data file and hash into a number of display blocks, where the size of each of the display blocks is less than the maximum size specified for a visual code, e.g., a QR code. Then in operation 12, the software adds a header to each of the display blocks and, in operation 13, generates a single visual code for each display block. In operation 14, the visual codes are displayed on a screen (e.g., a touchscreen) on USER A's mobile device, e.g., as described in the processes below. And in operation 15, USER B uses his/her mobile device to capture the visual codes, which are coalesced back into the data file by software on USER B's mobile device. As indicated in the figure, operations 8 through 15 might be performed offline without a facilitating network, in an example embodiment. In alternative use cases also depicted in FIG. 5B, USER A (e.g., standing at a kiosk) and/or USER B might be connected to a network (e.g., a local area network (LAN), a wide area network (WAN) including the Internet, a network which might be wireless in part or in whole, etc.).

Figure 5C:
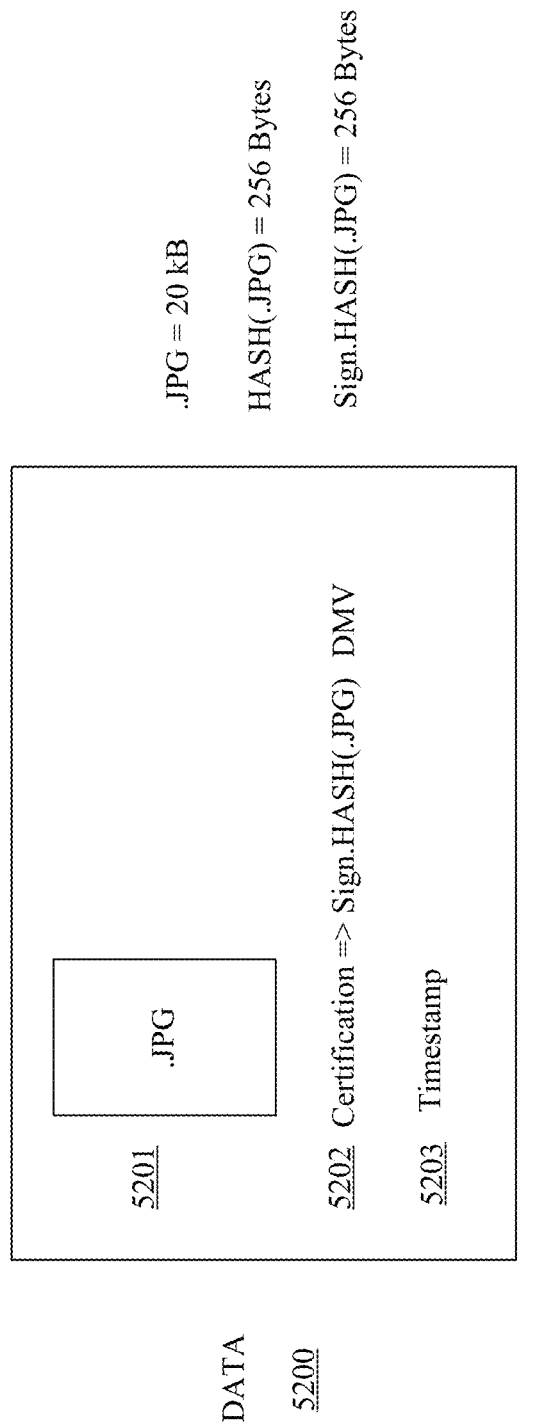
FIG. 5C is diagram showing byte sizes for items of data in a data file, in accordance with an example embodiment.

FIG. 5C is diagram showing byte sizes for items of data in a data file, in accordance with an example embodiment. As indicated in the figure, the data file (or other data collection) might include an image file 5201, a certificate 5202 which includes a signed hash, and a timestamp 5203. By way of illustration and not by way of limitation, the size of the image file might be approximately 20 kilobytes (kB) and the size of the certificate might be approximately 256 bytes. In other example embodiments, the size of the image file might be relatively greater or smaller than the size in this example and the size of the certificate might be relatively greater or smaller than the size in this example.

Figure 6:
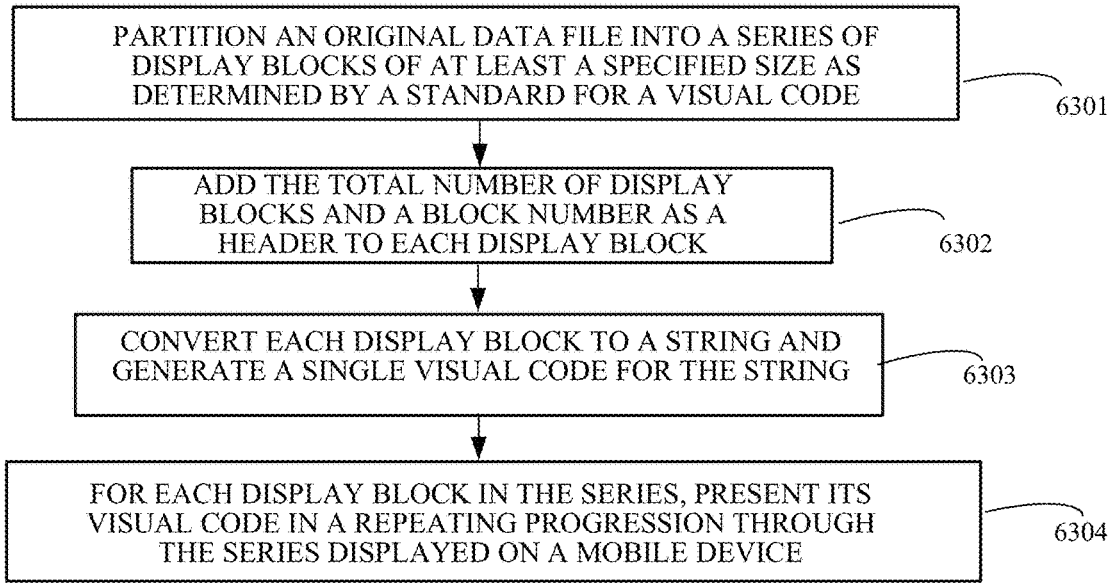
FIG. 6 is a flowchart of a process for transferring an original data file (e.g., an image file) from a mobile device to an image-capturing device, in accordance with an example embodiment.
Figure 6:
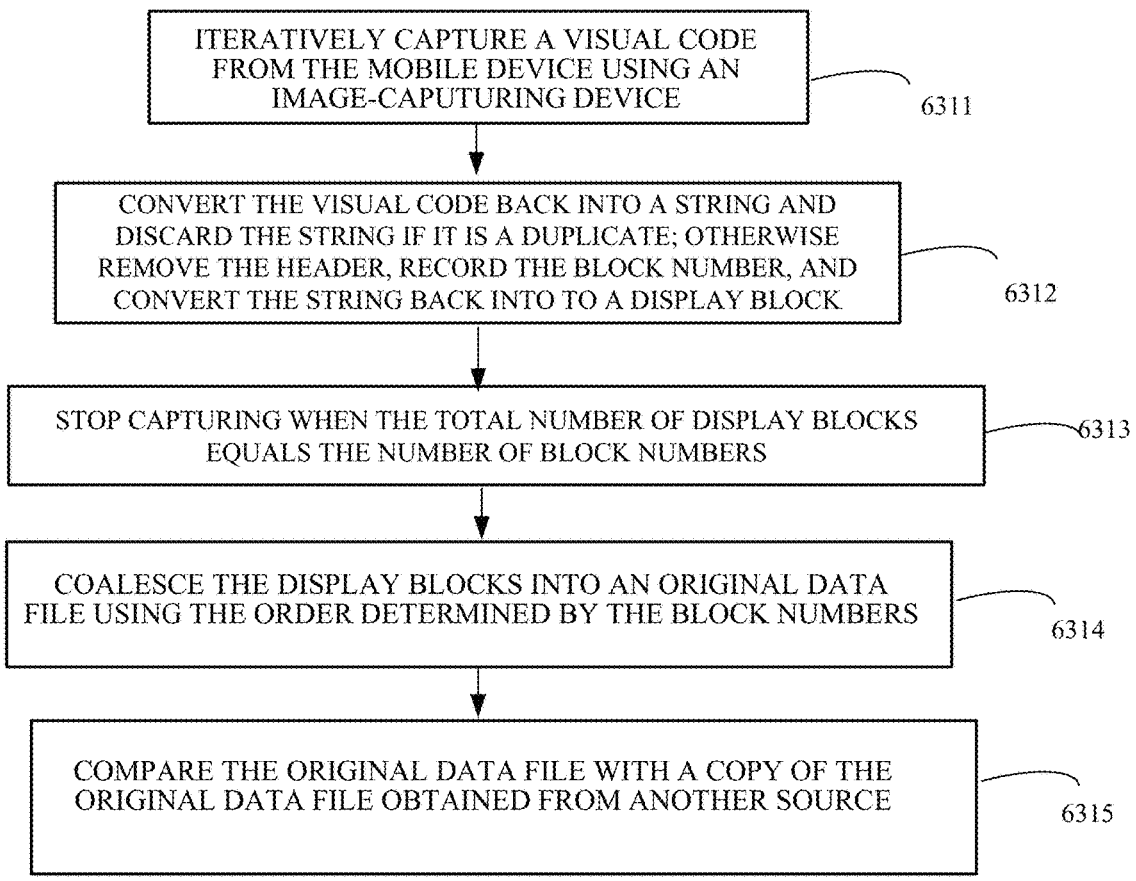

FIG. 6 is a flowchart of a process for transferring an original data file (e.g., an image file) from a mobile device to an image-capturing device, in accordance with an example embodiment. In an example embodiment, all of the operations in this process might be performed in real time or near real time by software (e.g., applications or apps distributed by a server at a website) running on the devices depicted in the above figures. In an alternative example embodiment, some or all of the operations in this process might be performed in real time or near real time by software running on a server at a website.

As depicted in FIG. 6, software on a mobile device (e.g., mobile device 4102 in FIG. 4A, which might be smartphone) partitions an original data file (e.g., an image file) into a series of display blocks of at least a specified size, e.g., as determined by the size limitations of a standard for a visual code such a QR code, in operation 6301. Then in operation 6302, that software adds (1) the total number of display blocks and (2) a block number as a header to each display block. In an example embodiment, the block number is an ordered number specific to the display block. In another example embodiment, the block number might be another ordinal value, e.g., a letter in an alphabet. In operation 6303, the software converts each block to a string and generates a single visual code (e.g., a QR code) for the string, in an example embodiment. Then in operation 6304, the software presents each of the resulting visual codes in a repeating progression through the series displayed on the mobile (or sending) device. In an alternative example embodiment, the visual codes might be replaced by oral codes, e.g., if a standard permits the use of oral codes.

As also depicted in FIG. 6 (at the bottom of the figure below the dashed dividing line), software on an image-scanning device (e.g., image-scanning device 4103 in FIG. 4A, which might be a smartphone, a kiosk, a handheld scanner, etc.) iteratively captures a visual code from the mobile (or sending) device, in operation 6311. Then in operation 6312, that software converts the visual code back into a string and discards the string if it is a duplicate. Otherwise the software removes the header, records the block number, and converts the string back into a display block, in an example embodiment. In operation 6313, the software stops capturing when the total number of blocks equals the number of block numbers and, in operation 6314, the software coalesces (or combines) the display blocks into an original data file (e.g., an image file) using the order determined by the block numbers, in an example embodiment. And in operation 6315, the software compares the original data file (e.g., an image file) with a copy (e.g., an identical copy) of the original data file (e.g., an image file) obtained from another source, e.g., a state department of motor vehicles, the U.S. State Department, the Federal Bureau of Investigations, a block chain, an airline, etc., in an example embodiment.

In another example embodiment, the software on the mobile (or sending device) might generate the visual code directly from a display block with a header, e.g., if the standard for the visual code allows for such a conversion. In that example embodiment, the software on the image-scanning device might convert the visual code directly back into a display block before checking for duplication or removing the header and recording the block number.

In an example embodiment, one or more of the above operations might be performed by a separate thread in a process, in order for the operations to occur in parallel. Also, in an example embodiment, the display block might not be converted into a string prior to generation of a visual code for the display block. For example, the display block might be converted into a byte array or some other byte grouping. In that event, the visual code would not need to be converted back into a string before conversion back into a display block. In other examples, the original data may be converted into another format before transfer such as base64, base128, Hex, Octal, or other formats that allow binary data to be represented in ASCII format.

Moreover, in an example embodiment the original data file might not be an image file. Rather the original data file might be non-image biometric data concerning the user of the mobile device, e.g., fingerprint, voice data, and/or genetic-identification data.

Other use cases for transferring an original data file are described in FIGS. 13A-G, in other embodiments.

Figure 7A:
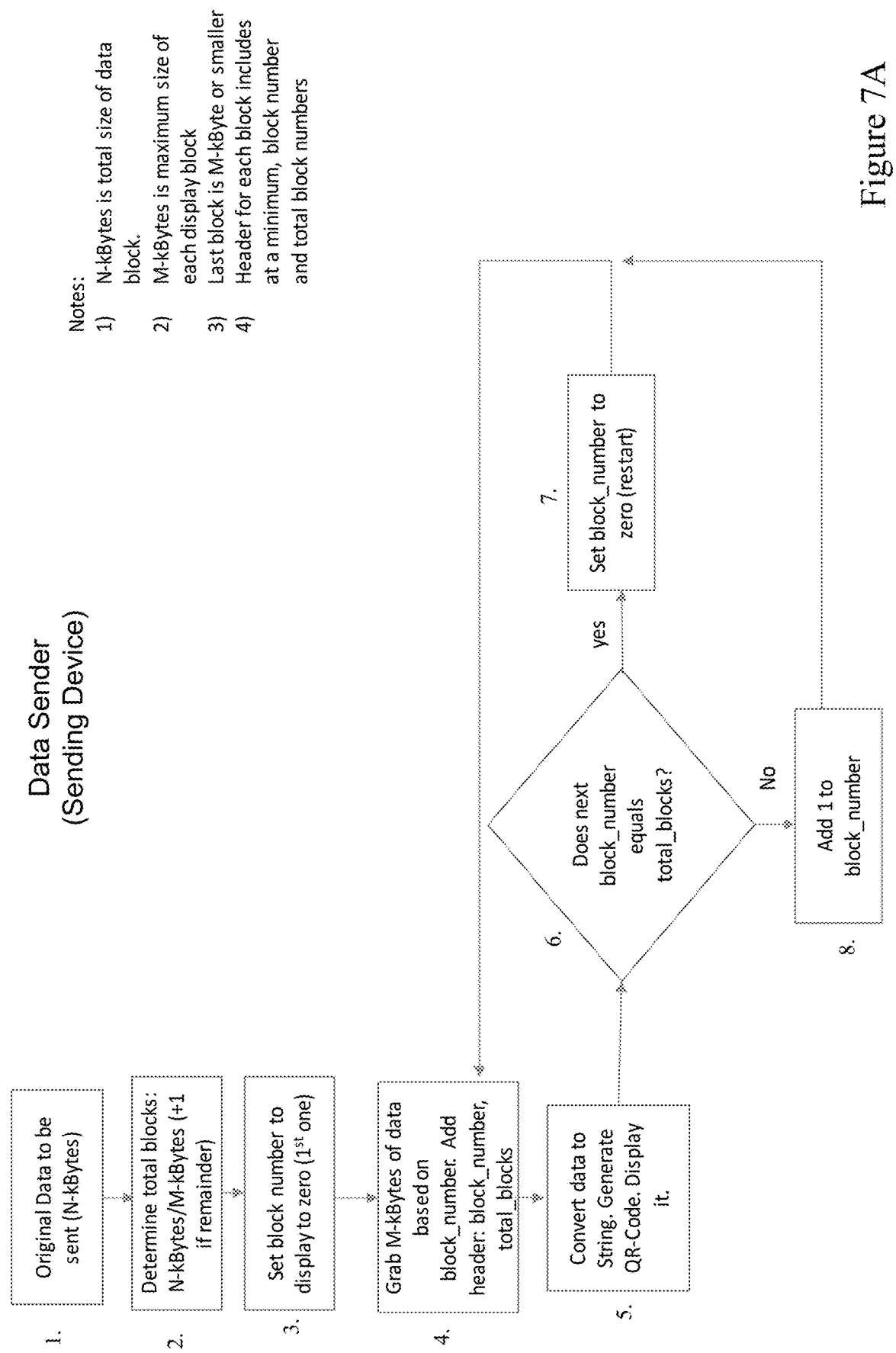
FIG. 7A is a flowchart for a process for partitioning a data block into an ordered series of smaller data blocks, in accordance with an example embodiment.

FIG. 7A is a flowchart for a process for partitioning an original data file into an ordered series of smaller display blocks, in accordance with an example embodiment. In an example embodiment, all of the operations in this process might be performed in real time or near real time by software (e.g., applications or apps distributed by a server at a website) running on the mobile device depicted in the above figures. In an alternative example embodiment, some or all of the operations in this process might be performed in real time or near real time by software running on a server at a website. Also, in an example embodiment, some of the operations in this process might be performed by one thread (e.g., a thread of execution in a computer-program process) and other operations in this process might be performed by another thread.

As depicted in FIG. 7A, software on a mobile device (e.g., mobile device 4102, which might be smartphone) is a data sender. In operation 1, that software determines that the original data file (e.g., an image file) to be sent has a size of N-kBytes (or N kilobytes). In operation 2, the software calculates a count variable, total_blocks (the number of total display blocks) by dividing N-kBytes by a maximum size of M-kBytes (or M kilobytes) for each display block by M-kBytes and incrementing by one if there is any remainder. In operation 3, the software sets block_number (the current block number) for the initial display block to zero. Then in operation 4, the software gets the first M-kBytes of the original data file and adds a header that includes the block_number (which is zero) and total display blocks calculated in operation 2. In operation 5, the software converts the display block with its header into a string, uses the string to generate a QR code, and then displays it as described above on the mobile device. In operation 6, the software determines whether the next block_number (e.g., block_number plus one) equals total_blocks. If so, the software sets block_number to zero, in operation 6, otherwise the software increments block_number by one and returns to operation 4 to get the next M-kBytes of the original data file.

Figure 7B:
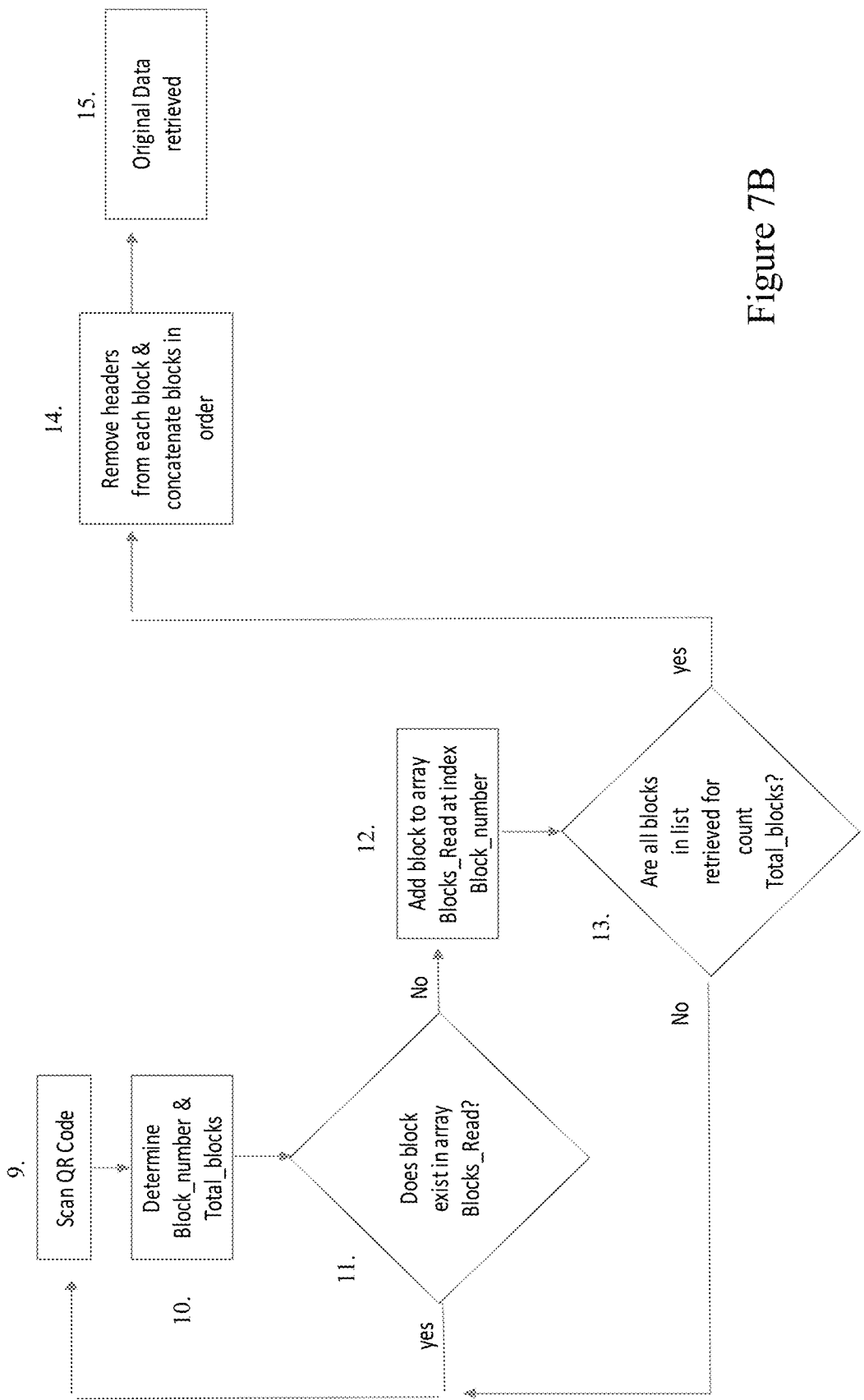
FIG. 7B is a flowchart for a process for coalescing a data block from captured smaller data blocks, in accordance with an example embodiment.

FIG. 7B is a flowchart for a process for coalescing a data block from captured smaller display blocks, in accordance with an example embodiment. In an example embodiment, all of the operations in this process might be performed in real time or near real time by software (e.g., applications or apps distributed by a server at a website) running on the image-capturing device depicted in the above figures. In an alternative example embodiment, some or all of the operations in this process might be performed in real time or near real time by software running on a server at a website. Also, in an example embodiment, some of the operations in this process might be performed by one thread (e.g., a thread of execution in a computer-program process) and other operations in this process might be performed by another thread.

As depicted in FIG. 7B, software on an image-capturing device (e.g., mobile device 4102 in FIG. 4A, which might be smartphone, kiosk, etc.) is a data capturer. In operation 9, that software scans a visual code (such as a QR code) that is displayed by a data sender (e.g., a mobile device). In operation 10, the software converts the QR code into a string and determines block_number and total_blocks from the resulting header. In operation 11, the software determines whether the block_number is already present in an array (Blocks_Read) of display block numbers that holds the block number of all of the unique display blocks which have been captured so far. If block_number is already present in the array, the software discards block_number and returns to operation 9. If block_number is not already present in the array, the software adds block_number to the array using block_number as an index, in operation 12, and proceeds to operation 13, where the software determines whether all display blocks have been captured, e.g., whether the array is full. If the array is not full, the software returns to operation 9. If the array is full, the software removes the header from each display block and coalesces (e.g., concatenates them in order) them, in operation 14. In operation 15, the software stores the original data file (e.g., in volatile memory or persistent storage) for later use, comparison or verification.

FIG. 8A illustrates a series of headers that might be used when partitioning an original data file (e.g., an image file), in accordance with an example embodiment. In the figure, each of the headers in the series 8501 includes both a count of the total number of display blocks resulting from the partitioning of an original data file (e.g., an image file), namely 10, as well a single ordered block number, namely, 0, 1, 2, 3, 4, 5, 6, 7, 8, or 9. As shown in FIGS. 6 and 13A-13G, the total number of blocks and the ordered block numbers might be determined by software on a mobile device (e.g., a smartphone) and used by software on an image-scanning device (e.g., a smartphone, a kiosk, a hand-held scanner, etc.) to reconstruct the original data file, in an example embodiment.

FIG. 8B illustrates a process for capturing a series of display blocks, in accordance with an example embodiment. The top of the figure (I) shows a series of ten display blocks that result from partitioning on a mobile device (e.g., a smartphone) of an original data file (e.g., an image file) into multiple display blocks less than a maximum size, e.g., as determined by a standard for a visual code. As indicated in the figure, the series is initially ordered by the block number assigned to each display block. The middle of the figure (II) shows the display blocks as they might appear in an array after they are captured by an image-capturing device (e.g., a smartphone, kiosk, etc.) over time. As indicated in the figure, the display blocks in the array are no longer in the initial order. The bottom of the figure (III) shows the display blocks back in their initial order on the image-capturing device prior to coalescing (e.g., ordered concatenation) back into the original data file (e.g., an image file).

Feedback Confirmation

When transferring large data sets, it is useful to break up the data into several smaller blocks. For example, if the blocks of data are transferred using QR-Code, each block can be limited to about 2 k Bytes, as previously described. In one embodiment, to make scanning the data easy, a smaller size of about 1 k Bytes may be used. For example, to transfer a 40K byte data set, the process might then require as many as 40 data blocks to be presented for a scanner to read. The sending device may have no way of knowing which blocks have been read without implementing embodiments of the present invention. As such, the sending device will therefore continue to display the data records in sequence and repeat the process until the process is terminated. This can significantly slow down the process. For example, if 39 of the 40 blocks have been read by the receiving device, the sending device will continue to rotate between all 40 blocks even if the receiving device is only interested in a single block. If somehow, the receiving device continually misses the block of interest, the process will continue until such time that all blocks have been read.

Embodiments of the present invention provide for the receiving device to deliver feedback (e.g., a confirmation message) as to which display blocks have been read, thereby speeding up the transfer process. Because the sending device is configured to receive that feedback information, the sending device could avoid displaying visual codes corresponding to display blocks already scanned (e.g., read) and the process can be significantly expedited.

The receiving device can provide feedback to the sending device. In one embodiment, the feedback includes information indicating all display blocks that have been properly received so far. In another embodiment, the feedback includes information indicating display blocks that the receiving device has not yet received.

Any number of methods can be used to communicate this feedback to the sender, in embodiments. In one embodiment, a visual code (such as a QR-Code) is displayed on the screen of the receiving device, wherein the visual code includes the confirmation message. The sending device is configured to scan the visual code simultaneously as the sending device generates its data codes (e.g., visual codes) to be scanned by the receiving device. In particular, the receiving device can embed a series of numbers in sequence that represent either the received or the not-received blocks.

Figure 9A:
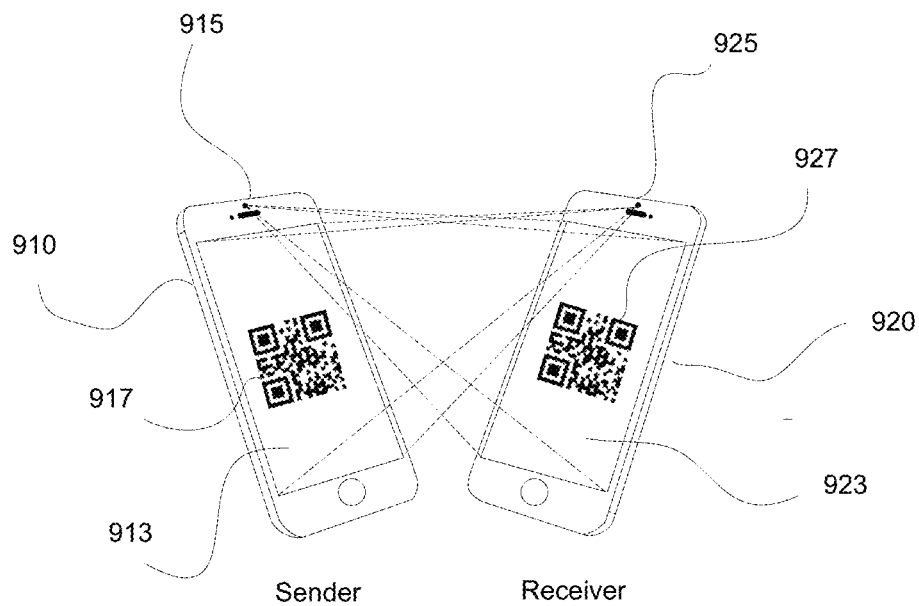
FIG. 9A illustrates a phone to phone implementation for transferring data files between a sending device and a receiving device, wherein the receiving device provides feedback for confirming receipt of display blocks to the sending device by displaying visual codes corresponding to confirmation messages, in accordance with one embodiment of the present disclosure.

FIG. 9A illustrates a phone to phone implementation for transferring data files between a sending device and a receiving device, wherein the receiving device provides feedback for confirming receipt of display blocks to the sending device by displaying visual codes corresponding to confirmation messages, in accordance with one embodiment of the present disclosure. As shown, two devices, such as mobile phones are equipped with front cameras pointed at each other. For example, the sending device 910 includes a front camera 915, and screen 913. The sending device is configured to display a series of visual codes (e.g., QR code 917 is shown in the screen 913), or a subset of the series (e.g., corresponding to a group) displayed in a repeating progression on the screen 913. The series or subset may be unmodified, or modified to remove visual codes corresponding to display blocks that have been read or received by the receiving device. In one embodiment, the subset of the series defines the modified series or the modified subset. The receiving device 920 is configured to capture the displayed visual codes using a capture device (e.g., front camera 925).

While the sending device 910 loops through a display of a series of visual codes (e.g., QR-Codes), the sending device also looks to read a visual code from the receiving device that includes the confirmation message. For example, the receiving device 920 includes the front camera 925, and screen 923. The receiving device refreshes screen 923 to display a current visual code that represents the feedback (e.g., confirmation message) for the sending device. In one embodiment, the feedback is displayed on the receiving device while simultaneously reading data from the sending device 910. As shown, the feedback is displayed in the form of a QR code 927, in one embodiment. Other embodiments are well suited to support other formats, such as a two-dimensional (2D bar code), etc.

Other forms of communicating the feedback are also possible. In other embodiments, the feedback is communicated using a wireless communication link. For example, the feedback may be communicated over a Bluetooth link, in one embodiment. In another embodiment, the feedback may be communicated over a Bluetooth Low Energy (BLE) link. In still another embodiment, the feedback may be communicated over a near field communication (NFC) link. These links are provided for illustration, and other forms of communicating the feedback are also possible.

Figure 9B:
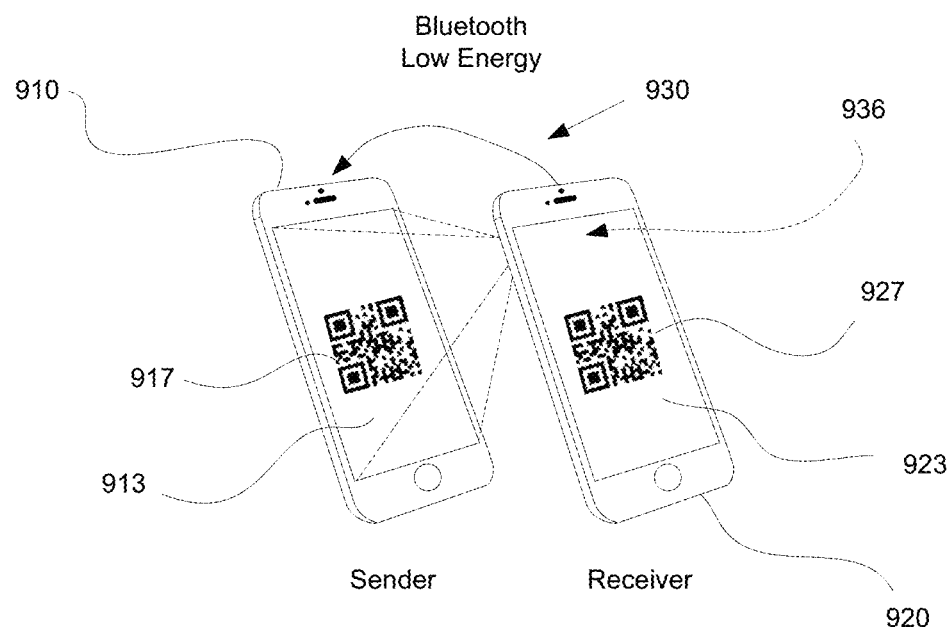
FIG. 9B illustrates a phone to phone implementation for transferring data files between a sending device and a receiving device, wherein the receiving device provides feedback for confirming receipt of display blocks to the sending device by sending confirmation messages over a wireless communication link, in accordance with one embodiment of the present disclosure.

FIG. 9B illustrates a phone to phone implementation for transferring data files between a sending device and a receiving device, wherein the receiving device provides feedback for confirming receipt of display blocks to the sending device by sending confirmation messages over a wireless communication link, in accordance with one embodiment of the present disclosure. For example, the previously introduced sending device 910 includes a screen 913, which is configured to display a series of visual codes (e.g., QR code 917 is shown in the screen 913), or a subset of the series (e.g., corresponding to a group) displayed in a repeating progression on the screen 913. The series or subset may be unmodified, or modified to remove visual codes corresponding to display blocks that have been read or received by the receiving device. In one embodiment, the subset of the series defines the modified series or the modified subset. The receiving device 920 is configured to capture the displayed visual codes using a capture device (e.g., front camera 925, or rear camera 936—not shown).

While the sending device 910 loops through a display of a series of visual codes (e.g., QR-Codes), the sending device also looks to receive feedback from the receiving device that includes the confirmation message, wherein the feedback may be communicated over a wireless communication link 930. In one embodiment, the wireless communication link is configured for local one-way communication, such as through broadcasting, or advertising the confirmation message. This reduces the complexity of the transaction, by not requiring any handshaking protocol between the two devices. As shown in FIG. 9B, though the screen 923 may show a QR code 927 that includes feedback information, the sending device 910 uses the feedback from the wireless communication link. In that manner, the screen 923 may not be used for feedback. In one embodiment, the feedback is delivered from the receiving device while simultaneously reading data from the sending device 910. An exemplary format for the confirmation message as delivered over the wireless communication link is further described below.

Figure 10A:
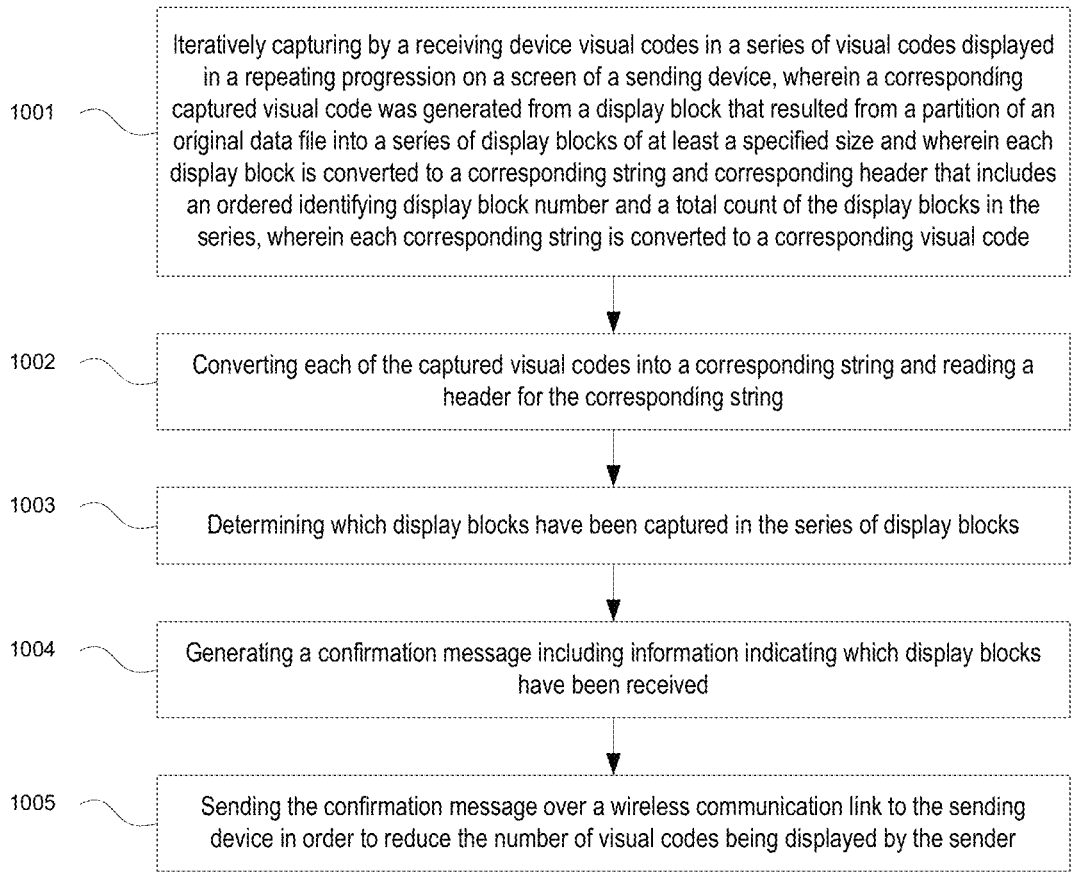
FIG. 10A is a flow chart illustrating a method for confirming receipt of delivered display blocks, in accordance with one embodiment of the present disclosure.

FIG. 10A is a flow chart illustrating a method for confirming receipt of delivered display blocks, in accordance with one embodiment of the present disclosure. The method is performed from the standpoint of a receiving device configured to capture visual codes displayed by a sending device. For example, the receiving device may be a mobile device, a smartphone, hand-held device, a stand-alone device, a kiosk, etc. In one embodiment, the receiving device is operated by an airline. The sending device may be a mobile device, a smartphone, hand-held device, a wearable device, a smartwatch, etc.

At 1001, the method includes iteratively capturing by the receiving device visual codes. The sending device displays a series of visual codes in a repeating progression on a screen. The sending device may display a subset of the series of visual codes, such as a subset formed from a smaller group of the series. The series and/or subset of visual codes may be modified to remove visual codes of display blocks that have been received by the receiving device. In some cases, the subset defines the modified version of the series or subset of the series of visual codes.

At 1002, the method includes converting each of the captured visual codes into a corresponding string and reading a header for the corresponding string. As previously described, a corresponding captured visual code is generated from a display block that resulted from a partition of an original data file into a series of display blocks. In one embodiment, the display blocks are of at least a specified size. Each display block is converted to a corresponding string and corresponding header, wherein the header includes an ordered identifying display block number and a total count of the display blocks in the series. Each corresponding string is converted to a corresponding visual code.

At 1003, the method includes determining which display blocks have been captured in the series of display blocks. From each header that is read corresponding to captured visual codes, the receiving device knows the total count of display blocks, and the corresponding display block number. As such, each of the display block numbers of captured visual codes and their corresponding display blocks are also known. In addition, if the series of visual codes is broken into smaller groups, then the corresponding group numbers for the captured visual codes are also know. Group numbers are known based on the algorithm used for compartmentalizing the visual codes into groups.

At 1004, the method includes generating a confirmation message that includes information indicating which display blocks have been received. In one embodiment, the information explicitly recites which display blocks have been received. In another embodiment, the information explicitly recites which display blocks have not been received, and as such, by inference and knowing how many display blocks are in the series, the display block that have not been received is also known. A more detailed description of the confirmation message is provided below.

At 1005, the method includes sending the confirmation message over a wireless communication link to the sending device in order to reduce the number of visual codes being displayed by the sender, in one embodiment. For example, the wireless communication link may be one of a Bluetooth, BLE, NFC, a one-way communication link, or any local communication link.

In other embodiments, the confirmation message is delivered over a communication medium other than a wireless communication link. For example, the confirmation message may be displayed by the receiving device for capture by the sending device (e.g., using a camera or image capture device). By communicating which display blocks have been received and their corresponding visual codes, the number of visual codes being displayed by the sending device may be reduced.

Figure 10B:
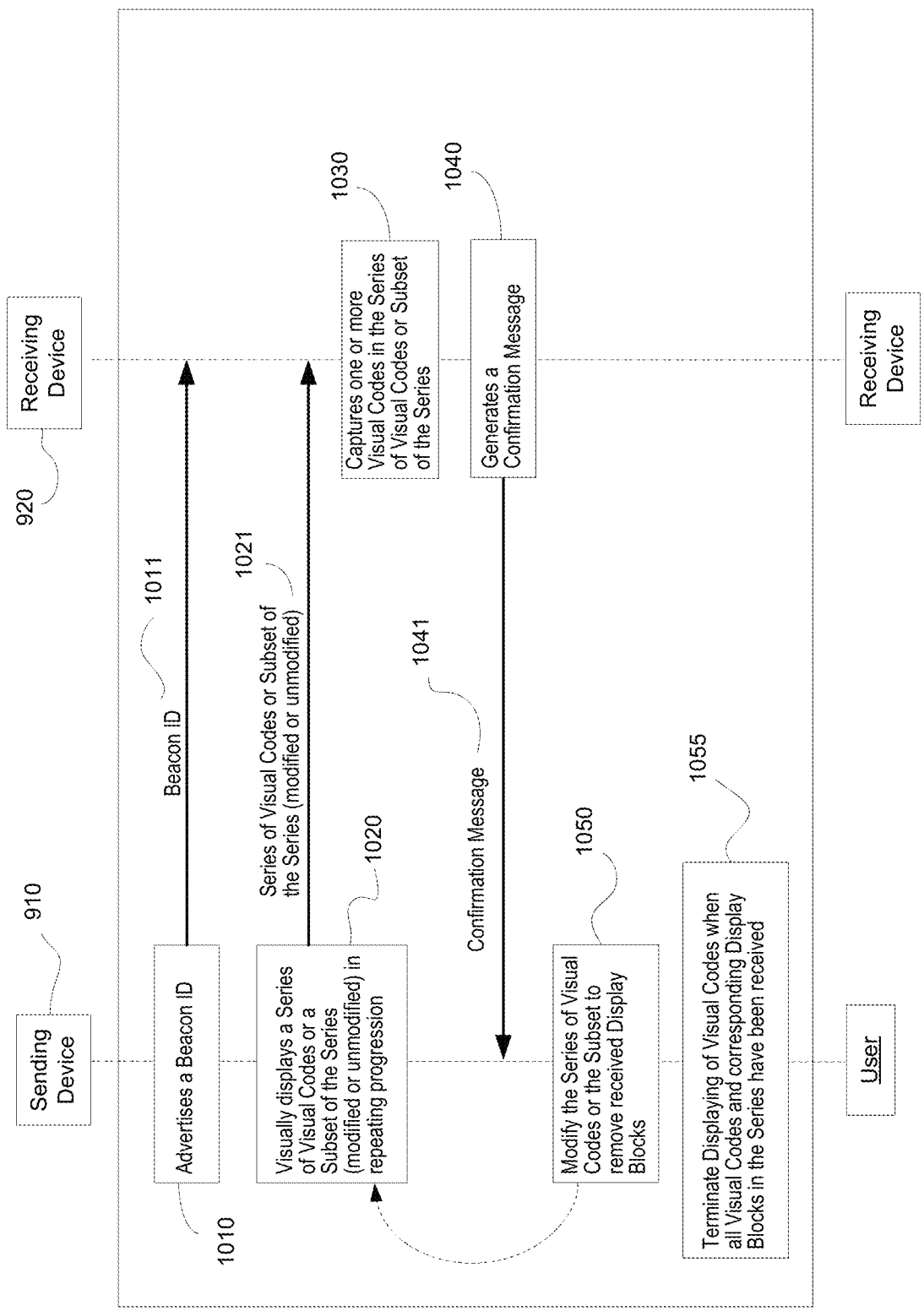
FIG. 10B is a data flow illustrating the flow of information when transferring data files between a sending device and a receiving device, and the generating and delivery of confirmation messages as feedback, in accordance with one embodiment of the present disclosure.

FIG. 10B is a swim chart illustrating the flow of information when transferring data files between a sending device 910 and a receiving device 920, and the generating and delivery of confirmation messages as feedback, in accordance with one embodiment of the present disclosure. When transferring data between two devices, the process for providing feedback may be delivered through a wireless communication link (e.g., BLE, Bluetooth, NFC), or may be delivered over any other type of local communication medium (e.g., through displaying visual codes). However, FIG. 10B describes a process for communicating the feedback confirmation message over Bluetooth, and more specifically over BLE, in embodiments.

Using a Bluetooth or BLE format, the sending device 910 can start the display process by showing a visual code that represents the Bluetooth beacon ID to use for communicating messages. In particular, the sending device will listen to messages including the beacon ID. For example, at 1010 the sending device advertises the beacon ID 1011. As such, the receiving device 920 is able to pick up the beacon ID 1011.

In one embodiment, the sending device 910 can initiate the process for the data exchange by displaying all of the control information in an initial visual code (e.g., a QR Code). This initial request can advertise the Beacon Identifier (ID) that the sending device will be listening for. In one embodiment, the control information includes the number of bits to be used for the Group numbers. Other control information such as the total number of data blocks may also be included in this initial visual code or transmitted, as previously described. Once the receiving device scans this initial block, the receiving device can then proceed to provide feedback to the sending device that the receiving device is ready. The receiving device can do this by sending feedback beacons using the Beacon ID which the sending device advertised, and provide the value integer of all zeros which means no display block has been received, as will be described below.

Simultaneously, the sending device 910 visually displays a series of visual codes 1060, or a subset of the series, wherein the series or subset may have been modified to remove visual codes that have been received by the receiving device 920 (as indicated though confirmation messages). The subset may be defined to include the modifications.

At 1030, the receiving device 920 captures one or more of the visual codes that have been displayed on the screen of the sending device. By converting the visual codes to corresponding strings and corresponding headers, the corresponding display blocks of the original data can be determined. Each header for a corresponding string includes a total count of display blocks and the corresponding display block number. As such, the receiving device 920 is configured to determine which display blocks (and corresponding visual codes) have been received.

At 1040, the receiving device generates a confirmation message indicating which display blocks (and corresponding visual codes) have been received. The confirmation message 1041 can be delivered to the sending device. In one embodiment, the confirmation message is delivered over a wireless communication link, as previously described. In FIG. 10B, the receiving device 920 issues Bluetooth beacons with the beacon ID followed by another value, as will be described in FIG. 12A-12E. In other embodiments, the confirmation message is delivered over a local communication medium (e.g., displaying visual codes, etc.).

At 1050, the sending device 910 may modify the series of visual codes or the subset of the series that are displayed. In particular, the confirmation message indicates which visual codes have been read or received by the receiving device 920. As such, there is no need to continually send those received visual codes, and the sending device 910 may remove those visual codes from the series or subset of the series. The subset of a series may include the modification by removing received visual codes from the series or another subset. That is, the method includes iteratively capturing by the receiving device visual codes in a subset of the series of visual codes displayed in the repeating progression on the screen of the sending device, wherein visual codes corresponding to display blocks that have been received by the receiver are removed when generating the subset of the series of visual codes by the sending device. In that manner, the modified series or subset of the series of visual codes may then be displayed by the sending device 910 for capture by the receiving device.

Once all the visual codes have been captured in the series of visual codes, as indicated within a confirmation message, the sending device may terminate the display of visual codes at 1055. No further action is required of the user of the sending device. That is, the termination of the data transfer process is automatically performed between the two deices.

FIG. 10C illustrates the transferring of data files by groups within a series of visual codes, and the generating and delivery of confirmation messages associated with each group as feedback, in accordance with one embodiment of the present disclosure. In particular, the original data file may be partitioned in to a series of visual codes, as previously described. The series of visual codes may be further partitioned into groups. In that manner, the sending device sends visual codes group-by-group. Once all the visual codes of a group have been received, as indicated through a confirmation message, then the sending device moves on to the next group of visual codes for display and transfer. The number of groups and the corresponding ordered numbers of visual codes within each group is known by each device through execution of the same group and display block assignment algorithm, in one embodiment. In another embodiment, the number of groups and the ordered numbers of visual codes within each group is provided as control information by the sending device, as previously introduced.

As shown, the sending device 910 displays a series of visual codes 1060. For example, the visual codes may be QR codes, or 2D bar codes, etc. In FIG. 10C, the series includes QR codes 1060a-1060n. Each of the visual codes can be converted into corresponding headers and corresponding strings. The header information includes the total count of display blocks in the series, and the corresponding display block number of a corresponding visual code. For example, visual code 1060n includes header 1061n.

The receiving device 920 receives one or more of the displayed visual codes. In addition, the receiving device 920 is configured to provide feedback to the sending device 910 as to which display blocks (per series or group within the series) have been received. In that manner, the sending device need not send visual codes corresponding to display blocks that have already been received. Because the visual codes are displayed by group, confirmation messages are generated in association with a corresponding group. For example, a confirmation message 1200' may be delivered to the sending device for group 0, and confirmation message 1200" may be delivered to the sending device for group 1, . . . and confirmation message 1200'" may be delivered to the sending device for group n. A more detailed description of the confirmation message 1200 is provided in relation to FIGS. 12A-12E.

Figure 11A:
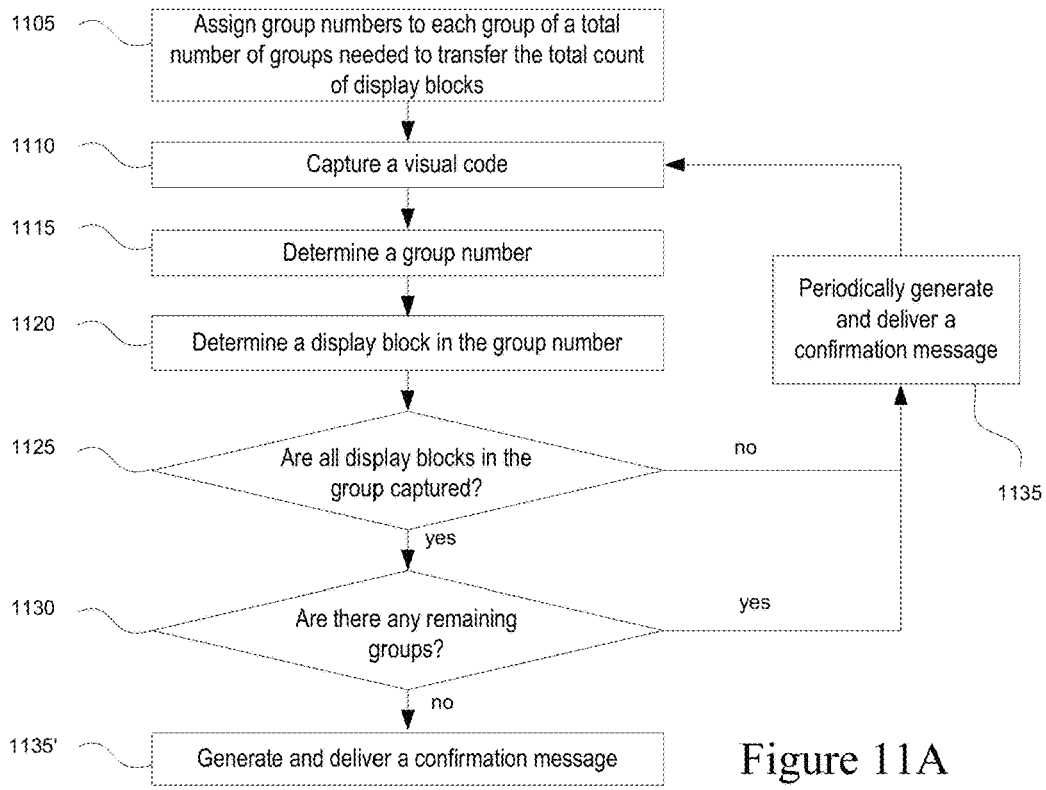
FIG. 11A is a flow diagram illustrating the receipt of visual codes by a receiving device when transferring data files between a sending device and the receiving device in the form of visual codes arranged by groups, and the generation of confirmation messages associated with a particular group of visual codes as feedback, in accordance with one embodiment of the disclosure.

FIG. 11A is a flow diagram illustrating the receipt of visual codes by a receiving device when transferring data files between a sending device and the receiving device in the form of visual codes arranged by groups, and the generation of confirmation messages associated with a particular group of visual codes as feedback, in accordance with one embodiment of the disclosure. The operations in the flow diagram are performed by the receiving device.

At 1105, the method includes assigning group numbers to each group of a total number of groups needed to transfer the total count of display blocks. The number of groups is dependent on the size of the confirmation message. For example, the confirmation message includes the beacon ID, a group number (if necessary), and information indicating whether a corresponding display block has been received. The number of groups, as well as the display blocks (and their respective visual codes), may be determined by an algorithm. If both the sending device and the receiving device use the same algorithm, then based on the number of visual codes (corresponding to display blocks) that are sent, the number of groups, and the display blocks within each group can be determined, in one embodiment. Also, both the sending device and receiving device can calculate using the same algorithm the number of bytes or bits required for the group numbers, as reserved in the confirmation message. In another embodiment, the group numbers and display blocks within the group numbers are provided by the sending device through a control message, as previously described. In particular, the sending device can advertise the number of bits that the sending device will be looking for in feedback messages. The sending device can format this information in the same visual code that it uses to communicate the Bluetooth beacon that it will be listening for.

At 1110, the method includes capturing a visual code. The visual code can be converted to a corresponding header and corresponding string. Through a two-way conversion process, a corresponding display block can be converted to the corresponding string and corresponding header, and further converted to a corresponding visual code.

At 1115, the group number for the captured visual code can be determined, and a display block for the captured visual code is also determined at 1120. This is determined from the respective header information obtained within the converted visual code. In particular, for each captured visual code, the header of the corresponding string is parsed. Based on the header, the ordered identifying display block number is determined and recorded. In addition, the corresponding string is converted to a corresponding display block. The header provides the total count of display blocks and the corresponding display block number. From the header, the group number can be determined (e.g., through algorithm, or control information).

At decision step 1125, the method determines whether all the display blocks in the group have been captured/received by the receiving device. Generally, the sending device will continue to display data blocks in the given group being displayed until all frames are set by the receiving device in the feedback/confirmation message. Then, the sending device will go to the next group and repeat the process for each group until all data blocks have been sent.

In particular, if there are more display blocks in the group to be received, then at 1135, a confirmation message is updated and/or generated to reflect that result. In particular, the confirmation message may be updated to reflect the current receipt status for the display block corresponding to the currently captured visual code. That is, the confirmation message includes information indicating which display blocks have been received and/or which display blocks have not been received. The confirmation message is periodically delivered from the receiving device. When transferring data between two devices, the process for providing feedback may be delivered through a wireless communication link (e.g., BLE, Bluetooth, NFC), or may be delivered over any other type of local communication medium (e.g., through displaying visual codes).

On the other hand, if the method determines that all display blocks in the current group have been received, then at decision step 1130, the method determines whether there are any remaining groups for which visual codes have not been displayed by the sending device. If there are remaining groups, then the process proceeds to 1135.

If there are no remaining groups, then all of the display blocks have been received, and an end confirmation message is generated and delivered at 1135'. The generation of the end confirmation message in 1135' follows the same process as in 1135, except that the current receipt status for the display blocks in the last group show that all display blocks have been received. In one embodiment, the sending device tracks which groups have been handled, and is able to determine which confirmation is the last confirmation message (e.g., based on all visual codes in all groups being displayed and received).

In addition, the receiving device is configured to stop the iterative capturing when all of the display blocks in the series have been captured. The termination may be determined from information used to generate the confirmation message(s). Further, the receiving device is configured for coalescing the captured display blocks into the original data file, using an order determined by the ordered identifying block numbers. For example, the original data file may contain information about a user associated with the sending device, or information related to a document held by the user. The original data file may be an image file. For example, the original data file may be a government issued driver's license that is used for identifying the user. In another implementation, the original data file may include biometric data of the user. In addition, as previously described, the receiving device is configured to verify the integrity of the original data file using a seal that is accessed from a block chain database storing the seal. The seal being generated based on the contents of the original data file. Also, the receiving device is configured to verify the validity of the original data file using a certification accessed from the block chain database storing the certification. The certification being generated based on the contents of the original data file and the seal, wherein each of the operations is performed by an image-capturing device.

Figure 11B:
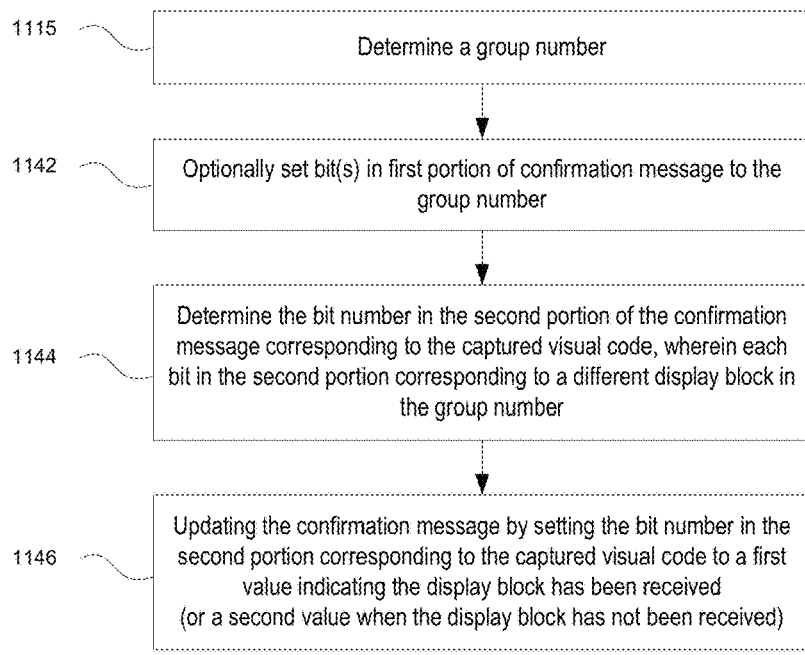
FIG. 11B is a flow diagram illustrating the generation of a confirmation message in association with the transferring of data files between a sending device and a receiving device, in accordance with one embodiment of the present disclosure.

FIG. 11B is a flow diagram illustrating the generation of a confirmation message in association with the transferring of data files between a sending device and a receiving device, in accordance with one embodiment of the present disclosure. The operations in the flow diagram are performed by the receiving device. In one embodiment, the flow diagram of FIG. 11B is performed in alignment with the flow diagram of FIG. 11A, such as with respect to generating confirmation messages.

As previously described, at 1115 the receiving device determines a group number from the headers of one or more captured visual codes within a group. The header provides the total count of display blocks and the corresponding display block number. From the header, the group number can be determined (e.g., through algorithm, or control information).

At 1142, the method includes optionally setting bits in a first portion of the confirmation message to the group number. That is, if there is more than one group, then the confirmation message includes a first portion that indicates the relevant group number, to which the following status information applies.

At 1144, the method includes determining the bit number in the second portion of the confirmation message that corresponds to the captured visual code. Each bit in the second portion corresponds to a different display block (and respective visual code) in the group number.

At 1146, the method includes updating the confirmation message by setting the bit number in the second portion that corresponds to the captured visual code to a first value indicating the display block has been received by the receiving device. In particular, the information in the confirmation message, indicating which display blocks have been received, is configured to include ordered bits corresponding to the series of display blocks, wherein each bit in the second portion corresponds to a different display block. A first ordered bit corresponds to a first display block in the series of display blocks. A first bit value for the first ordered bit indicates that the first display block has been received, and a second bit value for the first ordered bit indicates that the first display block has not been received.

In another embodiment, when groups of the series of visual codes are implemented, the method includes determining a total count of display blocks from the corresponding header of the corresponding captured visual code. In addition, the method includes determining a number of groups needed to transfer the total count of display blocks based on a size of the confirmation message. The total number of groups as previously described may be determined from control information provided by the sending device, or determined through a common algorithm based on the total count of display blocks (and visual codes) and the size of the confirmation message. The method includes reserving a first portion of the confirmation message for identifying a group, and reserving a second portion of the confirmation message to correspond to display blocks in an identified group. The method includes iteratively capturing by the receiving device visual codes in the identified group of the series of visual codes displayed in the repeating progression on the screen of the sending device. In addition, for the identified group, the method includes setting a first bit in the second portion to a first value when a first display block corresponding to the first bit has been received, wherein the identified group includes the first display block. Also, for the identified group, the method includes setting the first bit to a second value when the first display block has not been received.

Figure 11C:
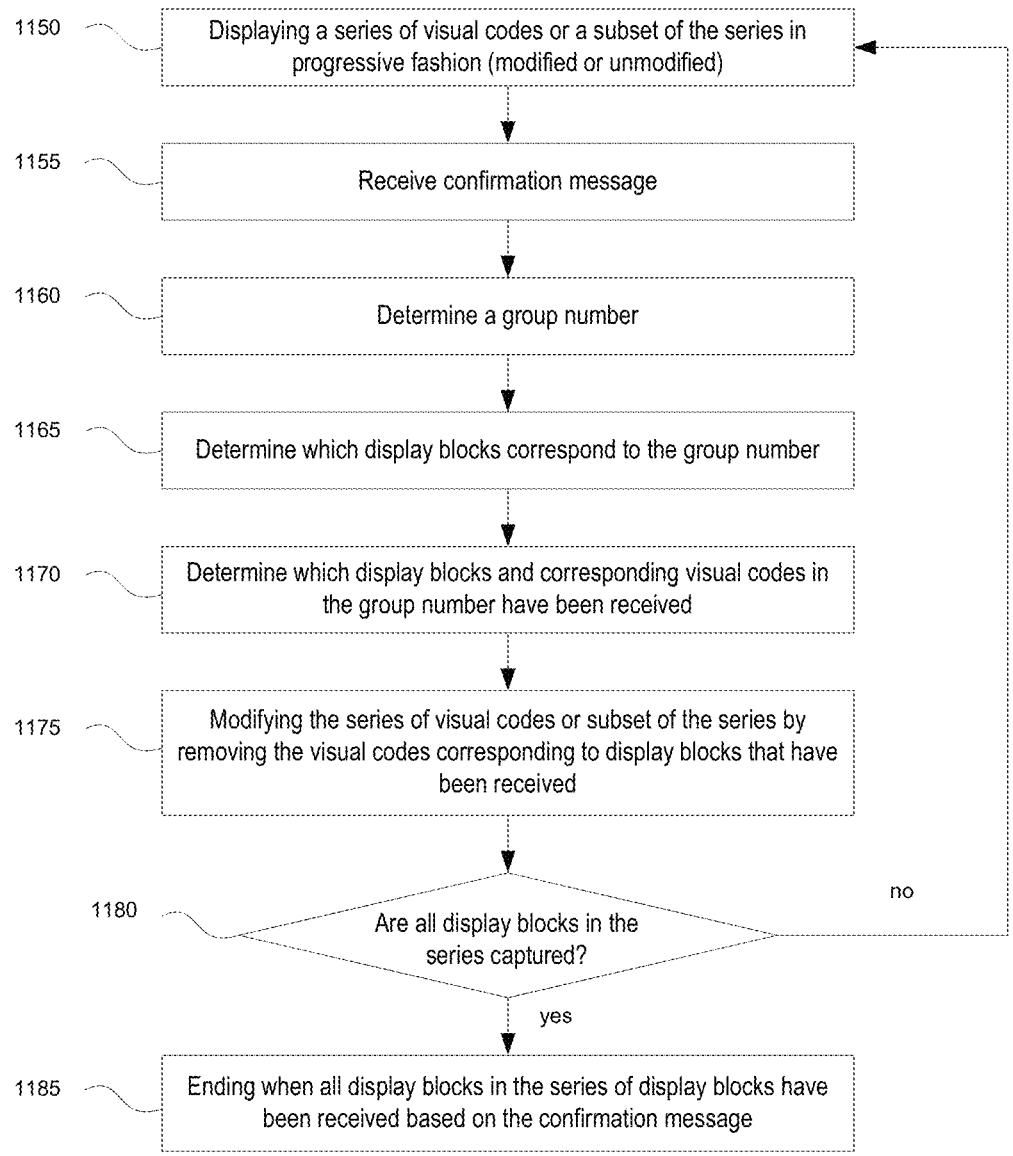
FIG. 11C is a flow diagram illustrating the displaying of a series of visual codes when transferring data files between a sending device and a receiving device, wherein the visual codes may be compartmentalized into smaller groups, and wherein the sending device displays visual codes that have not been received based on one or more confirmation message, in accordance with one embodiment of the present disclosure.

FIG. 11C is a flow diagram illustrating the displaying of a series of visual codes when transferring data files between a sending device and a receiving device, wherein the visual codes may be compartmentalized into smaller groups, and wherein the sending device displays visual codes that have not been received based on one or more confirmation message, in accordance with one embodiment of the present disclosure. The operations in the flow diagram are performed by the sending device. In one embodiment, the flow diagram of FIG. 11C is performed in alignment with the flow diagrams of FIG. 11A-11B.

At 1150, the method includes displaying a series of visual codes or a subset of the series of visual codes in progressive fashion. That is the visual codes are displayed in a repeating progression on the screen of the sending device.

At 1155, the method includes receiving a confirmation message from the receiving device. The confirmation message may be delivered through a wireless communication link (e.g., Bluetooth, BLE, NFC, one-way link, etc.), or through a local communication medium (e.g., displaying visual codes). The confirmation message includes a first portion indicating which group number is relevant, and a second portion having receipt status for corresponding display blocks. As such, at 1160, the method includes determining a relevant group number from the confirmation message.

In addition, at 1165, the method includes determining which display blocks correspond to the group number. As previously described, the number of groups, as well as the display blocks (and their respective visual codes) belonging to each group, may be determined by an algorithm. If both the sending device and the receiving device use the same algorithm, then based on the number of visual codes (corresponding to display blocks) that are sent, the number of groups, and the display blocks within each group can be determined, in one embodiment.

For example, the algorithm used to determine the number of groups and for assigning display blocks to group may include determining the number of groups based on the size of the confirmation message. Once it is determined how many bits may be reserved for indicating receipt status for display blocks, the display blocks in the series may be allocated to each group. For illustration, groups are fully filled with corresponding display block status information, until reaching the last required group. The last required group handles the remainder of the display blocks, and may not be fully filled. In addition, not all groups may be used, depending on the total count of display blocks. In addition, some other algorithm may be used for allocating display blocks to groups. For example, there may an attempt to distribute the display blocks equally among the determined groups required to handle the total count of display blocks.

Further, at 1170, the method includes determining which display blocks and corresponding visual codes in the relevant group have been received. This is provided from the second portion of the confirmation message. In particular, the sending device may remove those visual codes that correspond to display blocks that have been received. As such, at 1175, the method includes modifying the series of visual codes or the subset of visual codes by removing the visual codes corresponding to display blocks that have been received. The subset of a series may include the modification by removing received visual codes from the series or another subset, as previously described. In that manner, the modified series or subset of the series of visual codes may then be displayed by the sending device 910 for capture by the receiving device.

At decision step 1180, the method determines whether all display blocks in the series of display blocks have been received by the receiving device. If not all display blocks in the group have been received, and/or if not all display blocks in all the groups have been received, then the process returns to 1150 to display the series of visual codes or subset of the series, now modified. On the other hand, if the method determines that all display blocks in the series of display blocks have been received, then the process terminates. Termination is based on the confirmation message or messages. In particular, the sending device will know when the last data block was received by the receiver based on the feedback/confirmation message. Once the sending device has received that message, the sending device can abort the process and either display a status or move to other functions.

Figure 12A:
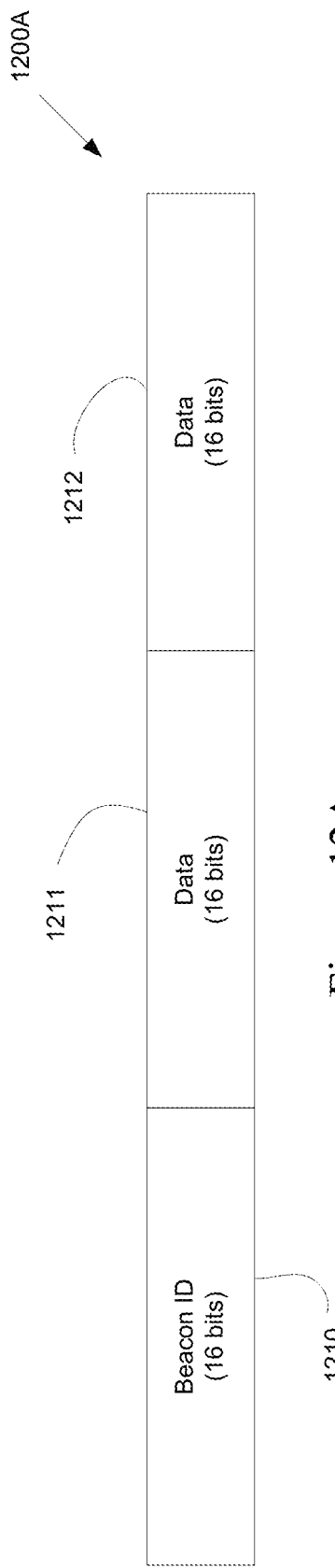
FIG. 12A illustrates a confirmation message following a Bluetooth Low Energy (BLE) format used for generating a confirmation message, in accordance with one embodiment of the present disclosure.

FIG. 12A illustrates an exemplary confirmation message 1200A following a Bluetooth Low Energy (BLE) format used for generating a confirmation message, in accordance with one embodiment of the present disclosure. In particular, the receiving device issues the confirmation message (e.g., as a beacon message) that includes the beacon ID followed by a data package. Bluetooth beacons generally provide for three 16 bit values, for a total of 48 bit values. The first 16 bit value represents the beacon ID 1210. The sending device can listen for messages containing that beacon ID. The second and the third values are used for information exchange, such as receipt status for corresponding display blocks. The second and third values can provide a bitmap of the blocks that have been received, as will be further described below. The use of BLE or Bluetooth beacons are exemplary, and confirmation messages can follow formats having different number of bits (e.g., greater or lesser than 48 bits).

Figure 12B:
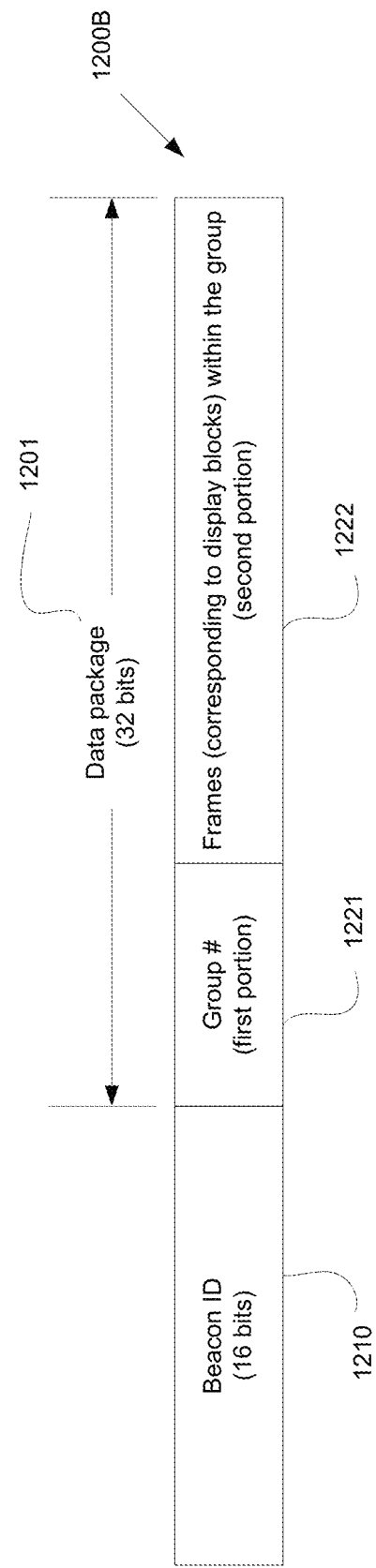
FIG. 12B illustrates a data package in the confirmation message including a first portion and a second portion, in accordance with one embodiment of the present disclosure.

FIG. 12B illustrates a data package 1201 in the confirmation message 1200B including a first portion and a second portion, in accordance with one embodiment of the present disclosure. For purposes of illustration, the confirmation message 1200B follows the BLE formatting introduced in FIG. 12A, and includes a 16 bit beacon ID 1210. In addition, the second and third 16-bit beacon-values can represent the transmission status of 32 blocks of data (in one confirmation message). This can be enhanced with grouping to allow for transferring more blocks and providing feedback on the transfer. The 32 bits can be broken up into two separate components. The first is a group number and the second represents the bits for the frames within the group. The bits for the group number can be a fixed number of bits and pre-determined, or ideally calculated. That is, the data package 1201 of the confirmation message includes a first portion 1221 that indicates the group number, and a second portion 1222 that includes frames (bit placements) which correspond to display blocks within the group.

As an example, if 3 bits are allocated to the group number, then $2^3$ or 8 different groups can be represented. That would then leave 29 bits for the frames in each group. Hence, group 0, frame 0, is the very first block of data; group 0, frame 1, is the second block of data; group 1, frame 1 is then the $30^{th}$ block of data (29 blocks in group zero and the first in group 1). This setup would allow for 8 groups and 29 frames for each group or 232 total blocks of data.

Figure 12C:
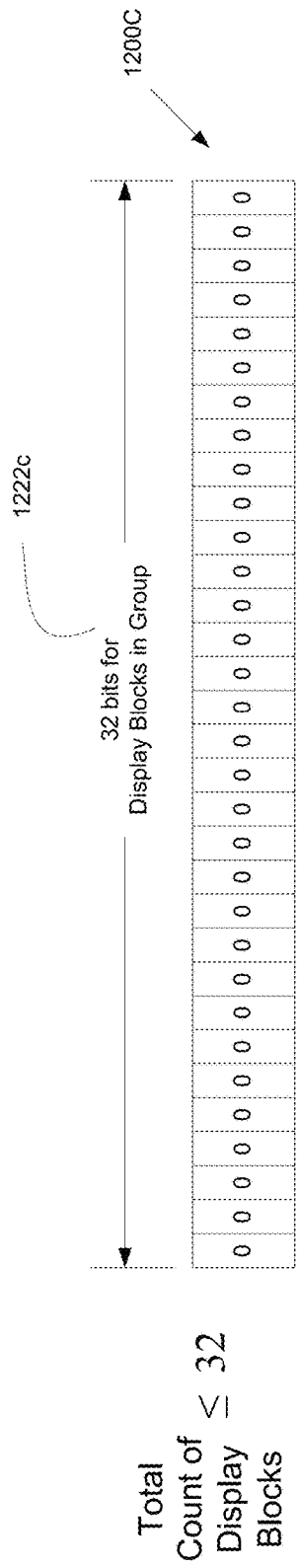
FIG. 12C illustrates a data package of a confirmation message, wherein the data package is configured for a total count of display blocks that is less than or equal to 32, in accordance with one embodiment of the present disclosure.

Since the sending device knows how many blocks of data are necessary to complete the transmission of the data set, the sending device can optimize by dynamically determining the number of bits needed for the group number. For example, if there are only 20 display blocks of data, the sending device can allocate zero bits for the group number (for a total count of display blocks less than or equal to 32), as shown in FIG. 12C. If there are 40 blocks of data, the sending device can then allocate a single bit for the group number and 31 bits for the frame counters (for a total count of display blocks greater than 32 and less than or equal to 62). As the total number of blocks increases, the bits allocated to the group number can also increase. For example, if there are 80 blocks of data, the sending device can then allocate two bits for the group number and 30 bits for the frame counters (for a total count of display blocks greater than 62 and less than or equal to 120). This process of allocating bits for groups in the first portion and setting the bits in the second portion can be adapted to large data sets having display blocks greater than 120.

FIG. 12C illustrates a data package of a confirmation message, wherein the data package is configured for a total count of display blocks that is less than or equal to 32, in accordance with one embodiment of the present disclosure. Only one group is needed the data because the total count of display blocks can be represented by the 32 bits in the data package of the confirmation message 1200C. As such, because no bits in the data package are allocated for the group number (i.e., there is no first portion 1221), the second portion 1222c takes up the entirety of the data package (all 32 bits). As shown, the bit values in the second portion 1222c are all of value 0, indicating no display blocks have been received. Once display blocks are received, correspond bits are set to 1, for example. The values may be reversed, of course.

Figure 12D:
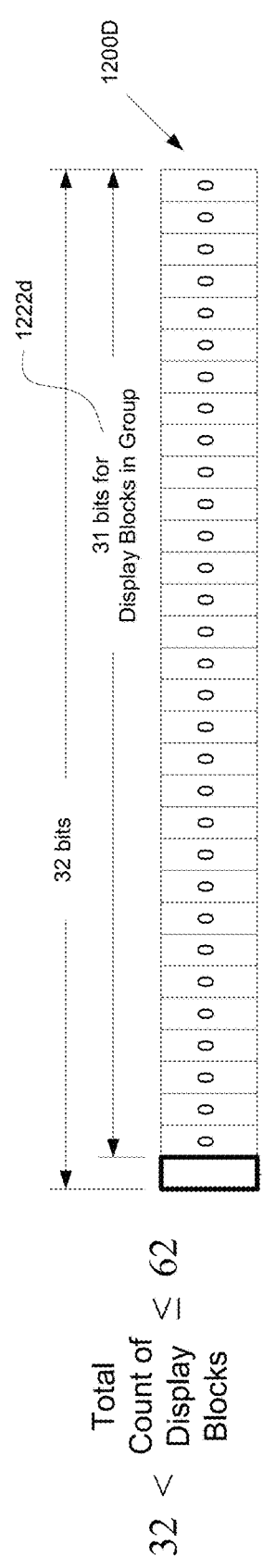
FIG. 12D illustrates a data package of a confirmation message, wherein the data package is configured for a total count of display blocks greater than 32 but less than or equal to 62, in accordance with one embodiment of the present disclosure.

FIG. 12D illustrates a data package of a confirmation message, wherein the data package is configured for a total count of display blocks greater than 32 but less than or equal to 62, in accordance with one embodiment of the present disclosure. For a maximum total count of display blocks less than or equal to 62, up to two groups are needed to transfer the data. As such, one bit in the first portion 1221d can be allocated for the group number (e.g., 0 for group 0, and 1 for group 1). In addition, the second portion 122d includes 31 bits (32 minus 1), such that each confirmation message provides receipt status for up to 31 display blocks. For two groups, up to 62 display blocks can be supported. As shown, the bit values in the second portion 1222d are all of value 0, indicating no display blocks have been received. Once display blocks are received, correspond bits are set to 1, for example. The values may be reversed, of course.

Figure 12E:
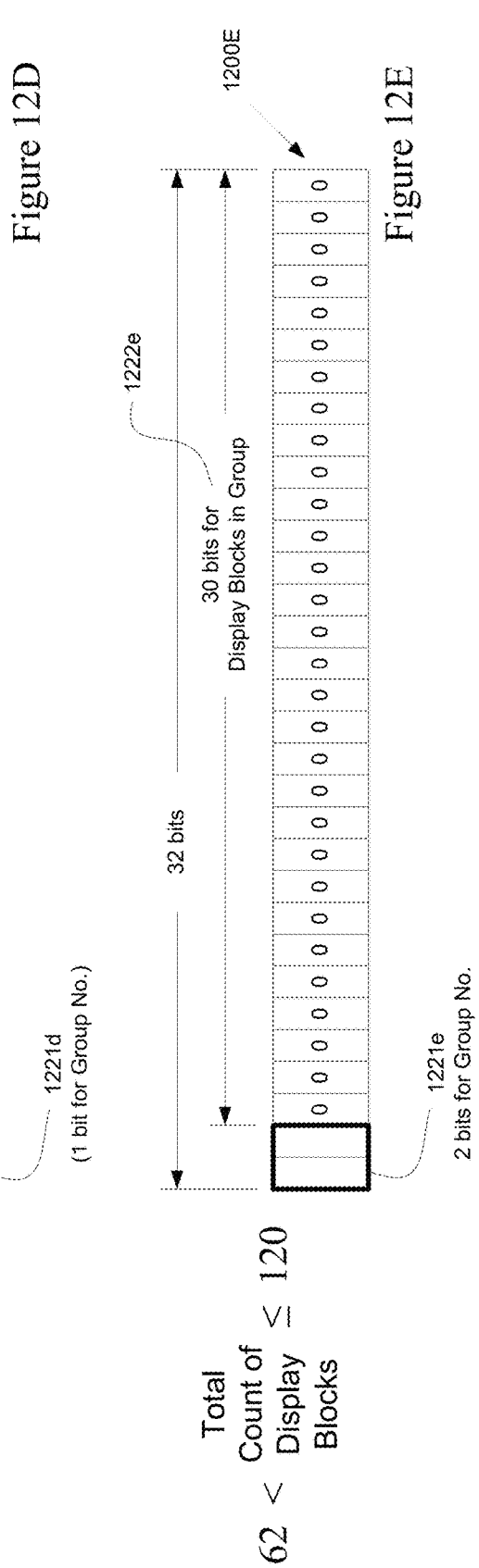
FIG. 12E illustrates a data package of a confirmation message, wherein the data package is configured for a total count of display blocks greater than 62 but less than or equal to 120, in accordance with one embodiment of the present disclosure.

FIG. 12E illustrates a data package of a confirmation message, wherein the data package is configured for a total count of display blocks greater than 62 but less than or equal to 120, in accordance with one embodiment of the present disclosure. For a maximum total count of display blocks less than or equal to 120, up to four groups are needed to transfer the data. As such, two bits in the first portion 1221e can be allocated for the group number (e.g., 00 for group 0, 01 for group 1, 10 for group 2, and 11 for group 3). In addition, the second portion 122e includes 30 bits (32 minus 1), such that each confirmation message provides receipt status for up to 30 display blocks. For four groups, up to 120 display blocks can be supported. This concept can be expanded to support even higher number of display blocks. As shown, the bit values in the second portion 1222e are all of value 0, indicating no display blocks have been received. Once display blocks are received, correspond bits are set to 1, for example. The values may be reversed, of course.

FIG. 13A is a flowchart of a process for transferring an encrypted original data file (e.g., an image file) from a mobile device to an image-capturing device, in accordance with an example embodiment. In an example embodiment, all of the operations in this process might be performed in real time or near real time by software (e.g., applications or apps distributed by a server at a website) running on the devices depicted in the above figures. In an alternative example embodiment, some or all of the operations in this process might be performed in real time or near real time by software running on a server at a website.

As depicted in FIG. 13A, software on a mobile device (e.g., mobile device 4102 in FIG. 4A, which might be smartphone) partitions an original data file (e.g., an image file) into a series of blocks of at least a specified size, e.g., as determined by the size limitations of a standard for a visual code such a QR code, in operation 1321. The original data file (e.g., an image file) has been encrypted with a public key, e.g., the public key of the user of the image-capturing device. In operation 1322, that software adds (1) the total number of display blocks and (2) a block number as a header to each display block. In an example embodiment, the block number is an ordered number specific to the display block. In another example embodiment, the block number might be another ordinal value, e.g., a letter in an alphabet. In operation 1323, the software converts each display block to a string and generates a single visual code (e.g., a QR code) for the string, in an example embodiment. In another example embodiment, the software might generate the visual code directly from a display block with a header, e.g., if the standard for the visual code allows for such a conversion. Then in operation 1324, the software presents each of the resulting visual codes in a repeating progression through the series displayed on the mobile (or sending) device. In an alternative example embodiment, the visual codes might be replaced by oral codes, e.g., if a standard permits the use of oral codes.

As also depicted in FIG. 13A (at the bottom of the figure below the dashed dividing line), software on an image-scanning device (e.g., image-scanning device 4103 in FIG. 4A, which might be a smartphone, a kiosk, a handheld scanner, etc.) iteratively captures a visual code from the mobile (or sending) device, in operation 1331. Then in operation 1332, that software converts the visual code back into a string and discards the string if it is a duplicate. Otherwise the software removes the header, records the block number, and converts the string back into to a display block, in an example embodiment. In operation 1333, the software stops capturing when the total number of display blocks equals the number of block numbers and, in operation 1334, the software coalesces (or combines) the display blocks into an original data file (e.g., an image file) using the order determined by the block numbers, in an example embodiment. And in operation 1335, the software decrypts the encrypted original data file (e.g., an image file) using a private key that matches the public key used to encrypt the original data file (e.g., an image file) and compares the original data file (e.g., an image file) with a copy (e.g., an identical copy) of the original data file (e.g., an image file) obtained from another source, e.g., a state department of motor vehicles, the U.S. State Department, the Federal Bureau of Investigations, a block chain, an airline, etc.

In another example embodiment, the software on the mobile (or sending device) might generate the visual code directly from a display block with a header, e.g., if the standard for the visual code allows for such a conversion. In that example embodiment, the software on the image-scanning device might convert the visual code directly back into a display block before checking for duplication or removing the header and recording the block number.

In an example embodiment, one or more of the above operations might be performed by a separate thread in a process, in order for the operations to occur in parallel. Also, in an example embodiment, the display block might not be converted into a string prior to generation of a visual code for the display block. For example, the display block might be converted into a byte array or some other byte grouping. In that event, the visual code would not need to be converted back into a string before conversion back into a display block.

Moreover, in an example embodiment the original data file might not be an image file. Rather the original data file might be non-image biometric data concerning the user of the mobile device, e.g., fingerprint, voice data, and/or genetic-identification data.

FIG. 13B is a flowchart of a process for transferring a digitally-signed original data file (e.g., an image file) from a mobile device to an image-capturing device, in accordance with an example embodiment. In an example embodiment, all of the operations in this process might be performed in real time or near real time by software (e.g., applications or apps distributed by a server at a website) running on the devices depicted in the above figures. In an alternative example embodiment, some or all of the operations in this process might be performed in real time or near real time by software running on a server at a website.

As depicted in FIG. 13B, software on a mobile device (e.g., mobile device 4102 in FIG. 4A, which might be smartphone) partitions an original data file (e.g., an image file) into a series of display blocks of at least a specified size, e.g., as determined by the size limitations of a standard for a visual code such a QR code, in operation 1341. The original data file (e.g., an image file) has been digitally signed with a private key, e.g., the private key of the user of the mobile device. In operation 1342, that software adds (1) the total number of display blocks and (2) a block number as a header to each display block. In an example embodiment, the block number is an ordered number specific to the display block. In another example embodiment, the block number might be another ordinal value, e.g., a letter in an alphabet. In operation 1343, the software converts each display block to a string and generates a single visual code (e.g., a QR code) for the string, in an example embodiment. In another example embodiment, the software might generate the visual code directly from a display block with a header, e.g., if the standard for the visual code allows for such a conversion. Then in operation 1344, the software presents each of the resulting visual codes in a repeating progression through the series displayed on the mobile (or sending) device. In an alternative example embodiment, the visual codes might be replaced by oral codes, e.g., if a standard permits the use of oral codes.

As also depicted in FIG. 13B (at the bottom of the figure below the dashed dividing line), software on an image-scanning device (e.g., image-scanning device 4103 in FIG. 4A, which might be a smartphone, a kiosk, a handheld scanner, etc.) iteratively captures a visual code from the mobile (or sending) device, in operation 1351. Then in operation 1352, that software converts the visual code back into a string and discards the string if it is a duplicate. Otherwise the software removes the header, records the block number, and converts the string back into to a display block, in an example embodiment. In operation 1353, the software stops capturing when the total number of display blocks equals the number of block numbers and, in operation 1354, the software coalesces (or combines) the display blocks into an original data file (e.g., an image file) using the order determined by the block numbers, in an example embodiment. And in operation 1355, the software hashes another copy of the original data file (e.g., an image file) and uses it and the public key that matches the private key used to digitally sign the original data file (e.g., an image file) to verify (1) the signed original data file (e.g., an image file) and (2) the digital signature, using a verification algorithm (e.g., the RSA verification algorithm).

In another example embodiment, the software on the mobile (or sending device) might generate the visual code directly from a display block with a header, e.g., if the standard for the visual code allows for such a conversion. In that example embodiment, the software on the image-scanning device might convert the visual code directly back into a display block before checking for duplication or removing the header and recording the block number.

In an example embodiment, one or more of the above operations might be performed by a separate thread in a process, in order for the operations to occur in parallel. Also, in an example embodiment, the display block might not be converted into a string prior to generation of a visual code for the display block. For example, the display block might be converted into a byte array or some other byte grouping. In that event, the visual code would not need to be converted back into a string before conversion back into a display block.

Moreover, in an example embodiment the original data file might not be an image file. Rather the original data file might be non-image biometric data concerning the user of the mobile device, e.g., fingerprint, voice data, and/or genetic-identification data.

Figure 13C:
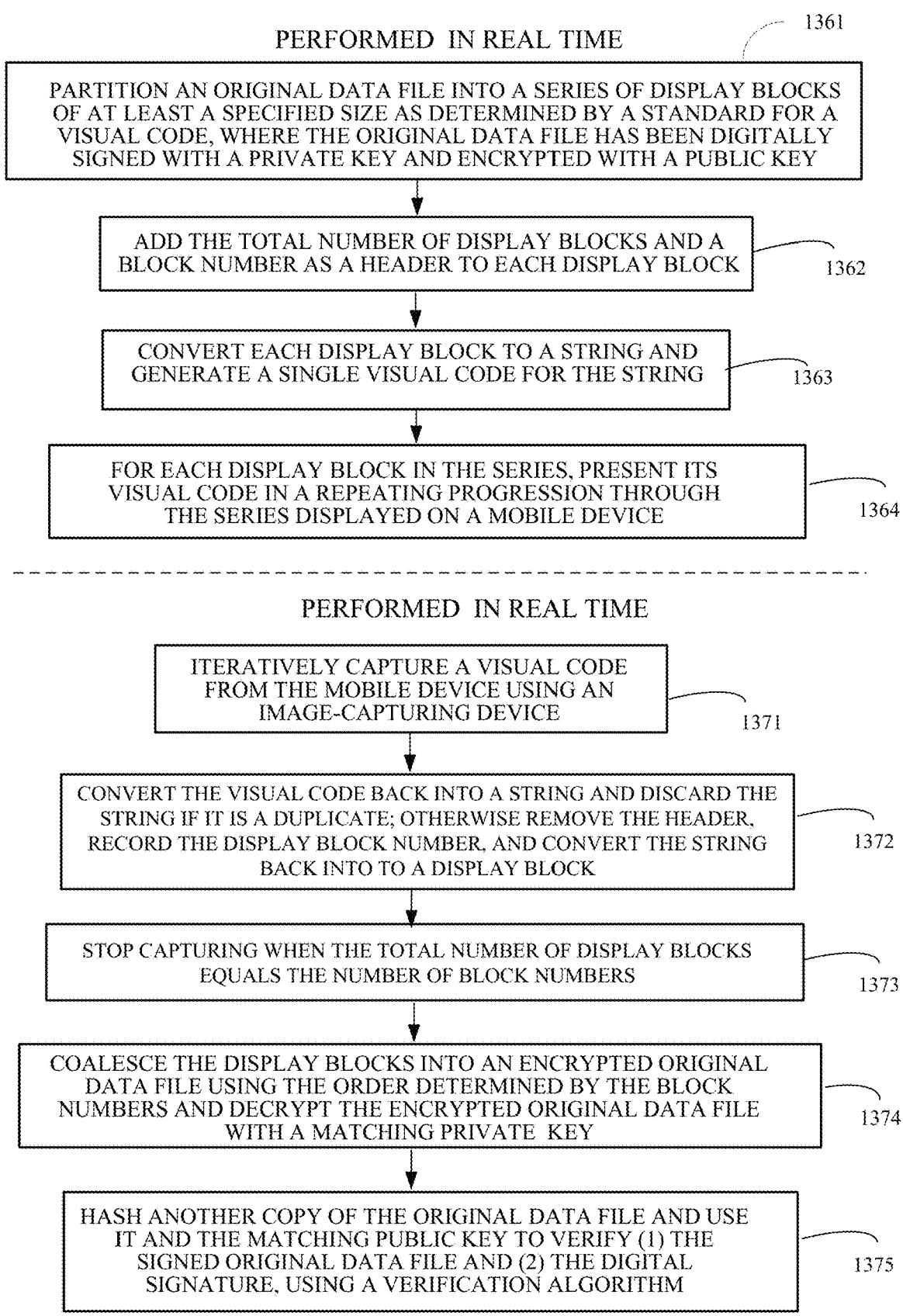
FIG. 13C is a flowchart of a process for transferring a digitally-signed and encrypted original data file (e.g., an image file) from a mobile device to an image-capturing device, in accordance with an example embodiment.

FIG. 13C is a flowchart of a process for transferring an encrypted and digitally-signed original data file (e.g., an image file) from a mobile device to an image-capturing device, in accordance with an example embodiment. In an example embodiment, all of the operations in this process might be performed in real time or near real time by software (e.g., applications or apps distributed by a server at a website) running on the devices depicted in the above figures. In an alternative example embodiment, some or all of the operations in this process might be performed in real time or near real time by software running on a server at a website.

As depicted in FIG. 13C, software on a mobile device (e.g., mobile device 4102 in FIG. 4A, which might be smartphone) partitions an original data file (e.g., an image file) into a series of display blocks of at least a specified size, e.g., as determined by the size limitations of a standard for a visual code such a QR code, in operation 1361. The original data file (e.g., an image file) has been digitally signed with a private key, e.g., the private key of the user of the mobile device, and encrypted with a public key, e.g., the public key of the user of the image-capturing device. In operation 1362, that software adds (1) the total number of display blocks and (2) a block number as a header to each display block. In an example embodiment, the block number is an ordered number specific to the display block. In another example embodiment, the block number might be another ordinal value, e.g., a letter in an alphabet. In operation 1363, the software converts each display block to a string and generates a single visual code (e.g., a QR code) for the string, in an example embodiment. In another example embodiment, the software might generate the visual code directly from a display block with a header, e.g., if the standard for the visual code allows for such a conversion. Then in operation 1364, the software presents each of the resulting visual codes in a repeating progression through the series displayed on the mobile (or sending) device. In an alternative example embodiment, the visual codes might be replaced by oral codes, e.g., if a standard permits the use of oral codes.

As also depicted in FIG. 13C (at the bottom of the figure below the dashed dividing line), software on an image-scanning device (e.g., image-scanning device 4103 in FIG. 4A, which might be a smartphone, a kiosk, a handheld scanner, etc.) iteratively captures a visual code from the mobile (or sending) device, in operation 1371. Then in operation 1372, that software converts the visual code back into a string and discards the string if it is a duplicate. Otherwise the software removes the header, records the block number, and converts the string back into to a display block, in an example embodiment. In operation 1373, the software stops capturing when the total number of display blocks equals the number of block numbers. In operation 1374, the software coalesces (or combines) the display blocks into an original data file (e.g., an image file) using the order determined by the block numbers and decrypts the original data file (e.g., an image file) with a private key that matches the public key that was used encrypt the original data file (e.g., an image file), in an example embodiment. Then in operation 1375, the software hashes another copy of the original data file (e.g., an image file) and uses it and the public key that matches the private key used to digitally sign the original data file (e.g., an image file) to verify (1) the signed original data file (e.g., an image file) and (2) the digital signature, using a verification algorithm (e.g., the RSA verification algorithm).

In another example embodiment, the software on the mobile (or sending device) might generate the visual code directly from a display block with a header, e.g., if the standard for the visual code allows for such a conversion. In that example embodiment, the software on the image-scanning device might convert the visual code directly back into a display block before checking for duplication or removing the header and recording the block number.

In an example embodiment, one or more of the above operations might be performed by a separate thread in a process, in order for the operations to occur in parallel. Also, in an example embodiment, the display block might not be converted into a string prior to generation of a visual code for the display block. For example, the display block might be converted into a byte array or some other byte grouping. In that event, the visual code would not need to be converted back into a string before conversion back into a display block.

Moreover, in an example embodiment the original data file might not be an image file. Rather the original data file might be non-image biometric data concerning the user of the mobile device, e.g., fingerprint, voice data, and/or genetic-identification data.

Figure 13D:
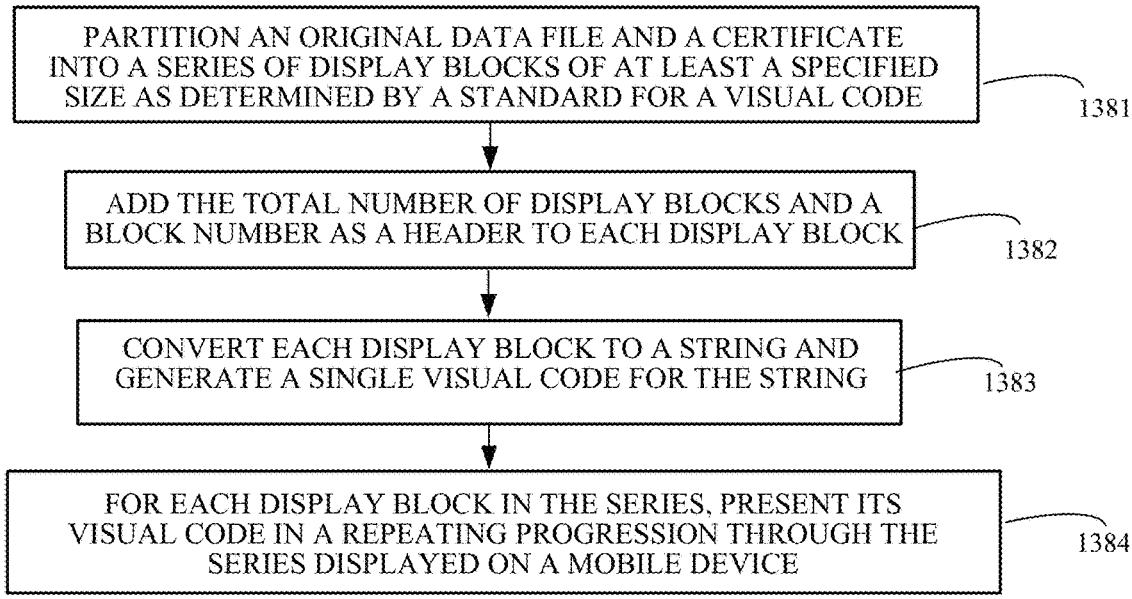
FIG. 13D is a flowchart of a process for transferring an original data file (e.g., an image file) and a certificate from a mobile device to an image-capturing device, in accordance with an example embodiment.
Figure 13D:
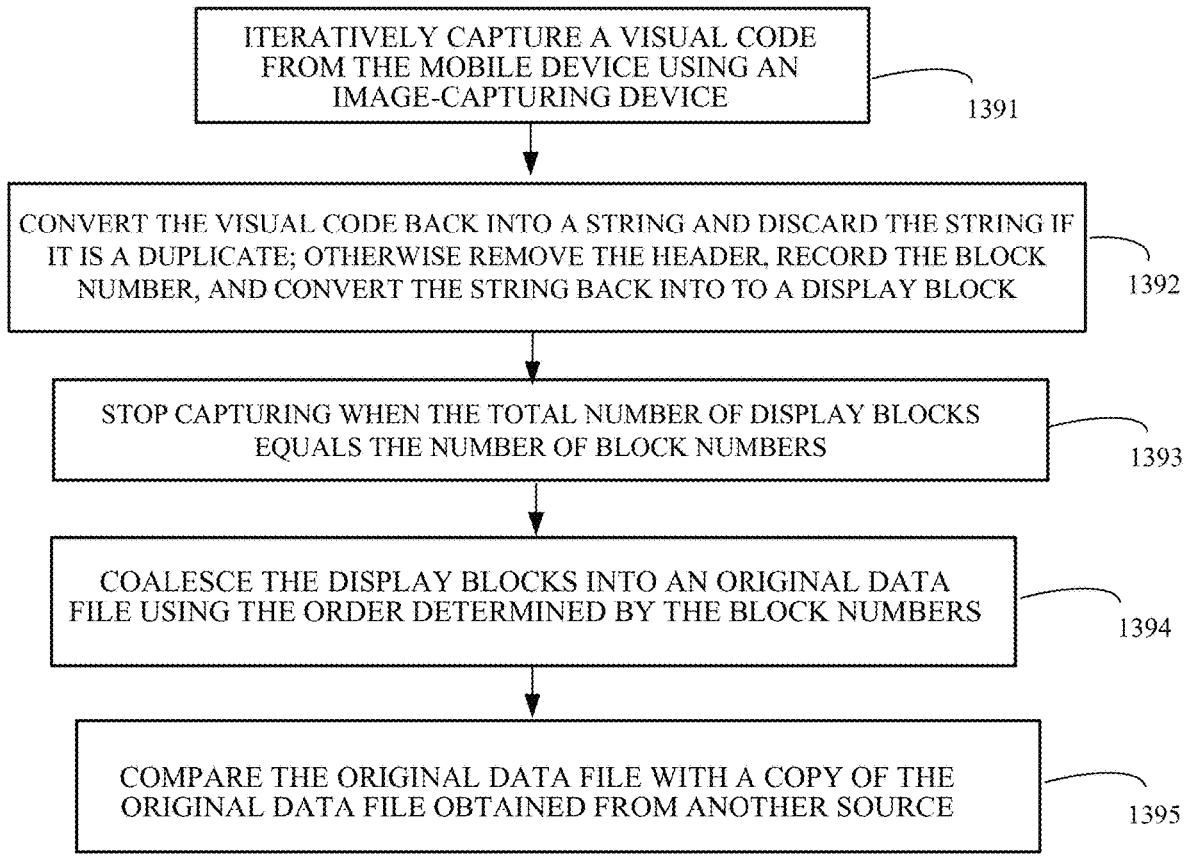

FIG. 13D is a flowchart of a process for transferring an original data file (e.g., an image file) and a certificate from a mobile device to an image-capturing device, in accordance with an example embodiment. In an example embodiment, all of the operations in this process might be performed in real time or near real time by software (e.g., applications or apps distributed by a server at a website) running on the devices depicted in the above figures. In an alternative example embodiment, some or all of the operations in this process might be performed in real time or near real time by software running on a server at a website.

As depicted in FIG. 13D, software on a mobile device (e.g., mobile device 4102 in FIG. 4A, which might be smartphone) partitions an original data file (e.g., an image file) and a certificate (e.g., a certificate certifying the original data file (e.g., an image file)) into a series of display blocks of at least a specified size, e.g., as determined by the size limitations of a standard for a visual code such a QR code, in operation 1381. Then in operation 1382, that software adds (1) the total number of display blocks and (2) a block number as a header to each display block. In an example embodiment, the block number is an ordered number specific to the display block. In another example embodiment, the block number might be another ordinal value, e.g., a letter in an alphabet. In operation 1383, the software converts each display block to a string and generates a single visual code (e.g., a QR code) for the string, in an example embodiment.1 In another example embodiment, the software might generate the visual code directly from a display block with a header, e.g., if the standard for the visual code allows for such a conversion. Then in operation 1384, the software presents each of the resulting visual codes in a repeating progression through the series displayed on the mobile (or sending) device. In an alternative example embodiment, the visual codes might be replaced by oral codes, e.g., if a standard permits the use of oral codes.

As also depicted in FIG. 13D (at the bottom of the figure below the dashed dividing line), software on an image-scanning device (e.g., image-scanning device 4103 in FIG. 4A, which might be a smartphone, a kiosk, a handheld scanner, etc.) iteratively captures a visual code from the mobile (or sending) device, in operation 1391. Then in operation 1392, that software converts the visual code back into a string and discards the string if it is a duplicate. Otherwise the software removes the header, records the block number, and converts the string back into to a display block, in an example embodiment. In operation 1393, the software stops capturing when the total number of display blocks equals the number of block numbers and, in operation 1394, the software coalesces (or combines) the display blocks into an original data file (e.g., an image file) and a certificate using the order determined by the block numbers, in an example embodiment. And in operation 1395, the software compares the original data file (e.g., an image file) and the certificate with copies (e.g., identical copies) of the original data file (e.g., an image file) and the certificate obtained from another source, e.g., a state department of motor vehicles, the U.S. State Department, the Federal Bureau of Investigations, a block chain, an airline, etc.

In another example embodiment, the software on the mobile (or sending device) might generate the visual code directly from a display block with a header, e.g., if the standard for the visual code allows for such a conversion. In that example embodiment, the software on the image-scanning device might convert the visual code directly back into a display block before checking for duplication or removing the header and recording the block number.

In an example embodiment, one or more of the above operations might be performed by a separate thread in a process, in order for the operations to occur in parallel. Also, in an example embodiment, the display block might not be converted into a string prior to generation of a visual code for the display block. For example, the display block might be converted into a byte array or some other byte grouping. In that event, the visual code would not need to be converted back into a string before conversion back into a display block.

Moreover, in an example embodiment the original data file might not be an image file. Rather the original data file might be non-image biometric data concerning the user of the mobile device, e.g., fingerprint, voice data, and/or genetic-identification data.

FIG. 13E is a flowchart of a process for transferring an encrypted original data file (e.g., an image file) and certificate from a mobile device to an image-capturing device, in accordance with an example embodiment. In an example embodiment, all of the operations in this process might be performed in real time or near real time by software (e.g., applications or apps distributed by a server at a website) running on the devices depicted in the above figures. In an alternative example embodiment, some or all of the operations in this process might be performed in real time or near real time by software running on a server at a website.

As depicted in FIG. 13E, software on a mobile device (e.g., mobile device 4102 in FIG. 4A, which might be smartphone) partitions an original data file (e.g., an image file) and a certificate (e.g., a certificate certifying the original data file (e.g., an image file)) into a series of display blocks of at least a specified size, e.g., as determined by the size limitations of a standard for a visual code such a QR code, in operation 13001. The original data file (e.g., an image file) has been encrypted with a public key, e.g., the public key of the user of the image-capturing device. In operation 13002, that software adds (1) the total number of display blocks and (2) a block number as a header to each display block. In an example embodiment, the block number is an ordered number specific to the display block. In another example embodiment, the block number might be another ordinal value, e.g., a letter in an alphabet. In operation 13003, the software converts each display block to a string and generates a single visual code (e.g., a QR code) for the string, in an example embodiment. In another example embodiment, the software might generate the visual code directly from a display block with a header, e.g., if the standard for the visual code allows for such a conversion. Then in operation 13004, the software presents each of the resulting visual codes in a repeating progression through the series displayed on the mobile (or sending) device. In an alternative example embodiment, the visual codes might be replaced by oral codes, e.g., if a standard permits the use of oral codes.

As also depicted in FIG. 13E (at the bottom of the figure below the dashed dividing line), software on an image-scanning device (e.g., image-scanning device 4103 in FIG. 4A, which might be a smartphone, a kiosk, a handheld scanner, etc.) iteratively captures a visual code from the mobile (or sending) device, in operation 13011. Then in operation 13012, that software converts the visual code back into a string and discards the string if it is a duplicate. Otherwise the software removes the header, records the block number, and converts the string back into to a display block, in an example embodiment. In operation 13013, the software stops capturing when the total number of display blocks equals the number of block numbers and, in operation 13014, the software coalesces (or combines) the display blocks into an original data file (e.g., an image file) and a certificate using the order determined by the block numbers, in an example embodiment. And in operation 13015, the software decrypts the encrypted original data file (e.g., an image file) using a private key that matches the public key used to encrypt the original data file (e.g., an image file) and compares the original data file (e.g., an image file) with a copy (e.g., an identical copy) of the original data file (e.g., an image file) and the certificate obtained from another source, e.g., a state department of motor vehicles, the U.S. State Department, the Federal Bureau of Investigations, a block chain, an airline, etc.

In another example embodiment, the software on the mobile (or sending device) might generate the visual code directly from a display block with a header, e.g., if the standard for the visual code allows for such a conversion. In that example embodiment, the software on the image-scanning device might convert the visual code directly back into a display block before checking for duplication or removing the header and recording the block number.

In an example embodiment, one or more of the above operations might be performed by a separate thread in a process, in order for the operations to occur in parallel. Also, in an example embodiment, the display block might not be converted into a string prior to generation of a visual code for the display block. For example, the display block might be converted into a byte array or some other byte grouping. In that event, the visual code would not need to be converted back into a string before conversion back into a display block.

Moreover, in an example embodiment the original data file might not be an image file. Rather the original data file might be non-image biometric data concerning the user of the mobile device, e.g., fingerprint, voice data, and/or genetic-identification data.

FIG. 13F is a flowchart of a process for transferring a digitally-signed original data file (e.g., an image file) and certificate from a mobile device to an image-capturing device, in accordance with an example embodiment. In an example embodiment, all of the operations in this process might be performed in real time or near real time by software (e.g., applications or apps distributed by a server at a website) running on the devices depicted in the above figures. In an alternative example embodiment, some or all of the operations in this process might be performed in real time or near real time by software running on a server at a website.

As depicted in FIG. 13F, software on a mobile device (e.g., mobile device 4102 in FIG. 4A, which might be smartphone) partitions an original data file (e.g., an image file) and a certificate (e.g., a certificate certifying the original data file (e.g., an image file)) into a series of display blocks of at least a specified size, e.g., as determined by the size limitations of a standard for a visual code such a QR code, in operation 13021. The original data file (e.g., an image file) has been digitally signed with a private key, e.g., the private key of the user of the mobile device. In operation 13022, that software adds (1) the total number of display blocks and (2) a block number as a header to each display block. In an example embodiment, the block number is an ordered number specific to the display block. In another example embodiment, the block number might be another ordinal value, e.g., a letter in an alphabet. In operation 13023, the software converts each display block to a string and generates a single visual code (e.g., a QR code) for the string, in an example embodiment. In another example embodiment, the software might generate the visual code directly from a display block with a header, e.g., if the standard for the visual code allows for such a conversion. Then in operation 13024, the software presents each of the resulting visual codes in a repeating progression through the series displayed on the mobile (or sending) device. In an alternative example embodiment, the visual codes might be replaced by oral codes, e.g., if a standard permits the use of oral codes.

As also depicted in FIG. 13F (at the bottom of the figure below the dashed dividing line), software on an image-scanning device (e.g., image-scanning device 4103 in FIG. 4A, which might be a smartphone, a kiosk, a handheld scanner, etc.) iteratively captures a visual code from the mobile (or sending) device, in operation 13031. Then in operation 13032, that software converts the visual code back into a string and discards the string if it is a duplicate. Otherwise the software removes the header, records the block number, and converts the string back into to a display block, in an example embodiment. In operation 13033, the software stops capturing when the total number of display blocks equals the number of block numbers and, in operation 13034, the software coalesces (or combines) the display blocks into an original data file (e.g., an image file) and a certificate using the order determined by the block numbers, in an example embodiment. And in operation 13035, the software hashes another copy of the original data file (e.g., an image file) and certificate and uses them and the public key that matches the private key used to digitally sign the original data file (e.g., an image file) and certificate to verify (1) the signed original data file (e.g., an image file) and certificate and (2) the digital signature, using a verification algorithm (e.g., the RSA verification algorithm).

In another example embodiment, the software on the mobile (or sending device) might generate the visual code directly from a display block with a header, e.g., if the standard for the visual code allows for such a conversion. In that example embodiment, the software on the image-scanning device might convert the visual code directly back into a display block before checking for duplication or removing the header and recording the block number.

In an example embodiment, one or more of the above operations might be performed by a separate thread in a process, in order for the operations to occur in parallel. Also, in an example embodiment, the display block might not be converted into a string prior to generation of a visual code for the display block. For example, the display block might be converted into a byte array or some other byte grouping. In that event, the visual code would not need to be converted back into a string before conversion back into a display block.

Moreover, in an example embodiment the original data file might not be an image file. Rather the original data file might be non-image biometric data concerning the user of the mobile device, e.g., fingerprint, voice data, and/or genetic-identification data.

FIG. 13G is a flowchart of a process for transferring an encrypted and digitally-signed original data file (e.g., an image file) and certificate from a mobile device to an image-capturing device, in accordance with an example embodiment. In an example embodiment, all of the operations in this process might be performed in real time or near real time by software (e.g., applications or apps distributed by a server at a website) running on the devices depicted in the above figures. In an alternative example embodiment, some or all of the operations in this process might be performed in real time or near real time by software running on a server at a website.

As depicted in FIG. 13G, software on a mobile device (e.g., mobile device 4102 in FIG. 4A, which might be smartphone) partitions an original data file (e.g., an image file) and a certificate (e.g., a certificate certifying the original data file (e.g., an image file)) into a series of display blocks of at least a specified size, e.g., as determined by the size limitations of a standard for a visual code such a QR code, in operation 13051. The original data file (e.g., an image file) has been digitally signed with a private key, e.g., the private key of the user of the mobile device, and encrypted with a public key, e.g., the public key of the user of the image-capturing device. In operation 13052, that software adds (1) the total number of display blocks and (2) a block number as a header to each display block. In an example embodiment, the block number is an ordered number specific to the display block. In another example embodiment, the block number might be another ordinal value, e.g., a letter in an alphabet. In operation 13053, the software converts each display block to a string and generates a single visual code (e.g., a QR code) for the string, in an example embodiment. In another example embodiment, the software might generate the visual code directly from a display block with a header, e.g., if the standard for the visual code allows for such a conversion. Then in operation 13054, the software presents each of the resulting visual codes in a repeating progression through the series displayed on the mobile (or sending) device. In an alternative example embodiment, the visual codes might be replaced by oral codes, e.g., if a standard permits the use of oral codes.

As also depicted in FIG. 13G (at the bottom of the figure below the dashed dividing line), software on an image-scanning device (e.g., image-scanning device 4103 in FIG. 4A, which might be a smartphone, a kiosk, a handheld scanner, etc.) iteratively captures a visual code from the mobile (or sending) device, in operation 13061. Then in operation 13062, that software converts the visual code back into a string and discards the string if it is a duplicate. Otherwise the software removes the header, records the block number, and converts the string back into to a display block, in an example embodiment. In operation 13063, the software stops capturing when the total number of display blocks equals the number of block numbers. In operation 13064, the software coalesces (or combines) the display blocks into an original data file (e.g., an image file) and a certificate using the order determined by the block numbers and decrypts the original data file (e.g., an image file) and the certificate with a private key that matches the public key that was used encrypt the original data file (e.g., an image file), in an example embodiment. Then in operation 13065, the software hashes another copy of the original data file (e.g., an image file) and the certificate and uses them and the public key that matches the private key used to digitally sign the original data file (e.g., an image file) to verify (1) the signed original data file (e.g., an image file) and certificate and (2) the digital signature, using a verification algorithm (e.g., the RSA verification algorithm).

In another example embodiment, the software on the mobile (or sending device) might generate the visual code directly from a display block with a header, e.g., if the standard for the visual code allows for such a conversion. In that example embodiment, the software on the image-scanning device might convert the visual code directly back into a display block before checking for duplication or removing the header and recording the block number.

In an example embodiment, one or more of the above operations might be performed by a separate thread in a process, in order for the operations to occur in parallel. Also, in an example embodiment, the display block might not be converted into a string prior to generation of a visual code for the display block. For example, the display block might be converted into a byte array or some other byte grouping. In that event, the visual code would not need to be converted back into a string before conversion back into a display block.

Moreover, in an example embodiment the original data file might not be an image file. Rather the original data file might be non-image biometric data concerning the user of the mobile device, e.g., fingerprint, voice data, and/or genetic-identification data.

While specific embodiments have been provided for transferring large data sets and providing feedback indicating which portions of the data sets have been received, these are described by way of example and not by way of limitation. Those skilled in the art having read the present disclosure will realize additional embodiments falling within the spirit and scope of the present disclosure The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Having provided this detailed description, it will be apparent that modifications and variations are possible without departing from the scope of the invention defined in the appended claims. When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements. In view of the above, it will be seen that the several objects of the invention are achieved and other advantageous results attained. As various changes could be made in the above systems without departing from the scope of the invention, it is intended that all matter contained in the above description and shown in the accompanying drawings shall be interpreted as illustrative and not in a limiting sense.

With the above embodiments in mind, it should be understood that the inventions might employ various computer-implemented operations involving data stored in computer systems. Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although example embodiments of the inventions have been described in some detail for purposes of clarity of understanding, it will be apparent that certain changes and modifications can be practiced within the scope of the following claims. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method, comprising:

receiving a series of visual codes of a first original data file from a sending device, wherein the first original data file and a first digitally signed hash value of the first original data file are partitioned into a first series of display blocks and wherein each display block from the first series of display blocks includes a corresponding header that includes an ordered identifying display block number and a total count of the display blocks in the first series of display blocks, wherein each display block from the first series of display blocks is converted to a byte array to define a first series of byte arrays, wherein each byte array in the first series of byte arrays is converted to a corresponding visual code to define the series of visual codes;

converting a set of visual codes from the series of visual codes into a second series of byte arrays;

converting the second series of byte arrays into a second series of display blocks, wherein each display block in the second series of display blocks includes a corresponding header that includes an ordered identifying display block number and a total count of the display blocks in the second series of display blocks;

coalescing the second series of display blocks into a second original data file and a second digitally signed hash value of the second original data file using an order determined by the ordered identifying display block number in the header of each display block in the second series of display blocks, wherein the second original data file is the same as the first original data file and the second digitally signed hash value of the second original data file is the same as the first digitally signed hash value of the first original data file; and verifying the second original data file with the second digitally signed hash value of the second original data file.

2. The method of claim 1, further comprising:

verifying integrity of the second original data file using a seal that is accessed from a block chain database storing the seal, the seal generated based on contents of the first original data file; and verifying validity of the second original data file using a certification accessed from a block chain database storing the certification, the certification generated based on contents of the first original data file and the seal, wherein the verifying integrity and the verifying validity are performed by an image-capturing device.

3. The method of claim 1, further comprising:

determining that the second series of display blocks is complete, based on the ordered identifying display block number and the total count of the display blocks in the header of each display block in the second series of display blocks; and stopping the capturing of visual codes.

4. The method of claim 1, wherein each byte array in the first series of byte arrays is a string.

5. The method of claim 1, further comprising:

decrypting the second original data file and the second digitally signed hash value of the second original data file using a private key, wherein the first original data file and the first digitally signed hash value of the first original data file are encrypted using a public key corresponding to the private key.

6. The method of claim 1, wherein the method is performed by a receiving device without network connectivity to the sending device.

7. The method of claim 1, wherein the first original data file includes a timestamp.

8. The method of claim 1, wherein the first original data file includes an image file.

9. The method of claim 1, wherein the first original data file includes biometric data of a user of the sending device.

10. A non-transitory computer-readable medium storing a computer program performing a method, the computer-readable medium comprising:

program instructions for receiving a series of visual codes of a first original data file from a sending device, wherein the first original data file and a first certificate from a certifying entity are partitioned into a first series of display blocks and wherein each display block from the first series of display blocks includes a corresponding header that includes an ordered identifying display block number and a total count of the display blocks in the first series of display blocks, wherein each display block from the first series of display blocks is converted to a byte array to define a first series of byte arrays, wherein each byte array in the first series of byte arrays is converted to a corresponding visual code to define the series of visual codes;

program instructions for converting a set of visual codes from the series of visual codes into a second series of byte arrays;

program instructions for converting the second series of byte arrays into a second series of display blocks, wherein each display block in the second series of display blocks includes a corresponding header that includes an ordered identifying display block number and a total count of the display blocks in the second series of display blocks;

program instructions for coalescing the second series of display blocks into a second original data file and a second certificate using an order determined by the ordered identifying block number in the header of each display block in the second series of display blocks, wherein the second original data file is the same as the first original data file and the second certificate is the same as the first certificate; and program instructions for verifying the second original data file with the second certificate.

11. The non-transitory computer-readable medium of claim 10, further comprising:

program instructions for verifying integrity of the second original data file using a seal that is accessed from a block chain database storing the seal, the seal generated based on contents of the first original data file; and program instructions for verifying validity of the second original data file using a certification accessed from a block chain database storing the certification, the certification generated based on contents of the first original data file and the seal, wherein the verifying integrity and the verifying validity are performed by an image-capturing device.

12. The non-transitory computer-readable medium of claim 10, further comprising:

program instructions for determining that the second series of display blocks is complete, based on the ordered identifying display block number and the total count of the display blocks in the header of each display block in the second series of display blocks; and program instructions for stopping the capturing of visual codes.

13. The non-transitory computer-readable medium of claim 10, wherein each byte array in the first series of byte arrays is a string, the first series of byte arrays is a first series of strings, and the second series of byte arrays is a second series of strings.

14. The non-transitory computer-readable medium of claim 10, wherein the first certificate from the first certifying entity includes a digitally signed hash value of the first original data file.

15. The non-transitory computer-readable medium of claim 10, wherein the computer-readable medium further comprises program instructions for verifying the second original data file with a copy of the first original data file obtained from the certifying entity.

16. A computer system comprising:

a processor; and memory coupled to the processor and having stored therein instructions that, if executed by the computer system, cause the computer system to execute a method comprising:

receiving a series of visual codes of a first original data file from a sending device, wherein the first original data file is partitioned into a first series of display blocks, each display block from the first series of display blocks includes an indication of a previous display block in the first series of display blocks, wherein each display block from the first series of display blocks is converted to a byte array to define a first series of byte arrays, each byte array in the first series of byte arrays is converted to a corresponding visual code to define the series of visual codes;

converting a set of visual codes from the series of visual codes into a second series of byte arrays;

converting the second series of byte arrays into a second series of display blocks, each display block in the second series of display blocks includes an indication of a previous display block in the second series of display blocks;

verifying integrity of the second series of display blocks by comparing the indication of the previous display block for each display block in the second series of display blocks with a previous display block in the second series of display blocks; and coalescing the second series of display blocks into a second original data file, the second original data file is the same as the first original data file.

17. The method of claim 16, further comprising:

verifying integrity of the second original data file using a seal that is accessed from a block chain database storing the seal, the seal generated based on contents of the first original data file; and verifying validity of the second original data file using a certification accessed from a block chain database storing the certification, the certification generated based on contents of the first original data file and the seal, wherein the verifying integrity and the verifying validity are performed by an image-capturing device.

18. The computer system of claim 16, wherein each byte array in the first series of byte arrays is a string, the first series of byte arrays is a first series of strings, and the second series of byte arrays is a second series of strings.

19. The computer system of claim 16, wherein each indication of the previous display block in the first series of display blocks is a hash value of a previous display block in the first series of display blocks and each indication of the previous display block in the second series of display blocks is a hash value of a previous display block in the second series of display blocks.

20. The computer system of claim 16, wherein the computer system is without network connectivity to the sending device.

* * * * *